(12) United States Patent
Murray et al.

(10) Patent No.: US 7,467,103 B1
(45) Date of Patent: Dec. 16, 2008

(54) OPTIMIZATION SYSTEM AND METHOD FOR BUYING CLUBS

(76) Inventors: Joseph L. Murray, 1053 E. Shore Rd., Jamestown, RI (US) 02835; Thomas G. Murray, 3523 Cooper Creek Rd., Denton, TX (US) 76208

( * ) Notice: Subject to any disclaimer, the term of this patent is extended or adjusted under 35 U.S.C. 154(b) by 0 days.

(21) Appl. No.: 10/916,803

(22) Filed: Aug. 11, 2004

Related U.S. Application Data

(63) Continuation-in-part of application No. 10/734,724, filed on Dec. 11, 2003, now abandoned, and a continuation-in-part of application No. 10/125,097, filed on Apr. 17, 2002.

(60) Provisional application No. 60/495,023, filed on Aug. 13, 2003.

(51) Int. Cl.
*G06Q 30/00* (2006.01)
(52) U.S. Cl. ............................ 705/26; 705/27
(58) Field of Classification Search ............ 705/26, 705/27, 37, 1
See application file for complete search history.

(56) References Cited

U.S. PATENT DOCUMENTS

| | | |
|---|---|---|
| 4,799,156 A | 1/1989 | Shavit et al. |
| 5,319,542 A | 6/1994 | King, Jr. et al. |
| 5,740,425 A | 4/1998 | Povilus |
| 5,799,289 A | 8/1998 | Fukushima et al. |
| 5,893,093 A | 4/1999 | Wills |
| 5,918,214 A | 6/1999 | Perkowski |
| 5,960,411 A | 9/1999 | Hartman et al. |
| 5,991,739 A | 11/1999 | Cupps et al. |
| 5,995,943 A | 11/1999 | Bull et al. |

(Continued)

FOREIGN PATENT DOCUMENTS

JP 2001155067 8/2001

(Continued)

OTHER PUBLICATIONS

"The price is right?" Builders Merchants Journal. TOnbridge: Jun. 1, 1998. p. 28 Retrieved via ProQuest on May 9, 2008.*

(Continued)

*Primary Examiner*—Jeffrey A. Smith
*Assistant Examiner*—Michael A. Misiaszek
(74) *Attorney, Agent, or Firm*—Jack D. Stone, Jr.; Scheef & Stone, L.L.P.

(57) ABSTRACT

A system, and associated method, aggregates, optimizes, allocates, and prices products orders by members of buying clubs wherein a network interconnects a master computer having a database to a plurality of buyer computers connected to the network for data communication with said master computer, each of which buyer computers is operable by at least one respective buyer of at least one buying club, and is configured for generating to the master computer data defining orders of products placed by said respective buyers. Computer program code executable by the master computer compiles each of the respective orders into an aggregate order, and, with reference to data structures of said products, inventory, optimization criteria, and orders of all buyers including any specified minimum, preferred and maximum specified units, generates optimized orders and allocations to achieve improved outcomes for buyers, thereby facilitating purchasing and commerce by and between members, buying clubs, and suppliers.

20 Claims, 23 Drawing Sheets

U.S. PATENT DOCUMENTS

| | | | |
|---|---|---|---|
| 6,014,644 | A | 1/2000 | Erickson |
| 6,052,670 | A | 4/2000 | Johnson |
| 6,055,519 | A | 4/2000 | Kennedy et al. |
| 6,064,979 | A | 5/2000 | Perkowski |
| 6,081,789 | A | 6/2000 | Purcell |
| 6,085,170 | A | 7/2000 | Tsukuda |
| 6,101,484 | A | 8/2000 | Halbert et al. |
| 6,131,087 | A | 10/2000 | Luke et al. |
| 6,148,289 | A | 11/2000 | Virdy |
| 6,188,994 | B1 | 2/2001 | Egendorf |
| 6,249,772 | B1 | 6/2001 | Walker et al. |
| 6,249,773 | B1 | 6/2001 | Allard et al. |
| 6,260,024 | B1 * | 7/2001 | Shkedy .................. 705/37 |
| 6,263,317 | B1 | 7/2001 | Sharp et al. |
| 6,269,343 | B1 * | 7/2001 | Pallakoff ................ 705/26 |
| 6,272,472 | B1 | 8/2001 | Danneels et al. |
| 6,285,986 | B1 | 9/2001 | Andrews |
| 6,336,100 | B1 | 1/2002 | Yamada |
| 6,338,050 | B1 | 1/2002 | Conklin et al. |
| 6,351,738 | B1 | 2/2002 | Clark |
| 6,405,176 | B1 | 6/2002 | Toohey |
| 6,418,441 | B1 | 7/2002 | Call |
| 6,442,544 | B1 | 8/2002 | Kohli |
| 6,484,150 | B1 | 11/2002 | Blinn et al. |
| 6,490,567 | B1 | 12/2002 | Gregory |
| 6,493,724 | B1 | 12/2002 | Cusack et al. |
| 6,499,052 | B1 | 12/2002 | Hoang et al. |
| 6,553,346 | B1 | 4/2003 | Walker et al. |
| 6,553,350 | B2 | 4/2003 | Carter |
| 6,574,608 | B1 | 6/2003 | Dahod et al. |
| 6,578,030 | B1 | 6/2003 | Wilmsen et al. |
| 6,584,451 | B1 | 6/2003 | Shoham et al. |
| 6,876,983 | B1 * | 4/2005 | Goddard ................. 705/37 |
| 6,934,690 | B1 * | 8/2005 | Van Horn et al. ........... 705/26 |
| 2001/0014878 | A1 | 8/2001 | Mitra et al. |
| 2001/0027431 | A1 | 10/2001 | Rupp et al. |
| 2001/0032162 | A1 * | 10/2001 | Alsberg et al. ............ 705/37 |
| 2001/0032163 | A1 | 10/2001 | Fertik et al. |
| 2001/0044758 | A1 | 11/2001 | Talib et al. |
| 2002/0023123 | A1 | 2/2002 | Madison |
| 2002/0029193 | A1 | 3/2002 | Ranjan et al. |
| 2002/0042756 | A1 | 4/2002 | Kumar et al. |
| 2002/0082887 | A1 | 6/2002 | Boyert et al. |
| 2002/0087332 | A1 | 7/2002 | Como |
| 2002/0087522 | A1 | 7/2002 | MacGregor |
| 2002/0161646 | A1 | 10/2002 | Gailey et al. |
| 2002/0188689 | A1 | 12/2002 | Michael |
| 2003/0018536 | A1 | 1/2003 | Eggebraaten et al. |
| 2003/0055744 | A1 * | 3/2003 | Walker et al. ............ 705/26 |
| 2003/0061114 | A1 | 3/2003 | Schwartz et al. |
| 2003/0088556 | A1 | 5/2003 | Allen, III |
| 2003/0101107 | A1 * | 5/2003 | Agarwal et al. ............ 705/28 |
| 2003/0142797 | A1 | 7/2003 | Troy et al. |
| 2004/0225569 | A1 | 11/2004 | Bunnell |

FOREIGN PATENT DOCUMENTS

| | | |
|---|---|---|
| WO | WO 99/50771 | 10/1999 |
| WO | WO 01/75628 A1 | 10/2001 |
| WO | WO 01/95224 A1 | 12/2001 |
| WO | WO 02/21398 A1 | 3/2002 |
| WO | WO 02/23445 A2 | 3/2002 |
| WO | WO 03/058540 A1 | 7/2003 |

OTHER PUBLICATIONS

Robert J. Pickford, An Organizers' Manual for Cooperative Food Buying Clubs, Federation of Ohio River Cooperatives, 1981.

Edmund G. Brown, Jr., How to Form a Pre-Order Co-op, California Dept. of Consumer Affairs, 1982.

Ozark Cooperative Warehouse, Buying Club Manual, Ozark Cooperative Warehouse, 1990.

Deb Maynard, Linking Buying Clubs and Retails for Co-op Development, Feb. 1997.

Deb Maynard, Northeast Cooperatives: The Business Environment, 2002.

Deb Maynard, Northeast Cooperatives: Website Development Proposal, Jun. 3, 2002.

Robert J. Kauffmann and Bin Wang, Bid Together, Buy Together: On the Efficacy of Group-Buying Business Models in the Internet-Based Selling, May 16, 2001.

Robert J. Kaufmann and Bin Wang, New Buyers' Arrival Under Dynamic Pricing Market Microstructure: The Case of Group-Buying Discounts on the Internet, Fall 2001.

Mobshop, The Value of Demand Aggregation in Public Marketplaces, 2001.

www.pcguide.com, Group Buying Clubs, 1997.

Hudson Valley, Hudson Valley Federation of Food Cooperatives, Oct. 28, 2001.

Ozark Cooperative Warehouse's Ordering Software, Instruction Manual, Jun. 1, 2002.

Ozark Cooperative Warehouse's Ordering Software, Supplemental Pages, Apr. 4, 2002.

Ozark Cooperative Warehouse's Ordering Software, Updated Software Memo, Jun. 18, 2002.

United Northeast, LLC., FoodLink Electronic Ordering Form, date unknown.

United Northeast, Buying Club Software Provided by United Natural Foods (Manual for Coordinator Mode 6.0), Jul. 2004.

United Northeast, Buying Club Software Developed by United Northeast (Manual for Coordinator Mode Version 5.0), date unknown.

United Northeast, Software for Buying Clubs (Manual for Coordinator Mode Version 5.0), date unknown.

United Northeast, Manual for FoodLink Ver 4.5, date unknown.

United Northeast, Member: Setup and Use of FoodLink Ver 4.5 or 5.0 Member Mode, date unknown.

FOODCLUB.ORG, TMG Club, date unknown.

FOODCLUB.ORG, Statement of Purpose, date unknown.

FOODCLUB.ORG, E-mail Notifying of System Membership, Jan. 31, 2002.

FOODCLUB.ORG, Links, date unknown.

FOODCLUB.ORG, Frequently Asked Questions (Updated), date unknown.

FOODCLUB.ORG, Buy Organic: Natural Foods For A Better World, date unknown.

FOODCLUB.ORG, Administration, date unknown.

FOODCLUB.ORG, Order Form—Art Dogs and Grace, date unknown.

FOODCLUB.ORG, Discussion of FoodClub Online Buying-Club Software, date unknown.

FOODCLUB.ORG, Talk Subscribers, date unknown.

FOODBUYINGCLUB.COM, Buy Organic: Natural Foods For A Better World (Existing Groups), date unknown.

FOODBUYINGCLUB.COM, Demo Food Buying Club Order Split Sheet (Menu Choices), Jun. 2, 2003.

FOODBUYINGCLUB.COM. Demo Food Buying Club Administration (Administration), Jun. 4, 2003.

FOODBUYINGCLUB.COM, Demo Food Buying Club (Pages), Jun. 4, 2003.

FOODBUYINGCLUB.COM, Demo Food Buying Club Reports, Jun. 4, 2003.

FOODBUYINGCLUB.COM, Home Page (Assorted pages printout), Jun. 2, 2002.

FOODBUYINGCLUB.COM, Services/Features/Monthly Fees (Assorted pages printout), Jun. 2, 2002.

BUYORGANIC.ORG, Member Order Form for Eating Light, Jun. 10, 2003.

BUYORGANIC.ORG, In the Garden Co-op (Order Form), Jan. 3, 2002.

BUYORGANIC.ORG, OrganicCoop.com: Weekly Organic Buying Club for Pick Up, Apr. 4, 2002.

NorthFarm, NF-One Enhancements, date unknown.

NorthFarm, NF-One Enhancements (NorthFarm), date unknown.

NorthFarm, Table of Contents: Visual NF-One, date unknown.

NorthFarm, NF-Web: Web Based Ordering From Natural Farms, date unknown.
NorthFarm, NF-Web: Web Based Ordering From North Farms, date unknown.
NorthFarm, NF-Web (Update and FAQ), date unknown.
NorthFarm, NF-Web: North Farm (Update and FAQ), May 1, 2002.
NorthFarm, Cooperative Online Catalog (Other web pages), date unknown.

* cited by examiner

OPTIMIZATION SYSTEM AND METHOD FOR BUYING CLUBS

CLAIM OF PRIORITY

This application claims priority from U.S. Provisional Patent Application No. 60/495,023 entitled "SUPPLIER PORTAL, INVENTORY, AND OPTIMIZATION SYSTEM FOR BUYING CLUBS" filed on behalf of Thomas G. Murray, on Aug. 13, 2003.

CROSS-REFERENCE TO RELATED APPLICATIONS

This application is also a continuation-in-part of patent application Ser. No. 10/734,724, entitled "MULTI-USER, UNIVERSAL DATA CONVERSION AND COMMUNICATION HUB", filed on Dec. 11, 2003 now abandoned, on behalf of Thomas G. Murray (hereinafter the '724 patent application), and is a continuation-in-part of co-pending patent application Ser. No. 10/125,097, entitled "COMPUTER PROCESSING SYSTEM FOR FACILITATING THE ORDER, PURCHASE, AND DELIVERY OF PRODUCTS", filed on Apr. 17, 2002, on behalf of Thomas G. Murray (hereinafter the '097 patent application), both of which aforementioned applications are hereby incorporated herein by reference, in their entirety.

This application is also related to, and hereby incorporates herein by reference, the following three U.S. patent applications, in their entirety, each of which applications was filed contemporaneously with the present application on Aug. 11, 2004, and identifies Thomas G. Murray as at least one inventor, the applications being: (1) U.S. patent application Ser. No. 10/916,693, entitled "Inventory Management System and Method for Buying Clubs" (hereinafter the "Inventory" patent application), (2) U.S. patent application Ser. No. 10/917,250, entitled "System, and Associated Method, for Managing Buying Clubs" (hereinafter the "Buying Club" patent application), and (3) U.S. patent application Ser. No. 10/916,694, entitled "Supplier Management System and Method For Buying Clubs" (hereinafter the "Supplier" patent application).

TECHNICAL FIELD

The present invention relates in general to electronic commerce and, more particularly, to a method and system for aggregating and optimizing orders for members of buying clubs based on information with respect to member orders, inventory, catalogue, and selected parameters.

BACKGROUND

Along with the development of mass production of goods, the distribution of goods from providers to consumers has become well established. Suppliers have developed at various levels in the supply chain, including the producer (e.g., a grower, rancher, or farmer in the food area), the manufacturer, and the distributor, all working together to move goods to the retailer and then the consumer. Only to a limited extent do producers and manufacturers now sell products directly to consumers. Typically, most products are delivered via distributors which traditionally act as intermediaries between manufacturers and retailers (or businesses) to aggregate large volumes of low margin goods in order to minimize unit transportation costs. Distributors typically operate on very narrow profit margins, carefully balancing product selection, availability, price, volume, and geographic area as needed to achieve a level of profitability that can sustain service delivery to the intended target market or markets. The improvements in production and distribution have enabled yesterday's small corner retail shop to evolve into today's huge mass merchandising retailer that offers products from literally thousands of vendors.

With the advent of the computer and an increasingly large portion of the populace using the Internet and other communications technologies, consumer purchasing has also evolved to include direct purchasing of products or services from or through remote vendors such as Amazon™, E-Bay™, Yahoo™, Expedia™, and Travelocity™. Products are often shipped through third party delivery companies, such as United Parcel Service™ or Federal Express™. Services are provided through on-line interfaces to other systems, including reservation systems. Although Internet sales of products have grown dramatically and continue to grow at high rates, heretofore consumers have pre-dominantly utilized the Internet to order either products such as books and specialty products, or to arrange for services such as airline reservations or other travel arrangements. Internet sales to date have not evolved to the stage where large quantities of consumer packaged goods such as groceries, cleaning supplies, dairy, or health & beauty aids are purchased. Nor have Internet sales expanded significantly in food & beverage areas such as meat, beer, liquor or wine, seafood, or produce (e.g., fruits and vegetables). Heretofore most products have been provided to customers by retailers, including highly efficient mass merchandisers such as Wal-Mart or Target, or large warehouse outlets such as Sam's Club or CostCo. There are several reasons for this, as discussed below.

Internet sales have not expanded significantly in the aforementioned areas because Internet sales currently include a number of deterrents to the purchaser and the supplier. Remote suppliers will often levy a shipping charge for transporting products which can constitute a significant proportion of the total value of the transaction, or simply be a deterrent to purchases due to shipping being an explicit additional cost. Another constraint is the lack of suitable information and logistical arrangements for remote suppliers to deliver products in larger volume to consumers. A further constraint is the lack of an efficient, intuitive, and effective technology and system for offering multiple products from distributors, manufacturers, or producers which may be readily incorporated into bulk shipments to consumers. A further constraint is the fact that distributors will typically sell products by the case, whereas consumers will seek to purchase products for less than case quantities, or even single unit increments. A further constraint are laws that prohibit interstate sales of certain products, such as, for example, wine, beer, liquor, and the like.

Buying clubs (also known as coops, food coops, food buying clubs, buyer groups, buying groups, groups, and the like) are an alternative distribution mode utilized for remote buying of consumer goods, most prevalently practiced in the sourcing and purchasing of organic foods. Buying clubs are usually formed to acquire products directly from suppliers (typically distributors) at better prices than are generally available through retail outlets and/or to purchase products that are not otherwise available through local retailers.

Buying clubs typically comprise a group of consumers who become members, and may include five to twenty or more households. A buying club, also referred to as a customer, consists of members who jointly purchase products from suppliers and receive deliveries and make pickups of products within a common local area. Most typically one member will handle the bulk of the duties, and such person is referred to herein as the Buyer Coordinator, who is also most typically a member of the club. Club members are generally located within a certain geographical, or physical, proximity to each other, which allows for a central pickup point to be identified that is reasonably convenient for all members. Typically club members include larger families with more than one or two children. Thus members who manage households tend to be extremely busy and also tend to operate on more limited financial means (saving money is one reason that they have joined a buying club). While club members do not typically possess great technical expertise with computers, they are usually familiar with the Internet and e-mail. Of critical importance to club members is the ability to quickly and easily finalize whatever arrangements are necessary to conclude purchases of products for their families as they are purchasing higher quality products at better prices.

Although computers, e-mail and the Internet have assisted buying clubs, the growth of buying clubs has been hindered by a number of formidable challenges. As a result, buying clubs conventionally transact only a fraction of one percent of all consumer purchases. Based on the relatively small level of acceptance of buying clubs, despite their cost benefits and potentially broad market application, it is clear that an efficient and effective system to meet club member needs with a minimum of difficulty and effort does not yet exist. Reference is made to the '097 patent application describing in further detail additional logistical, financial, and operational requirements of buying clubs which description is herein incorporated by reference.

To establish and operate a buying club, the first step each buying club must undertake is to define what kinds of products the club wishes to purchase, and then to locate and form purchasing relationships with one or more appropriate suppliers. It is not easy to locate suppliers and suppliers are often located by word of mouth as even internet based keyword searches often fail to identify suitable suppliers. There is no system that provides a central registry to enable contact between buying clubs and suppliers that conveys to buyers what products or types of products are available from suppliers within a given geographic area. Even after finding a supplier, clubs may purchase from multiple suppliers, practicing selective sourcing based on the need for a diversity of products or better pricing, service, and/or availability of products from one supplier versus another supplier. Although members of clubs will purchase a variety of products as diverse as meats, produce, cleaning supplies, groceries and other consumables, as noted there is no central facility that provides information as to which suppliers will supply products by geographic area to buying clubs, and also what kinds of products suppliers will provide to buying clubs. Furthermore, persons interested in forming a buying club also do not have ready access to critical information such as product availability, seasonality restrictions, delivery times or conditions, minimum dollar order requirements, or other restrictions that are specific to receiving products or services from suppliers to buying clubs. In addition, there is no web site where a buying club may register themselves with suppliers should the buying club meet supplier requirements and desire to purchase products from them.

A further and very difficult complication results from the diverse product data structures under which suppliers sell products. Suppliers range from those who supply as few as 1 to 10 products (such as single product line suppliers like poultry producers or vendors of a single fruit such as apples) to full line distributors who supply up to 5,000 to 20,000 products. Suppliers sometimes provide printed catalogues or may allow viewing of product lists over the Internet. However, rarely are products able to be ordered directly over the Internet, and in any event catalogues are prepared by the individual suppliers and contain widely diverse product data structures. Since buying clubs are interested in sourcing from multiple suppliers and in optimizing their purchases, there exists a need to display suppliers and product catalogues in a consistent means for buying clubs so members are not required to master diverse product data structures.

A further need arises for consistent data structures so that optimizations may be calculated to enable placement of valid orders with suppliers. The need for optimization (and the pre-cursor step of aggregation) to place valid orders is based on the fact that whereas buyers typically wish to purchase units of a product, suppliers often only sell some products in predefined and relatively large number of unit increments (such as cases) for efficiency purposes. Therefore, although some products are available in single unit quantities, many suppliers often require customers (whether buying clubs or retailers) to purchase sufficient quantities of each product to meet a specific case quantity. Such case quantity sales include a number of units in a case, such as 6, 10, or some other number of units of the product for each case. Products may also be sold in different formats besides simply being available by the case or by the unit which can necessitate additional order processing and recordkeeping challenges.

As is generally well known, a Stock Keeping Unit (SKU) is, or refers to, a multi-digit number associated with a product for inventory purposes. By way of example, an SKU numbered 33445 for Quick Rolled Organic Oats may be sold in each variety of units per case of 5#, 10#, 25#, and 50# increments (wherein the "#" symbol is used herein to designate a pound or pounds), thereby effectively having four different case quantities for that single SKU from that supplier. Such a single SKU may be viewed by the buyer as four different products based on whether the buyer wishes to purchase in one or more 5#, 10#, 25#, or 50# increments. Another supplier may list those same products with the same weight divisions, but instead of listing them under a single SKU, they might list them by 4 different SKU numbers. For example, using the above Quick Rolled Organic Oats just cited, they might be sold as SKU 33421 for 5#, 33422 for 10#, 33423 for 25#, and 33424 for 50#. An additional data structure occurs when price breaks are offered based on purchases of 1-4 units at $5.00 each, 5-8 units at $4.50 each, and 9-12 units at $4.00 each. As is disclosed in the '097 patent application, it is of critical importance to buying club members that appropriate quantities be achieved for the buying clubs so that orders may be placed on behalf of all members for the buying club, and that members will be able to aggregate and optimize their orders. Accordingly, a system and method is needed so that such diverse product data structures can be included in the ordering process for buying club members.

For the purpose of discussion, the foregoing information associated with placing an order for a product, such as a SKU number (e.g., 33455), a product description (e.g., Nature's Peanut Butter), units per case (e.g., 12), unit label (e.g., 15 oz. jar), price per case (e.g., $25.00), and the like, shall be referred to herein as "quantitative" information.

In addition to quantitative information, members of buying clubs often desire additional information about products, referred to herein as "qualitative" information, such as a product's ingredients, nutritional information (e.g., serving sizes, calories, fat grams and the like), packaging information, an expanded product description, key characteristics (e.g., organic, genetically modified, kosher, and the like), an image of the product, and the like. Qualitative information may also include other intangibles relevant to the selection decision such as, for example, the type of workforce employed by a manufacturer (e.g., local versus international), wage levels paid to workers (e.g., below or above living wage levels), the ownership structure of a company (e.g., small family-owned versus large public company), methods of production (e.g., sustainable vs. non-sustainable), specific countries of origin of the product or the ingredients to the product, and the like.

There is, however, a general lack of product qualitative information from suppliers in catalogues, which is information that many buying club members would value. Many suppliers do not even offer such information in catalogues or, if they do, such information is typically incomplete. Conventionally, each supplier maintains their own catalogue in their own design with marked variations in format and completeness.

Not only is there a general lack of product qualitative information in suppliers' catalogues, but moreover, most of the foregoing qualitative information is not readily available to, or stored by, distributors. Even if it were, for distributors to maintain such qualitative information in a Master Catalogue for all products that they carry, (which could be up to 15,000 or even more) and for each manufacturer (which could be hundreds), would be a very large burden. Distributors generally carry such large numbers of products that providing such information for all products, particularly when such information would need to be sourced from dozens or hundreds of manufacturers or growers, would become a very resource-intensive task.

Similarly for manufacturers and producers to update all their product outlets (which also could range in the hundreds or thousands) would be a very large burden as well. Producers and manufacturers typically sell products through a wide variety of outlets comprising hundreds of customers which may include distributors, retailers, or direct customers (consumers). Therefore, a system is needed so that such qualitative information can easily and properly be included in the catalogue that is accessed by members of buying clubs.

There are still further limitations to the information conveyed by suppliers for buying clubs in the area of ordering. Suppliers will often set specials prices which are products discounted for sale over certain time periods, or until they are sold out in the case of discontinued products. However, there is a marked lack of uniformity and access to information in the area of specials prices for members while they are placing their orders. For example, some suppliers offer special prices on products based on orders received by a certain date (e.g., from July 1 to July 31). Another supplier may offer specials based on the date orders are shipped. Furthermore, no supplier to buying clubs offers immediate access and notification of specials to members at the same moment and in the same ordering screens as where members are placing their orders for products. Additional product attributes that are of interest to members while placing orders relate to the extent to which a product's price is discounted, whether it is being discontinued, and whether a product is being superseded by a new improved product. Members are often highly interested in being shown new products that are being offered when such products are available while they are placing their orders.

A further limitation of conventional systems is that members, when placing orders, are not informed if products are in or out of stock and/or when products may be in stock in the future. There is also no means of storing a back order for such a product during the on-line ordering process, nor is there any means for members of buying clubs to obtain such information from suppliers on-line. A telephone call or another means of accessing such information would be required, but this is impractical and inconvenient as buying club members often prefer to place orders after business hours when family related responsibilities subside.

A further constraint of existing systems is that a member placing orders for products from a supplier's catalogue may also be interested in purchasing product stored in the inventory of a buying club. However, members are not available to view and order the inventory of the club concurrently with their ordering from the supplier. And furthermore members are not able to know if inventory would in fact be available, ie have other orders placed for inventory caused such inventory to be allocated elsewhere? It is thus a major detriment to the club when such inventory is not automatically allocated to members who have placed orders for the same product from the supplier.

An additional constraint exists when the club itself may be interested or willing to supplement member orders to enable a supplier order to be submitted that otherwise would not meet supplier quantity requirements. Currently, such functions can only occur by means of intensive communications typically occurring late in the ordering process when such coordinating is even attempted.

An additional constraint of conventional systems is that it is highly inefficient to provide customizable pricing in the catalogue to customers, and thus suppliers tend to provide a "one size fits all" single set of prices for all customers regardless of the attractiveness of the customer or the supplier's costs that are associated with servicing the customer.

Further needs for suppliers are logistics and transportation planning and communications functions for buying clubs. Suppliers that deliver to buying clubs remotely establish route systems and drop points (also known as delivery points) around which schedules for order cutoffs and deliveries are set. It is not easy for suppliers to manage and communicate to buyers the appropriate truck route, delivery point (also referred to as drop point), and schedule changes or to update members as to exactly which supplier order cutoffs apply while orders are placed by different modes. This is made even more complex when multiple truck routes and delivery points may occur within a given geographic locale. As one example there may be one cutoff for a fax order, another for a telephone order, and a third that is based on mailing in an order, indicating that suppliers may not be using a common system for processing orders but have different systems that apply based on how the order is being received. Furthermore a supplier's ordering system and shipping systems are typically handled by different departments and are not integrated between each department and the buying club customer. Thus, while placing orders, clubs are not automatically provided with the delivery point, truck route, supplier order cutoff and delivery date information, but must search and obtain such information from other sources, typically a paper catalogue or a content only web page.

Additionally, suppliers have different minimum dollar order amount requirements for placement of an order. For example, a supplier may require a minimum order of $1,000 but vary this if a club is situated on an existing route, whereupon the minimum amount is only $500. Another supplier may set a $350 minimum order for a buying club. Still another may set a minimum order of $100 for produce and a minimum total order of $750. The minimum required dollar amounts are not monitored as part of the member's online ordering process to indicate whether or not the buying club has achieved the supplier minimum amount or not. In addition, a supplier may require other information such as one or more contact names or phone numbers to coordinate ordering or delivery of the products with the buying club.

There are a number of occasions where a product shipment that is delivered to a club has a discrepancy between what was ordered and what has been shipped or charged. Conventionally, members of clubs must fill out paperwork to indicate such problems, which are referred to as credits, or product credits. Members are typically required to complete this paperwork and fax it or otherwise have it delivered to the supplier within a relatively narrow time period. This is a time-consuming, tedious, and error-prone means of handling product credits, many of which originated from errors or omissions on the part of the supplier. A more efficient and easy means of processing these credits is strongly needed.

Another limitation of existing supplier offerings for buying clubs is the inability for manufacturers or other suppliers to offer electronic coupons to buying club members while they are purchasing the supplier's products. A further limitation is the lack of ability of suppliers to advertise products to buying clubs while members are placing orders via the electronic catalogue.

Without easy access to each supplier's ordering requirements and methods, and an easy ability to present and process product offerings, product availability, product pricing, and logistical and service arrangements offered by suppliers, buying clubs are required to undertake tedious activities of searching for, compiling, and organizing this information for each supplier. Given the daily activity levels and personal or family commitments of most club members, efforts to overcome the various limitations described herein fall well outside what is practical for club members.

Therefore, what is needed is a method and system for enabling members of buying clubs to place orders, which are aggregated, optimized, allocated and priced for the member and the club with a minimum of difficulty and effort so as to overcome drawbacks of existing systems.

SUMMARY

The present invention accordingly provides a system and method for the aggregation, optimization, allocation and pricing of orders by members of buying clubs wherein such orders are optimized with respect to a number of variables including the data structures of the product or related products, inventory, optimization criteria, and orders of all members including any specified minimum, preferred and maximum specified units.

In a further embodiment of the invention, a system is disclosed having a plurality of buyer computers, each of which buyer computers provides for updating a database defining respective orders of products by such plurality of buyers. The plurality of buyer computers are connected through a network to a master computer configured for receiving from each buyer computer the respective orders of products required by said respective buyers. Computer program code executable by the master computer, is provided for compiling each of the respective orders into an aggregate order, and generating optimized orders and allocations to achieve improved outcomes for buyers.

By the use of the present invention, buying clubs and their members are afforded access to a system which will efficiently allow buyers to place, aggregate, optimize, and be allocated quantities of, and receive prices for, orders in light of a wide range of variables, all occurring in real time, thereby facilitating purchasing and commerce by and between members, buying clubs, and suppliers.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
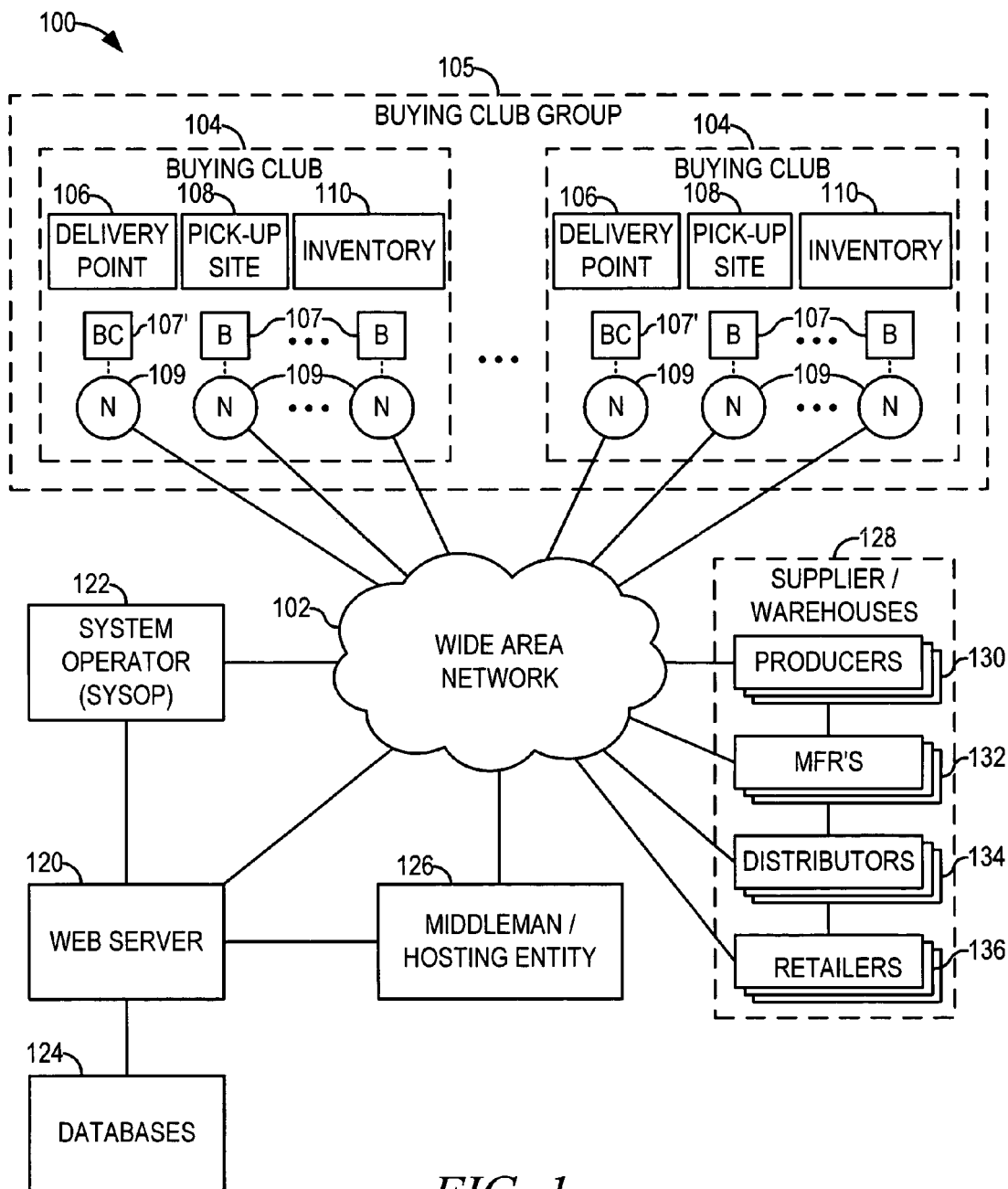
FIG. 1 is a high level flow diagram illustrating a general physical structure of a supply chain, buying club levels, and participants, and the flow of information to and from a web server in accordance with features of the present invention.

In the following discussion, numerous specific details are set forth to provide a thorough understanding of the present invention. However, it will become clear to those skilled in the art that the present invention may be practiced without such specific details. In some instances, well-known elements have been illustrated in schematic or block diagram form in order not to obscure the present invention in unnecessary detail. Additionally, for the most part, details concerning computers, browsers, the Internet, communication networks, e-mail, network protocols and technologies (e.g., HTTP, HTML, XML, XML Schemas, XSLT, SOAP, CORBA, DCOM, RDBMS, SQL), database design elements (e.g., join tables, keys, indexes, and/or attributes such as company name, SKU, product description, product categories), and the like have been omitted, except insofar as necessary to describe the present invention, inasmuch as such details are not considered necessary to obtain a complete understanding of the present invention, and are considered to be within the skills of persons of ordinary skill in the relevant art.

It is noted that, unless indicated otherwise, all functions described herein are performed by a data processor in accordance with code. As used herein, the term "data processor" shall include and be used to refer to any one or more of a microprocessor, a microcontroller, an application-specific integrated circuit (ASIC), a device (e.g., a personal digital assistant (PDA), a mobile telephone, or the like), an electronic data processor (EDP), a computer, a personal computer (PC) and/or the like. Furthermore, as used herein, the term "code" shall include and be used to refer to any one or more of program code, software, integrated circuits, read-only memory (ROM), and/or the like, effective for instructing the data processor how to perform such functions. Still further, it is considered that the design, development, and implementation details of all such code would be apparent to a person having ordinary skill in the art based upon a review of the present description of the invention.

For the purposes of discussion and explanation, as used herein, the term "quantitative data" refers to "hard" data that is used for ordering a product, and would thus include information such as a SKU number (e.g., 33455), the product's description (e.g., Nature's Peanut Butter), units per case (e.g., 12), unit label (e.g., 15 oz. jar), price (e.g., $1.56), a start time point for which the price is effective (and perhaps an end time point as well), and the like. The term "qualitative data" is used herein to refer to "soft" data, such as a product's ingredients, nutritional information (e.g., serving sizes, calories, fat grams and the like), packaging information, an expanded product description, characteristics (e.g., organic, genetically modified, kosher, and the like), an image of the product, and the like. Qualitative information may also include intangible characteristics such as, for example, the type of workforce employed by a manufacturer (e.g., local versus international), wage levels paid to workers (e.g., below or above living wage levels), the ownership structure of a company (e.g., small family-owned versus large public company), methods of production (e.g., sustainable vs. non-sustainable), specific countries of origin of the product or the ingredients to the product, and the like.

The term "unit" in the context of retail products preferably refers to the smallest indivisible package (e.g., a bag of cereal, can of tomatoes, bottle of ketchup, and the like) that may be sold from a retail outlet such as, for example, a grocery store. The terms "case", "caselot", "case lot", or "case load" may be used interchangeably, and are used herein to indicate a bulk quantity of units of a given product as it is preferably shipped in bulk to a retail business or to a buying club. Therefore, as used herein, the terms "case", "caselot", "case lot", or "case load" preferably designate a bulk quantity increment.

The physical container for some products may be a pallet of goods, a truck load, a railroad car, container, bargelot, or shipload, but most typically will be a cardboard carton containing a pre-defined quantity of units of a product such as 12, 24, 30, or 144 units. In consumer packaged goods, typically these are sized by volume and weight to conveniently fit in a carton that can be easily lifted by an average individual person and is conveniently stocked by a retail outlet. For bulk markets such as grains or cargo, these are often defined by the barge lot, container, or rail car.

For many products offered by suppliers, unless a sufficient quantity of units are ordered to achieve at least one case, an order for a product is not typically filled by the supplier. In some instances, a certain minimum quantity of units are required to achieve one or more price discounts for that product with break points which are preferably set at case quantities of units. It should also be understood that, for those instances when only a pre-defined number of units (such as a case) of a product may be purchased, and buyers in the aggregate order such pre-defined number of units of a product (even in excess of say a single case quantity of units), then only the integer multiples of the pre-defined number of units that exactly achieve the pre-defined quantity increments for the group of buyers will create a valid order quantity. For example, to satisfy members with an aggregated preferred order quantity of 17 units, when the case quantity for ordering that product is 12 units, requires that the aggregated order must either be decreased by 5 units to 12 or increased by 7 units to 24 to achieve a valid order quantity that can satisfy those members. Where a product is sold by the case (or caselot, case lot, caseload, case load quantity of units and the like) then any integer multiple of the number of units in a case designates a "valid order quantity" for that product.

Some products are available on a unit (also known as "each") basis and thus a cases minimum is not a restriction on placing orders for these products, although a price break is typically offered for a case quantity of units that are ordered for a product, as compared to the price when the product is sold by the unit (or each). Where both cases and unit quantities of a product are sold, purchasing only unit quantities typically results in significantly higher prices than when purchasing a case quantity of units of that product. Where a product is sold by both the unit and by a larger quantity such as a case in which a case achieves one or more price breaks at one or more breakpoints of unit quantities, then valid order quantities are preferably defined as those quantities of units which, when ordered, obtain a price break for that product, although an order may be able to be filled by a supplier for any quantity of units since the product is available in units. For example, it is possible that price breaks might be offered for more than one quantity increment of units such as 1-3, 4-6, 7-9, and 10-12. In such an instance, the valid order quantities are preferably 4, 7, and 10 as, at each of these increased quantities of units, a further price break (discount) is offered, although an order for 1 unit may nonetheless be validly submitted to the supplier.

The terms "product" and "SKU" may be used interchangeably, each referring to a specific product that may be ordered by a buyer. "Product" preferably refers to a brief narrative description such as "Corn Flakes" or "Pinto Beans". As is generally known, SKU (Stock Keeping Unit) is, or refers to, a multi-digit number associated with a product for inventory purposes and is unique for each product of a supplier. As noted above, the acceptable quantity of a product that is required either to enable a purchase of a product and/or to achieve a price discount is termed a "valid order quantity". If a product is only sold by the case, and a case is 12 units, then a valid order quantity must consist of 12, 24, 36, or any other integer multiple of 12 units. A valid order quantity thus includes a case, case lot, caselot, case load, and caseload as well as integer multiples of cases.

It is also noted that many suppliers of goods at the wholesale level impose a minimum total dollar order requirement per order and perhaps a minimum frequency for orders (such as once per month). To make it easier to reach the minimum dollar order or frequency, or to achieve the case requirement for a given product for a given buying club, a buying club may elect to collaborate with at least one additional buying club to aggregate and optimize orders across all buyers of the group of collaborating buying clubs, provided that the collaborating clubs are preferably using a common supplier, common supplier cutoff date/time, common supplier product credit request cutoff date/time, and common delivery point when placing their collective aggregated order. This collaboration of buying clubs as a group can better achieve the minimum dollar requirement and perhaps gain further volume to achieve greater volume price discounts by increasing the total dollar amount of their order. In addition, the more buyers who participate in an order cycle, the greater the probability that valid order quantities will be achieved for buyers for each product, when those products are available only by the case. Such collaboration may also help achieve greater quantities of units to achieve successively higher price breaks for the higher quantities of orders of a given product.

Referring to FIG. 1 of the drawings, the reference numeral 100 generally designates a network system embodying features of the present invention. The system 100 comprises a communication network 102, such as a wide area network (WAN), the Internet, an intranet, a virtual private network (VPN), and the like, effective for effectuating data communications between data processors. The network 102 is coupled to each of one or more groups of buyers, referred to herein as buying clubs 104, which may optionally be organized into one or more buying club groups 105, via a plurality of terminals 109, each of which terminals comprises at least one data processor (not shown) with input and/or output capabilities.

The buying club 104 is also referred to as a "food coop", "food club", "buyer group", "buying group", and the like. A buying club is defined herein to refer to a collection of buyers 107, which includes a Buyer Coordinator 107'. A buying club is also referred to as a customer, and buying club and customer as defined herein also preferably include retailers or distributors who use the system 100 for making purchases from suppliers 128. Buyers 107 are also referred to as "members" or "consumers", and associate together to purchase products which are aggregated into a collective order (also referred to as a "coop order" or "aggregate order" and sometimes referred to as an "order cycle"), and receive a shipment of the collective order delivered to, or retrievable within, a geographic area accessible by all the buyers of the buying club. Because buyers are effectively associated together for the common purchase, they are often referred to as members, whether or not a membership fee is assessed by the club. The buyers 107 are preferably attendant to a respective input node of a terminal 109, and may place orders, revise orders, and/or obtain other information relative to orders and the club, as discussed in further detail below.

In a preferred embodiment, at least one buyer 107 of each buying club 104 assumes a role as a Buyer Coordinator 107' designated herein as a Buyer Coordinator, or "BC," 107' to handle and manage functional aspects of the invention, such as the order, payment, delivery, pickup and storage of products. A Buyer Coordinator 107' is often both the coordinator of the club and an actual buyer of products of the buying club 104 in which they fill the coordinating role. It is noted that there is no inherent reason why a Buyer Coordinator 107' cannot coordinate more than one buying club 104, although it is not presented as such in FIG. 1.

As discussed further below, the buying clubs 104 preferably have access to, control, or own a delivery point 106 where purchased goods are delivered, a pickup site 108 where goods are picked up by consumers, and inventory (not depicted but information related to which is preferably stored in databases 124) representing surplus goods that were prior purchased for consumption or re-use. The delivery point 106, pickup site 108, and/or location of the physical inventory may be one and the same location as may occur if a retailer were the Buyer Coordinator of a buying club. There is no prohibition, and in fact several advantages to a retailer acting as the buyer coordinator 107 of buying club 104. Although only two buying clubs 104 are presented in FIG. 1, it is understood that any number of buying clubs 104 may be encompassed by the system 100, or in one or more buying club groups 105.

A web server 120 is also coupled to the network 102, and one or more suppliers 128 are coupled to the network 102 for providing product data and other information to the web server 120, for use in, by way of example, a Master Catalogue 240, described further below with respect to FIG. 2. The suppliers 128 preferably comprise one or more of producers (e.g., farmers, growers, ranchers, and the like) 130, manufacturers 132, product distributors 134, retailers 136, and/or the like. If the retailer is acting as a supplier, then effectively the retailer will preferably assume some or all functions of the buyer coordinator 107'.

The web server 120 preferably comprises one or more computers coupled to the network 102. If the web server 120 comprises multiple computers, then the multiple computers may be grouped using web server management technologies (such as clustering, network load balancing, and the like) to effectuate more efficient and/or properly-scaled processing. The web server 120 is preferably operated and maintained by a system operator ("SYSOP") 122 or, alternatively, by a third party, such as a middleman/hosting entity 126 and/or a supplier 128, and is effective for facilitating data communication and processing of information for buyers 107 of the buying clubs 104, the middleman/hosting entity 126, and the suppliers 128 so that a number of functions may be managed by the web server 120 as discussed further below. Functions of a web server 120 preferably include online data storage in various electronic media formats (such as a hard drive, mirrored storage drive, random access memory, RAID, and the like), data intensive calculation and processing, off-line backup of data, network communication, execution of software programs, storage of final and intermediate calculations and data, and communications by various modalities between any number of buying clubs, producers, manufacturers, distributors, retailers, buyers, suppliers, warehouses, system operators, middlemen/hosting entities, or other parties that may access or utilize the system 100.

One or more databases 124 are preferably coupled to the web server 120 for facilitating storage of data and processing which must be performed by the server 120. The web server 120 and databases 124 preferably include substantially all data and information which is necessary to perform the functions and processes required by the system 100 in accordance with the present invention.

The middleman/hosting entity 126, preferably comprises an agent, broker, franchisee, or the like, or alternatively, may be a supplier 128 (e.g., a retailer 136, distributor 134, manufacturer 132, or producer 130 as alternative embodiments). Furthermore, the middleman/hosting entity 126 preferably includes a computer or other data input and/or output device coupled to the network 102 and to the web server 120, as discussed further below. The middleman/hosting entity 126 may also perform the same activities as a Buyer Coordinator 107' in buying clubs 104. Hence, the middleman or hosting entity 126 may alternatively be replaced or supplemented in one or more selected functions, or even in all functions, by one or more of a Buyer Coordinator 107', retailer 136, distributor 134, manufacturer 132, producer 130, or by another middleman 126 (e.g., broker, agent, or franchisee). It is noted that the middleman/hosting entity 126 may be coupled to the web server 120 either directly (bypassing the network 102), or indirectly via the network 102. For example, a direct connection to the web server 120 may be preferred for any supplier 128 (e.g., producers 130, manufacturers 132, distributors 134, or retailers 136) that is also acting as middleman or hosting entity for a number of their own buying clubs.

It should be appreciated that the system 100, including the web server 120, thus provides a "front end" real time, on-line order aggregation and optimization capability which can meet the needs of virtually any number of buying clubs 104, which are either purchasing, or desiring to purchase, products from any supplier 128, whether a producer 130, manufacturer 132, distributor 134, or retailer 136. The system 100, including the web server 120, thus preferably serves one or more buying clubs 104, or buying club groups 105, whether the system is implemented by a supplier 128, a retailer 136, middleman/hosting entity 126, or an independent third party.

Databases

As discussed above, it is advantageous for buying clubs 104, comprising a number of buyers 107, to be able to purchase products from any one or more of a number of suppliers 128 that may operate at any level in the supply chain. To that end, and with reference to FIG. 2, in the operation of the present invention, at a high level, information (e.g., relating to products and pricing) needed for effectuating such purchases is preferably disseminated (i.e., flows) from the suppliers 128, via communications network 102, to a web server 120 in which databases 124 are preferably maintained, including preferably Master Catalogue 240. In addition to supplier 128 communication of their catalogue data to web server 120, and the Master Catalogue 240 in databases 124, other supplier information is preferably communicated to web server 120 and stored in databases 124 includes shipping schedules, delivery points and areas, truck routes, supplier inventory, messages, notices, customers, order requirements, customer types, pricing structures, orders, invoices, payments, credits and other data relevant for a supplier servicing buying clubs 104. Thus a wide range of relevant data is preferably communicated to and from web server 120 via communications network 102 and stored in databases 124 by suppliers 128.

From databases 124 and web server 120, information is preferably disseminated and received (i.e., flows), via communications network 102, to and from one or more computers (not shown) at one or more buying clubs 104 (exemplified in FIG. 2 by an independent buying club 250, a retailer buying club 260, and a supplier buying club 270) and, ultimately, to individual buyers 107. Thus, preferably all the relevant product and other information available from suppliers 128 is available through web server 120 and databases 124 to the buying clubs 104 and buyers 107 utilizing suppliers 128 via communications network 102. Supplier information in databases 124 is preferably maintained in real-time through on-line real time integration or periodic or batch updates to and from web server 120.

In addition to supplier information, information related to buying clubs 104 with respect to club inventory, supplier pricing, member catalogue, membership, messages, notices, orders, payments, credits, and the like that are specific to each club are stored in databases 124 on web server 120. Information stored in databases 124 depicted as Club Data 252, 262, and 272 includes the Member Catalogue as re-cast in format for the members and based on the associated data from Master Catalogue 240. All such club information is accessible through communications network 102 to buyers 107 through their membership in their respective clubs using data processor 109.

Figure 2:
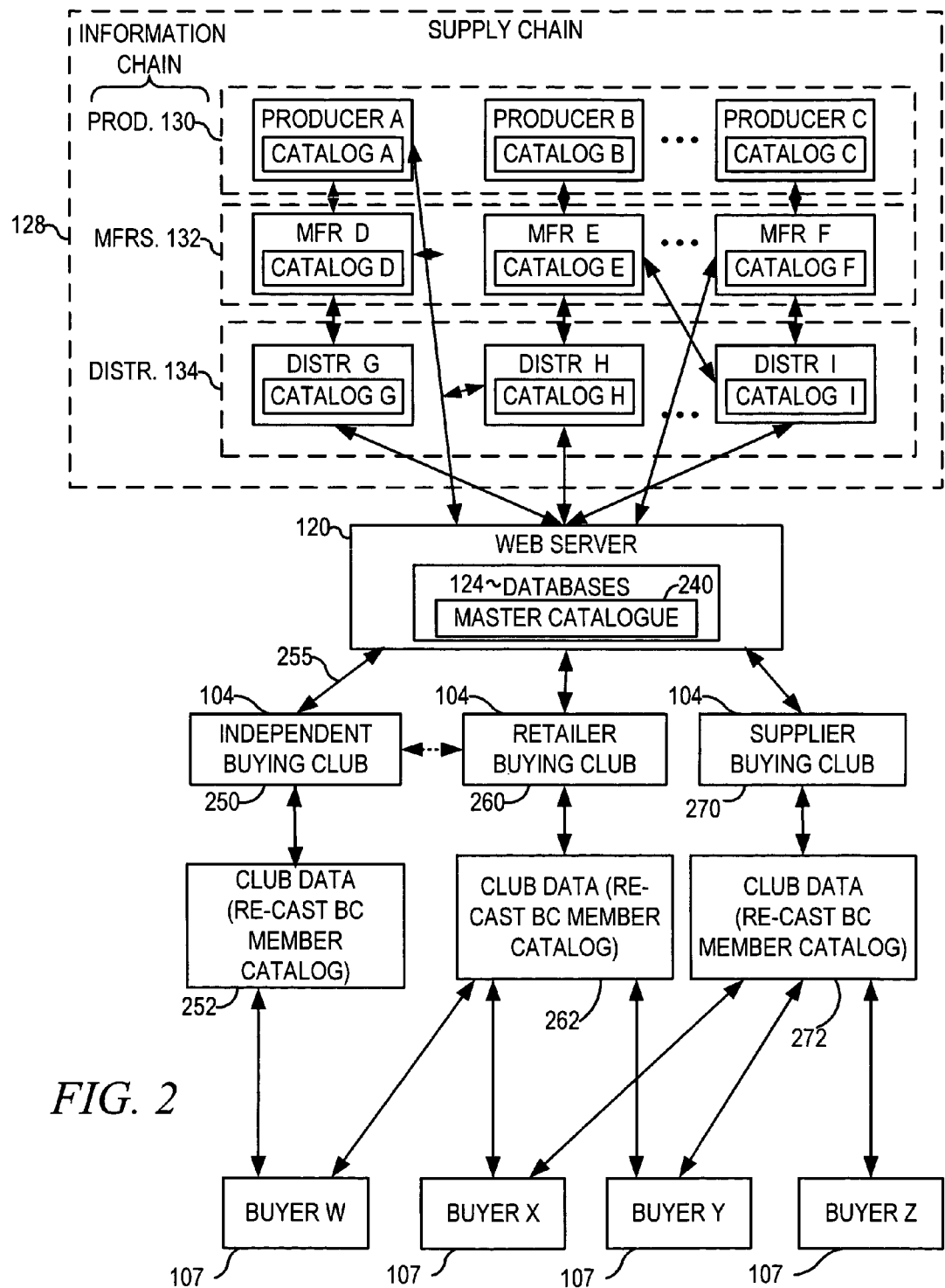
FIG. 2 exemplifies logical data relationships between selected entities of FIG. 1, illustrating the flow of information between supply chain participants, the web server and associated databases (including the Master Catalogue) and buying clubs and buyers.

As more specifically depicted in FIGS. 1 and 2, the suppliers 128 comprise a level of producers designated collectively by the reference numeral 130, a level of manufacturers designated collectively by the reference numeral 132, a level of distributors designated collectively by the reference numeral 134, and/or a level of retailers designated collectively by the reference numeral 136 (retailers not depicted in FIG. 2). As retailers are most commonly considered not to be part of the supply chain (representing instead the primary outlet for suppliers), retailer 136 is not graphically presented alongside suppliers 128 in FIG. 2. However, if a buying club 104 is managed by a retailer and if a buying club 104 were considered to be an additional step in the product distribution chain, then a retailer may be considered to be part of the supply chain, between the distributor 134 and the web server 120 (FIG. 2) to the buyer, and hence the retailer 136 has been included as a supplier 128 in FIG. 1. For the purpose of presentation hereafter, the retailer 136 will not be assumed to be defined within the supply chain.

As more specifically depicted in FIG. 2, the level of producers 130 comprises a number of individual producers, three of which are exemplified as a Producer A, a Producer B, and a Producer C, which represent the earliest stage of a product's inception, and thus the most fundamental level at which information about a product is generated. The level of producers 130 may provide information related to its respective products to each of the levels of manufacturers 132, distributors 134, and Master Catalogue 240. The Master Catalogue 240 is accessed by any of buying clubs 104 and their respective buyers 107.

Each supplier 128 provides a supplier catalogue of information which, by way of example, preferably includes, for each product offered by a respective supplier, the product's SKU (or SKUs), units per case, unit label, price, and occasionally a minimum order quantity. Such supplier catalogues will preferably include information pertaining to tiers that are hierarchical (e.g., grocery>>baked goods>>cakes>>vender name>>product name), using supplier specific classifications of products that make product identification and searches for products offered by that respective supplier 128 expeditious for purchasers (e.g., buyers 107). As noted above, suppliers 128 preferably specify what number of units are required to constitute a case or that may obtain more favorable pricing for a product. It has also been noted that suppliers 128 use diverse data structures in selling their products and that buying clubs 104 are benefited from purchasing from a number of different suppliers 128. To facilitate such product purchase from multiple buying clubs 104, the Master Catalogue 240 is configured, as discussed in further detail below, to accommodate each data structure encompassed by the various products in the product catalogues of the suppliers 128 for access by buying clubs 104. The ability of the Master Catalogue 240 to accommodate diverse data structures is fundamental to enable order aggregation and optimization functions of buying clubs 104 to be performed accurately.

As may be appreciated from FIG. 2, the buying clubs 104, such as the buying clubs 250, 260, and 270, and buyers 107 are only able to source (i.e., purchase) products provided that the data for the products is stored in formats that may be aggregated and optimized, and then readily accessible from, the Master Catalogue 240. Therefore, in accordance with principles of the present invention, data from supplier catalogues of levels 130, 132, 134, and 136 is stored in the Master Catalogue 240 utilizing diverse data structures. Because of this suppliers 128 of different levels, whether producers 130, manufacturers 132, distributors 134, or retailers 136 can utilize the invention to add their own catalogues and upload each of their own specific catalogue information into the Master Catalogue 240 with great flexibility with respect to the data structures employed for skus in the suppliers' own catalogues. Furthermore, buying clubs 104 and buyers 107 may also access the Master Catalogue 240 for the purpose of obtaining information on products offered by the suppliers 128 at each of levels 130, 132, 134, and 136.

Figure 3:
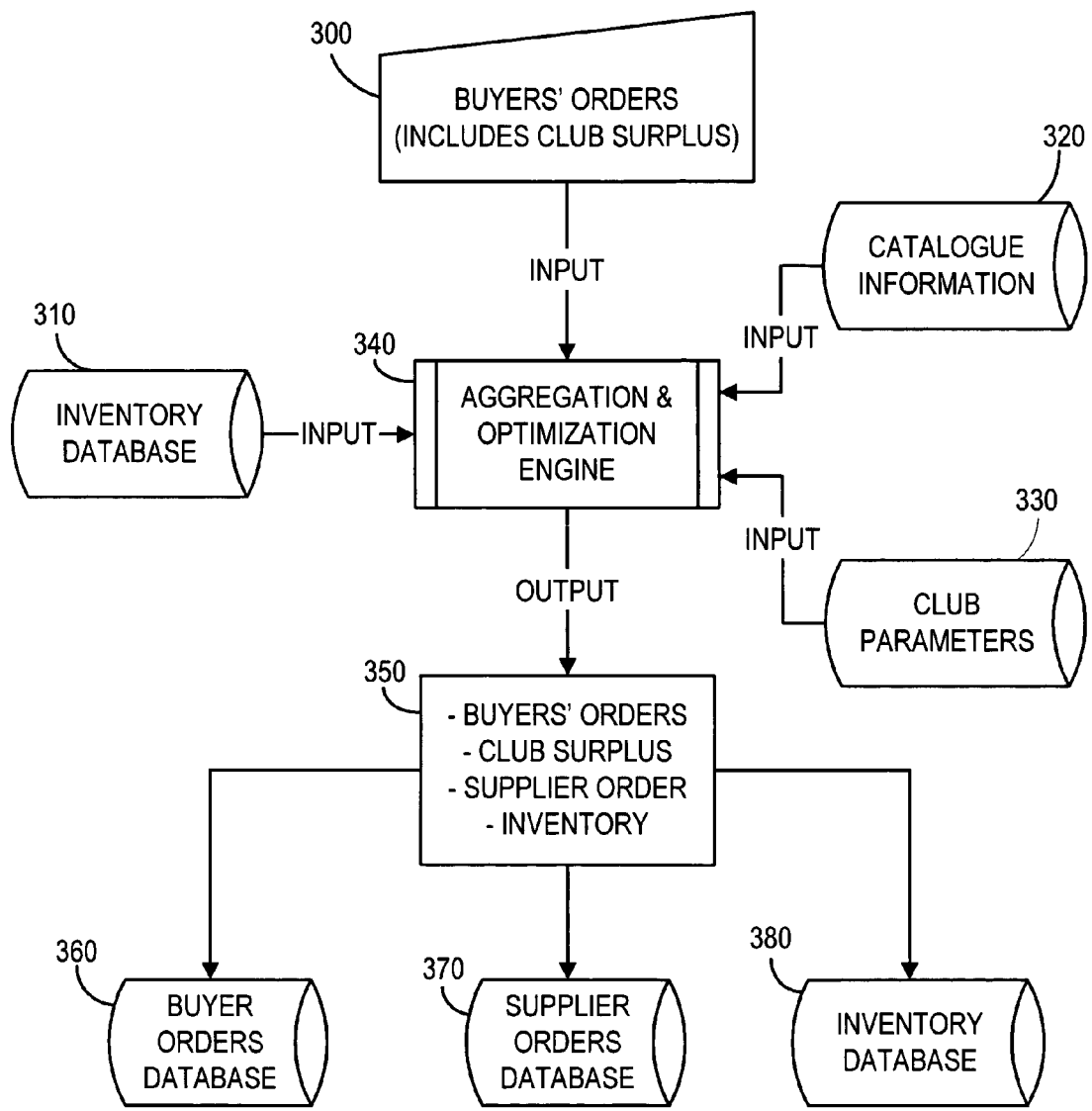
FIG. 3 is a high level flow diagram illustrating the flow of data based on inputs from the data sources of buyer orders, catalogue, club parameters, and inventory database through the aggregation, optimization, allocation, and pricing engine to the supplier orders database, buyer orders database, and inventory database.

At its core, system 100 will aggregate, optimize, allocate and price orders for members and a preferred mode for achieving this is described in the remaining sections below. FIG. 3 describes the broad flow of data under which a preferred outcome may be generated for buyers of buying club 104 for products. The summation of the preferred outcomes for the products is then preferably combined with the other preferred outcomes for other products to create a coop order (also called a composite order or a coop order) for submission to the supplier. As noted before, usually buyers will place orders for a number of products, which then will all be combined with all orders accumulated during that time period into the coop order for placement with the supplier. If there happen to be two suppliers for a coop order, then each one would receive their own coop order for the products that are supplied by them.

Referring to FIG. 3, Buyers' Orders 300, Inventory Database 310, Catalogue Information 320, and Club Parameters 330 comprise input data sets which are processed by an algorithm in Aggregation & Optimization Engine 340, to generate the output of the actual buyers' orders, club surplus, supplier order, and inventory 350, and these results are then stored in Buyer Orders Database 360, Supplier Orders Database 370 and Inventory Database 380. Each of these input data sets will be described next.

Buyers' Orders

In Buyers' Orders 300, at least two buyers place orders for the given specific product, and included in the buyers' orders will preferably be any Club Surplus that has been ordered for the buying club for that coop order. Therefore, the buyer coordinator may input preferences for the Club Surplus account. As noted from the Inventory patent application and the Buying Club patent application, buyer's may include members of a club, non-members of a club, and in the event of a Multi-Club Purchase, buyers consist of all buyers of all clubs participating in the MCP. Preferably, buyer's place orders for a product by inputting a minimum, preferred, and maximum quantity of units. The actual number of units ordered for a member based on the optimization algorithm will preferably lie somewhere equal to or greater than a minimum number of units and less than or equal to a maximum number of units and possibly exactly equal to the preferred number of units that are ordered by each member.

Although minimum, preferred, and maximum input fields are the preferred fields enabling optimization to occur, other input combinations may also be utilized. The following table depicts, by way of example only, and without limitation, variations of seven alternative combinations of preferred ("pref"), minimum ("min"), and maximum ("max") quantities that a buyer may enter, and how each entry variation may be utilized by the system 100 to use or generate minimum, preferred, and maximum quantities of units for performing allocation calculations:

| BUYER ENTERS QUANTITIES FOR | SYSTEM USES OR GENERATES QUANTITIES EQUAL TO | | |
| --- | --- | --- | --- |
| | MINIMUM | PREFERRED | MAXIMUM |
| pref only | 0 | pref | pref |
| min only | min | min | min + caselot units-1 |
| max only | 0 | max | max |
| min & max | min | (min + max)/2 | max |
| pref & min | min | pref | min + caselot units-1 |
| pref & max | 0 | pref | max |
| pref & min & max | min | pref | max |

Alternatively, a buyer may specify a preferred quantity of units and allow for an absolute integer deviation increase or decrease or both. For example, a preferred (or prior ordered) choice of 7 units with a specified minimum quantity of 5 units and a specified maximum quantity of 10 units may be presented as a preferred (or prior ordered) quantity choice of 7 units, with a willingness to accept 2 units less (equaling the 5 unit minimum) and 3 units more (equaling the 10 unit maximum).

Similarly, the buyer may specify a preferred quantity of units and allow for a percentage deviation increase or decrease, to a rounded integer of units. For example, in the above preferred choice of 7 units with a minimum of 5 units and a maximum of 10 units, a willingness to reduce the order by 30% (or 2.1 units) with rounding achieves the 2 unit reduction to 5 units (the minimum) and a willingness to increase the order by 40% (or 2.8 units) with rounding achieves a 3 unit increase to 10 units (the maximum).

The buyer coordinator may also establish an acceptable deviation as a whole that would then apply to each buyer of that group placing an order (perhaps up to some predefined quantity limit by buyers under a "the lesser of" structure, described further below). The buyer coordinator may then determine that deviations should be required for the product, or required for the buyer, or a combination of these two. For example, a required deviation for buyers in a group might be, "To place orders through this group we require up to a 3 unit (increase or decrease) deviation on each product ordered". A deviation required by the group for a product might be constructed as, "We require up to a 3 unit (increase or decrease) deviation for any orders placed for this product". A combination approach might also be employed, e.g., an across-the-board 1 unit minimum deviation requirement per buyer order on all products, with certain products requiring some greater deviation established specifically for those products.

As may be noted from the above discussion, there are a number of techniques that may be employed to establish acceptable variations for a quantity of ordered units of a product for Members' Orders 300. For purposes of illustrating a preferable method for a buyer to specify a variation in the system 100, the examples cited herein will preferably illustrate an offered opportunity for each buyer placing an order to specify a minimum quantity of units, a preferred quantity of units, and a maximum quantity of units so as to obtain in the final outcome a selection which is optimal based on their selection.

The purpose of allowing buyers to enter units is to provide buyers with an actual order of units that is as close as possible to the exact quantities that are desired by members. However, buyers may desire to purchase a case (or more than one case) exactly, and they may not want that order for that case (or more than one case) to be sub-divided (also known as "split") among other buyers. If this is desired, then the buyer must input the exact quantity of units for the product that will equal one or more cases, and also will preferably designate that the buyer does not want the case that is being ordered to be split, but rather wishes to receive only the full case or cases.

It is also disclosed that it may be particularly advantageous to the buyer coordinator to order, on behalf of the Club Surplus, a minimum of 0 units and a maximum of some number of units that is equal to or less than the case number of units. By doing this, the buyer coordinator increases the likelihood that a valid order of a case quantity of units will be achieved and the buyers who have ordered the product will thus receive the product. In the example of a retailer that is operating a buying club, it may be particularly advantageous for a pre-programmed number of units to be automatically ordered for Club Surplus in a 0 MIN and X number MAX, wherein X is determined by the retailer's own separate calculations for re-order which may be established as part of an economic order quantity "EOQ" calculation performed by the retailer.

It should also be noted that the buyer coordinator preferably also has the right to declare that certain products will only be acceptable to order in full cases. Thus there is not an option to split cases for the buying club on this product and thus even if a member is willing to split a case, the buyer coordinator has overridden this determination and declared that the orders for this product may not be split. A product that is deemed not to be split by either the buyer coordinator or the buyers is termed "non-splittable". So the preferable decision rule for a case to be able to be split among buyers is that both the buyer coordinator and the buyers have to be willing to split the case.

Inventory Database

Inventory Database 310 is comprised of the inventory of the club. In the event of a Multi-Club Purchase, then the inventory also includes each clubs' inventory that is offered and accepted for the MCP as is described in the Buying Club patent application and the Supplier patent application. As noted in the Inventory patent application, inventory for buying clubs may be defined in one phase as being stored products capable of being resold or consumed by buyers. However, inventory in the buying club context as described therein preferentially falls into four phases, the last phase being derived from the first three phases. The first phase is on-hand inventory, which is defined as inventory that is physically stored at the seller's premises. The second phase is on-order inventory, which is defined as inventory that has been ordered but has not yet been received from the supplier. As discussed further below, on-order inventory is preferably created by orders placed for the Club Surplus account, which are products ordered by the buying club itself, as opposed to a member of the buying club.

The third phase is committed inventory, which is the inventory that is committed to be purchased but has not yet been picked up by buyers. The last phase is the available inventory. Available inventory is derived from on-hand, ordered, and committed inventory. The formula is, on-hand inventory plus on-order inventory less committed inventory equals available inventory. This can be presented as follows:

available=on-hand+ordered−committed

As noted in the Inventory patent application, the buyer coordinator may also elect to include a discount to the price so that the inventory may be preferentially priced versus the prices for products obtainable through the catalogue and thus from the supplier(s). The discount may be based on either a percentage or an absolute amount per unit below the catalogue member price for the product. By doing this, the buyer coordinator may effectively promote the sale of the inventory to buyers. If a discount is selected, then that discount is entered in Inventory Database 310. The buyer coordinator may also designate certain lots of skus that are stored in cases as non-splittable. When a lot is designated as non-splittable, then the units per case size of that lot are the units per case that are preferably stipulated at the time that the lot is designated as non-splittable. The ability for the buyer coordinator to specify inventory as non-splittable is presented in further detail in the Inventory patent application.

Catalogue Information

Each product ordered by buyers will have associated information that is provided by Catalogue Information 320. This product information is provided by the supplier to each customer as is noted in the '097 patent application, and may be provided by the process as noted in the Supplier and Buying Club patent applications. As further noted in the in the Buying Club patent application, certain information provided in the supplier's catalogue may be further modified and adjusted (termed "re-cast") as desired by the buyer coordinator to present to buyer's in the form that is best suited to the needs of the buyer's, as determined by the buyer coordinator.

Product information provided by the Catalogue Information 320 preferably includes but is not limited to, the SKU, product description, units per case, unit label, a buyer price, and sometimes a minimum order quantity. As disclosed in Buying Club patent application, the buyer price may be derived from the supplier price obtained from the supplier's catalogue, which is preferably obtained by means disclosed in the Supplier and Buying Club patent applications.

In order to be able to service a number of buying clubs that will source products from multiple suppliers, it is necessary for the Catalogue Information 320 to be able to process products utilizing each data structure encompassed by the various products in the product catalogues of each supplier to the buying clubs. The ability of Catalogue Information 320 to handle diverse data structures is fundamental to allowing aggregation and optimization functions of buyers' orders for products to be performed accurately.

Described below, by way of example and not limitation, are three data structures (Data Structures are abbreviated as DS; e.g., DS-1, DS-2, DS-3) typically used by suppliers 128 to quantify information needed for aggregating and optimizing the placement of collective orders of buyers 107 of buying clubs 104. Each of these data structures are preferably included in Catalogue Information 320. To illustrate an application with consumer goods, products are exemplified as common food and consumable items. These data structures include some of the more common relationships under which suppliers provide SKUs, units per case, unit label, minimum order quantity, and price information for a product.

DS-1: Same Product Sold by One or More SKU Numbers

This structure illustrates that a single product may be sold under one SKU as a single product, and also by different SKUs wherein each of the different SKUs encompass a difference in the units per case. This data structure thus includes products either sold by units only or where a single SKU is sold only by the case. It also includes multiple SKUs for the same product where these are each comprised of different numbers of units per case. Examples of these structures are noted below.

The first example below shows a single unit of SKU 22345, Organic Apple Shampoo, with a single unit price for the purchase. This is the simplest structure offered by a supplier. As may be noted by the second SKU listed, this structure may also include a minimum order quantity (e.g., 4 in this example) as shown for SKU 22667, Natural Apple Cider.

| SKU | Description | Units Per Case | Minimum Order Quantity | Unit Label | Unit Price |
|---|---|---|---|---|---|
| 22345 | Organic Apple Shampoo | 1 | n/m | 12 oz. | $1.23 |
| 22667 | Natural Apple Cider | 1 | 4 | 6 oz. | $2.34 |

The following example illustrates a single product under a single SKU that must be purchased in cases only. Therefore, 12 units, or any integer multiple thereof (such as 24, 36 48 and so on), are required for a buying club to purchase SKU 4456 by the supplier. Each unit is a single 15 oz. can or jar of Eden Pizza sauce, as noted by the unit label.

| SKU | Description | Units Per Case | Unit Label | Case Price | Unit Price |
|---|---|---|---|---|---|
| 4456 | Eden Pizza Sauce | 12 | 15 oz. | $13.95 | $0.93 |

The next example below illustrates a number of SKUs of different units per case, all for the same product.

| SKU | Description | Units Per Case | Unit Label | Case Price | Unit Price |
|---|---|---|---|---|---|
| 344560 | Oats Rolled Quick OG1 | 1 | Lb. | $1.99 | $1.99 |
| 344390 | Oats Rolled Quick OG1 | 10 | Lb. | $15.02 | $1.51 |
| 173815 | Oats Rolled Quick OG1 | 25 | Lb. | $28.62 | $1.15 |
| 334565 | Oats Rolled Quick OG1 | 50 | Lb. | $45.00 | $0.90 |

It should be noted that the example directly above, which shows a number of related SKUs, offers material price benefits to buyers of clubs that can achieve larger quantity purchases AND can also equal the supplier's specific quantity requirement of 50 lbs. A family of 5 persons purchasing this product can reduce their per unit cost of food by over 50%, which can be a material cost savings when applied to the overall food budget. A minimum order quantity for any SKU may be stipulated under this structure as well. The minimum order quantity would commonly be associated with the smallest units per case and set a lower bound on the number of units that are sold by the supplier.

DS-2: One SKU—Multiple Cases

This structure delineates a single product that is sold under one SKU but is offered in that one SKU at different unit quantities and (virtually always) at different prices. An example follows below.

| SKU | Description | Units Per Case | Minimum Order Quantity (MOQ) | Unit Label | Case Price | Unit Price |
|---|---|---|---|---|---|---|
| TTO-26310 | Tea Tree Oil | 1 | 5 | oz. | $0.96 | $0.96 |
| | | 25 | | oz. | $20.75 | $0.83 |
| | | 50 | | oz. | $34.43 | $0.69 |

A minimum order quantity may also be included in this data structure as well. For example, the supplier of TTO-26310 above requires purchase of a minimum of 5 of the 1 oz. size in order to fulfill the order.

DS-3: One SKU—Ranges for Price Breakpoints

This structure reflects a single SKU sold whereby a range of units leads to a discount on prices where the units purchased achieve the higher quantities. The table below shows an example of this structure. While there is not intended to be a limit to the number of ranges, although only 3 are shown (1-3, 4-6, and 7-9).

| | | Unit | Price Per Unit | | |
|---|---|---|---|---|---|
| SKU | Description | Label | 1-3 units | 4-6 units | 7-9 units |
| 640-AAR | Rhubarb Root | lb. | $7.20 | $7.00 | $6.85 |

Unit Label Adjustor

The unit label may not always be identical across related SKUs. As presented above, both DS-1 and DS-2 provide examples of a single product that is sold in different units per case increments, but for each product there is a common unit label for the individual product. However, it is also possible (but much less common) for a product to have divergent unit labels. This preferably creates a need for an additional field to allow adjustments of quantities to a standard units per case measure for those clubs that wish to sell by a common smaller divisible unit for each product of a divergent unit label. An example of the different unit label as applied to a single product sold by different SKUs follows next below.

| SKU | Description | Units Per Case | Unit Label | Unit Label Adjustor (ULA) | Case Price | Unit Price* |
|---|---|---|---|---|---|---|
| 544561 | Nature's Raisins | 1 | 4 Lb. | 12 | $4.00 | $4.00 |
| 644393 | Nature's Raisins | 10 | 12 Lb. | 4 | $35.00 | $3.50 |
| 773815 | Nature's Raisins | 25 | 48 Lb. | 1 | $28.62 | $1.15 |

For a buying club that wishes to access a supplier using the above data structure, but wishes to sell to its buyers in pounds, a unit label adjustor (ULA) may be added to the above. The ULA records that 1 of SKU 773815 equals 4 of SKU 644393 and it may record too that 1 of SKU 773815 equals 12 of SKU 544561. The ULA thus provides information that a Buying Club preferably would use for aggregation and optimization purposes when the unit label varies in the data structure of a product and the product is to be optimized to a smaller divisible unit than communicated by the unit label. Alternatively, the same result may also be achieved by ascribing further granularity to the unit label (for example by delimiting 4 lb. as one field of 4 and another field of lb.). While feasible, this alternative approach is not believed to be the best mode of the invention, primarily due to the rare evidence of different unit labels when selling the same product as well as the extra system and user overhead that would be associated with the processing of the vast majority of products which are sold under common unit labels.

Random Weight (Also Called Fractional Weight)

The units in which a product is sold may not always be integers. An attribute that may be associated with a data structure is the capability of sale of the product by random weight (also sometimes called fractional weight). To allow for this, the units that may be ordered by buyers may be any number carried to two decimal places such as 0.50, or 2.63 (or alternatively presented as fractions ½ or 2⅝). One common example of this is for products most commonly falling in the categories of Bulk (such as grains), dairy (as for example cheeses), or produce (where a high valued product may be sold in portions of a pound). In the table noted below, SKU 453476 is noted as carrying a random weight designation with units per case of 5.00 pounds. Therefore, the supplier sells this product in 5.00 lb increments, but one may receive a variation of the quantity actually delivered such as 4.95 lbs or 5.12 lbs. The ability to accept random weight designations is encompassed under the diverse data structures described by the invention. Although presented as two decimal places only for this preferred embodiment, the actual number of decimal places may be as is appropriate to suit the specific need. It should be noted that a preferable means of running calculations on random weight inputs is to multiply by 100 for 2 digits (that is change 2.56 to 256) and run on calculations on integers, and then divide by 100 (that is change 323 to 3.23) when presenting and storing the output.

The Catalogue Information 320 is stored in a database and this is partially represented by a table presented below which incorporates the information on the above data structures. In the table below, the leftmost column is called the key, and uniquely identifies each row of the table. Catalogue Information 320, although utilizing the same SKU as provided by the supplier, has created this separate field to ensure that each SKU is separate and distinct from each other SKU to prevent incorrect cross references when two suppliers might happen to choose identical SKU numbers. (Alternatively this level of granularity may be achieved by concatenation of a unique supplier number and the SKU number of the supplier).

For purposes of grouping related products under these diverse structures, it is preferable for a unique number to be established which denotes each related set of SKUs across which aggregations and optimizations may be run. This described as a set, and is the next (second) column, representing the number of rows across which aggregations and optimizations may be achieved for a given product. Each set is preferably associated with a supplier, although this may vary depending on how the database is designed, as is apparent to one of ordinary skill in the art.

The next columns represent commonly understood attributes of product data sets, and are the SKU and product description. The fifth column is the units per case, which is of major importance in optimization calculations. The sixth column is the unit label, which defines of what a single unit is comprised. The seventh column represents the Unit Label Adjuster, which is only used when needed to equalize units per case among SKUs of a set that have different unit labels. Set 6 illustrates an example of how the ULA may be utilized in this table. The remaining columns of the table include the case price, unit price, and MOQ, as have been described above. The very last row of this table, Farmer's Cheese, (23 in the key column), shows a product that is sold by random weight and accordingly the units per case are carried to two decimals places, as the relevant number of decimal places for this product.

| Key | Set | SKU | Description | Units Per Case | Unit Label | Unit Label Adjustor | Case Price | Unit Price | MOQ | Buyer Price |
|---|---|---|---|---|---|---|---|---|---|---|
| 1 | 1 | 22345 | Organic App. Sh. | 1 | 12 oz. | n/a | $1.23 | $1.23 | n/a | $1.54 |
| 2 | 2 | 22667 | Natural Apple Cr | 1 | 6 oz. | n/a | $2.34 | $2.34 | 4 | $2.93 |
| 3 | 3 | 4456 | Eden Pizza Sauce | 12 | 15 oz. | n/a | $13.95 | $0.93 | n/a | $1.16 |
| 4 | 4 | 344560 | Oats Rlld. Qk OG1 | 1 | Lb. | n/a | $1.99 | $1.99 | n/a | $2.49 |
| 5 | 4 | 344390 | Oats Rlld. Qk OG1 | 10 | Lb. | n/a | $15.02 | $1.51 | n/a | $1.89 |
| 6 | 4 | 173815 | Oats Rlld. Qk OG1 | 25 | Lb. | n/a | $28.62 | $1.15 | n/a | $1.44 |
| 7 | 4 | 334565 | Oats Rlld. Qk OG1 | 50 | Lb. | n/a | $45.00 | $0.90 | n/a | $1.13 |
| 8 | 5 | TTO-26310 | Tea Tree Oil | 1 | oz. | n/a | $0.96 | $0.96 | 5 | $1.20 |
| 9 | 5 | TTO-26310 | Tea Tree Oil | 25 | oz. | n/a | $20.75 | $0.83 | n/a | $1.04 |
| 10 | 5 | TTO-26310 | Tea Tree Oil | 50 | oz. | n/a | $34.43 | $0.69 | n/a | $0.86 |
| 11 | 6 | 544561 | Nature's Raisins | 1 | 4 Lb. | 12 | $4.00 | $4.00 | n/a | $5.00 |
| 12 | 6 | 644393 | Nature's Raisins | 10 | 12 Lb. | 4 | $35.00 | $3.50 | n/a | $4.38 |
| 13 | 6 | 773815 | Nature's Raisins | 25 | 48 Lb. | 1 | $28.62 | $1.15 | n/a | $1.44 |
| 14 | 7 | 640-AAR | Rhubarb Root | 1 | lb. | n/a | $7.20 | $7.20 | n/a | $9.00 |
| 15 | 7 | 640-AAR | Rhubarb Root | 2 | lb. | n/a | $14.40 | $7.20 | n/a | $9.00 |
| 16 | 7 | 640-AAR | Rhubarb Root | 3 | lb. | n/a | $21.60 | $7.20 | n/a | $9.00 |
| 17 | 7 | 640-AAR | Rhubarb Root | 4 | lb. | n/a | $28.00 | $7.00 | n/a | $8.75 |
| 18 | 7 | 640-AAR | Rhubarb Root | 5 | lb. | n/a | $35.00 | $7.00 | n/a | $8.75 |
| 19 | 7 | 640-AAR | Rhubarb Root | 6 | lb. | n/a | $42.00 | $7.00 | n/a | $8.75 |
| 20 | 7 | 640-AAR | Rhubarb Root | 7 | lb. | n/a | $47.95 | $6.85 | n/a | $8.56 |

-continued

| Key | Set | SKU | Description | Units Per Case | Unit Label | Unit Label Adjustor | Case Price | Unit Price | MOQ | Buyer Price |
|---|---|---|---|---|---|---|---|---|---|---|
| 21 | 7 | 640-AAR | Rhubarb Root | 8 | lb. | n/a | $54.80 | $6.85 | n/a | $8.56 |
| 22 | 7 | 640-AAR | Rhubarb Root | 9 | lb. | n/a | $61.65 | $6.85 | n/a | $8.56 |
| 23 | 8 | 453476 | Farmer's Cheese | 5.00 | lb. | n/a | $5.25 | $1.05 | n/a | $1.31 |

As will become apparent in the presentation and discussion of Aggregation & Optimization Engine 340, the diverse data structures become a key element for obtaining optimal outcomes.

Club Parameters

As will become apparent in the presentation and discussion of Aggregation & Optimization Engine 340, there may be a number of outcomes that satisfy the buyer's goals. A decision will then need to be made as to which of the outcomes is optimal for the buying club. Buyer coordinators may have different criteria for determining what would constitute an optimal outcome for a buying club. Accordingly, the Aggregation & Optimization Engine 340, will need to have a decision rule passed to determine what criterion is preferred for the buying club on which the product optimization is being run. Without in any way limiting the range of criteria under which an optimum selection may be chosen, three criteria are proposed for illustration of the invention.

1. Closest to Preferred Under this criteria, if there are multiple outcomes which all fall within the minimum to maximum ordered units, then the outcome which has the least divergence in units from the total preferred quantities of units ordered by all the buyers is deemed the optimum outcome. If two combinations both have the same difference from the total preferred quantities of units ordered by buyers, then select whichever option has the lowest cost per unit. However, in order to avoid problems of circular logic, it may be necessary to exclude the effects of volume discounts from the cost. Similarly, it may be necessary to exclude the effects of internal price adjustments within the club among the members because different members may have different price adjusting factors.

2. Lowest Buyer Cost Per Unit Under this criteria, if there are multiple outcomes which all fall within the minimum to maximum ordered units, then the outcome which has the lowest dollars per unit cost to the buyers is deemed the optimum outcome. However, in order to avoid problems of circular logic, it may be necessary to exclude the effects of volume discounts from the cost. Similarly, it may be necessary to exclude the effects of internal price adjustments within the club among the members because different members may have different price adjusting factors. If two combinations both have the same lowest dollar cost per unit, then whichever one is the least difference from the total preferred units ordered by buyers is preferably selected.

3. By Combination Under this approach, for each combination satisfying the criteria under either 1 or 2 above, calculate a percentage deviation from the optimum outcome under that criteria. The final outcome that is selected is the optimum choice when both criteria are considered together. This is preferably obtained by selecting the absolute value of the percentage difference under the first criteria and the absolute value of the percentage difference under the second criteria. Then the two absolute values are added together. Preferably, that outcome which has the lowest overall combined percentage difference is deemed to be the optimal outcome.

Aggregation & Optimization Engine

Each time a product is ordered by a buyer or for Club Surplus, as illustrated in FIG. 3, Aggregation & Optimization Engine 340 receives the inputs from all the desired buyers' orders 300 for that product (including Club Surplus), the inventory database 310, the catalogue information 320 and the club parameters 330 and processes these to arrive at a preferable outcome for the quantities which are associated with filled buyers' orders, club surplus, a supplier order, and inventory quantities of units which are updated to buyer orders database 360, supplier orders database 370, and inventory database 380. A preferred process for arriving at that preferable outcome is described herein and illustrated in FIG. 4 through FIG. 10.

Figure 4:
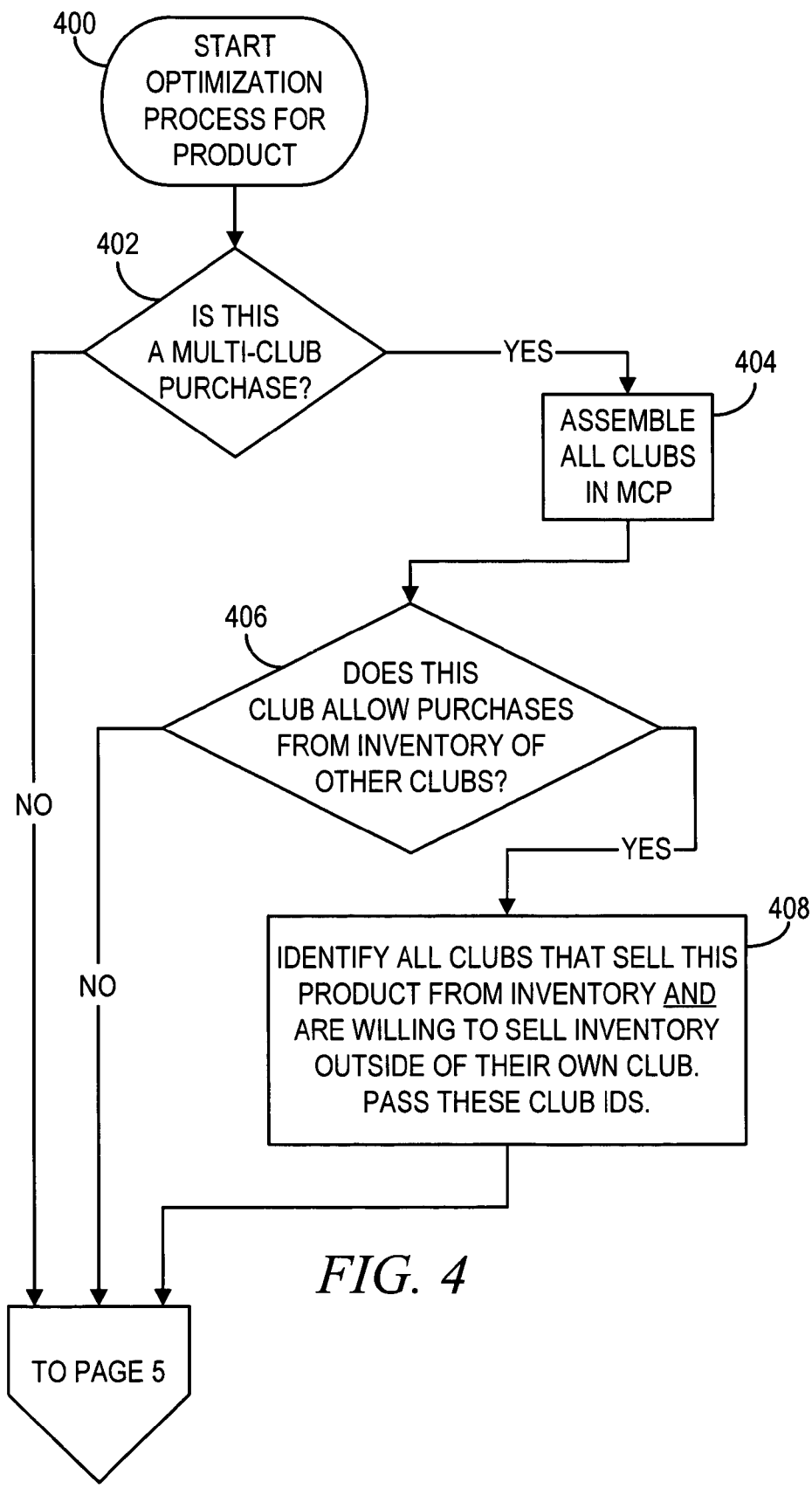
FIG. 4 is a flow diagram in which the first stage of determining the universe of clubs participating in the coop order is identified.
Figure 5:
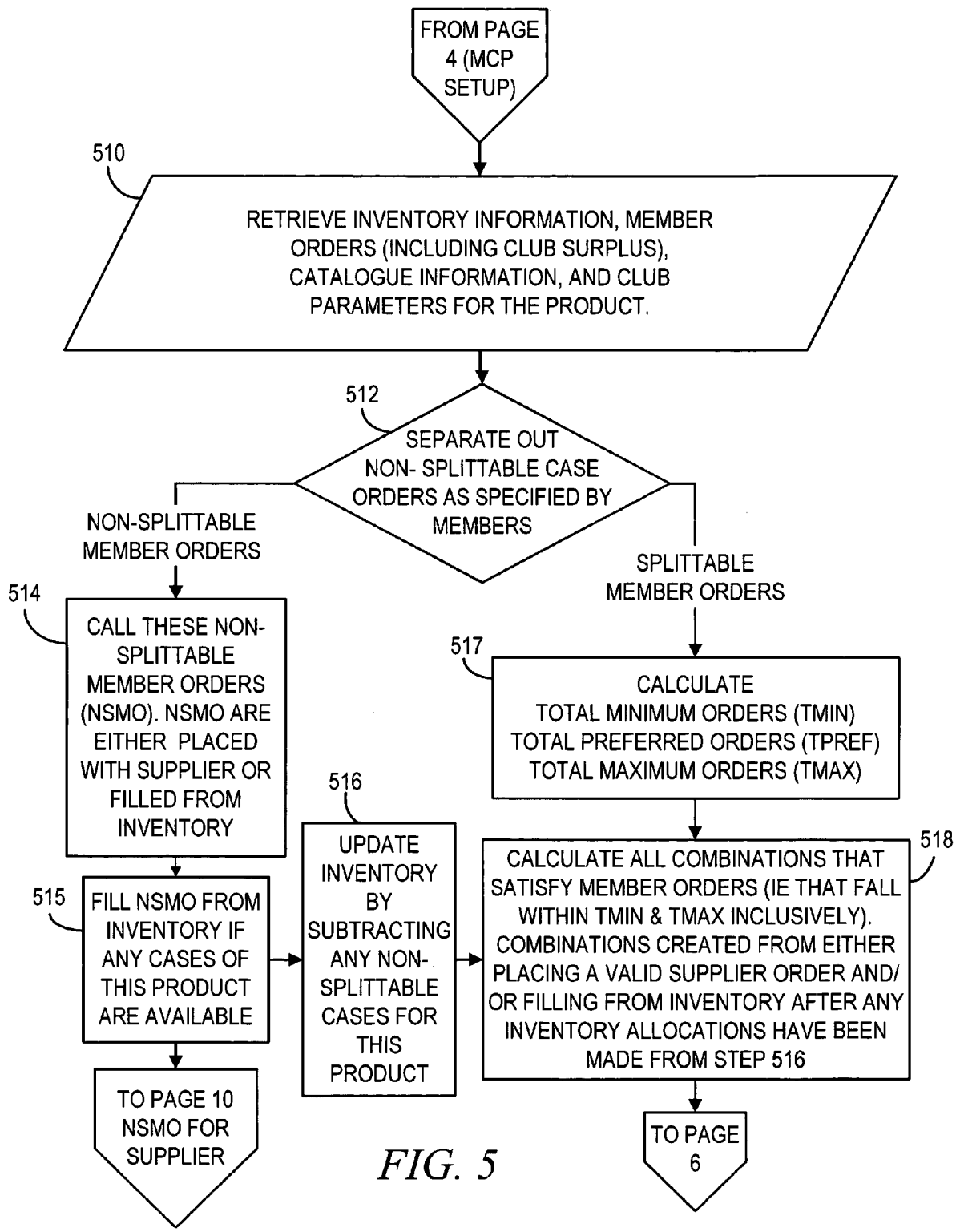
FIGS. 5-10 are successive flow charts illustrating one preferred mode of sequential aggregation and optimization steps.
Figure 6:
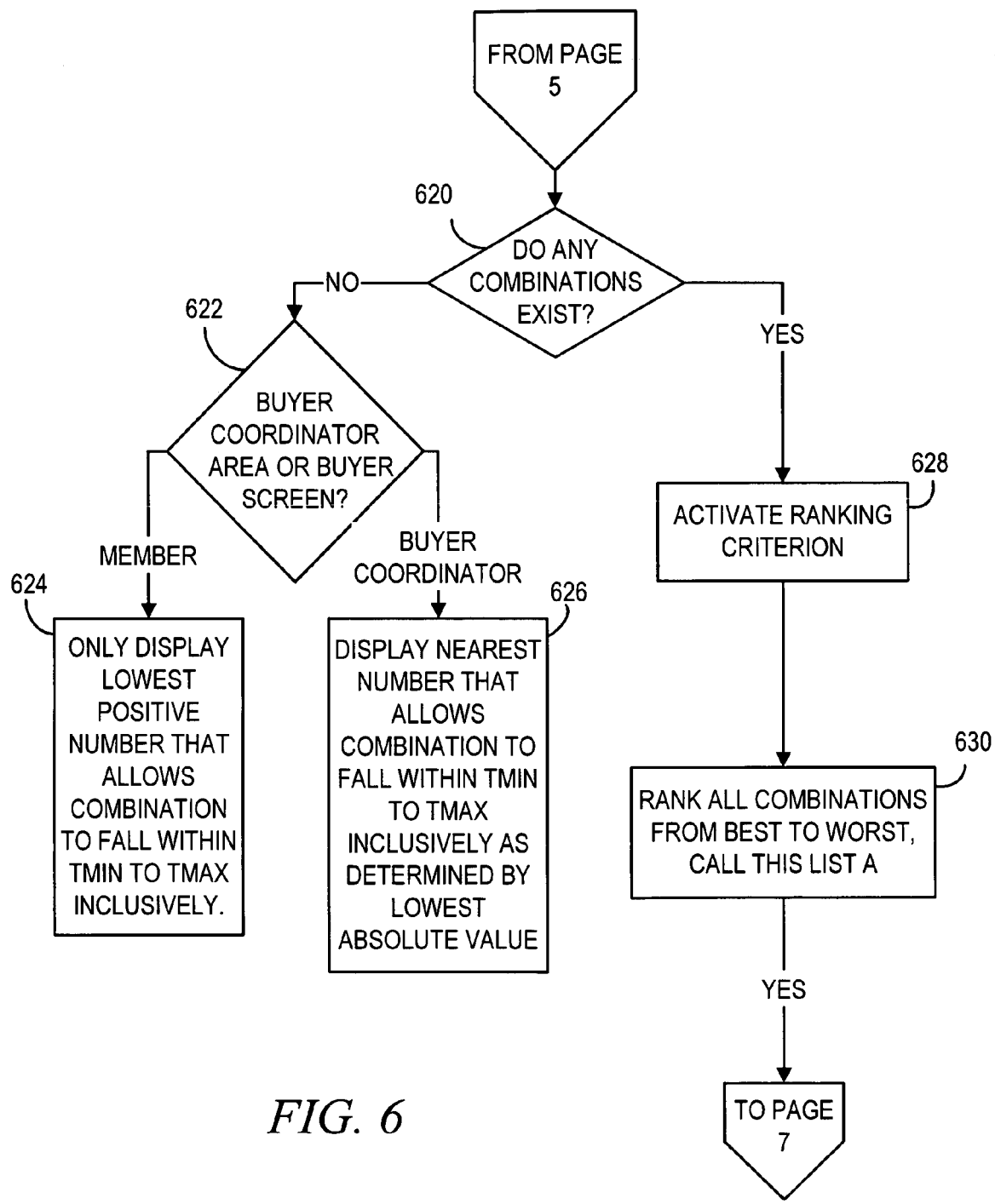
Figure 7:
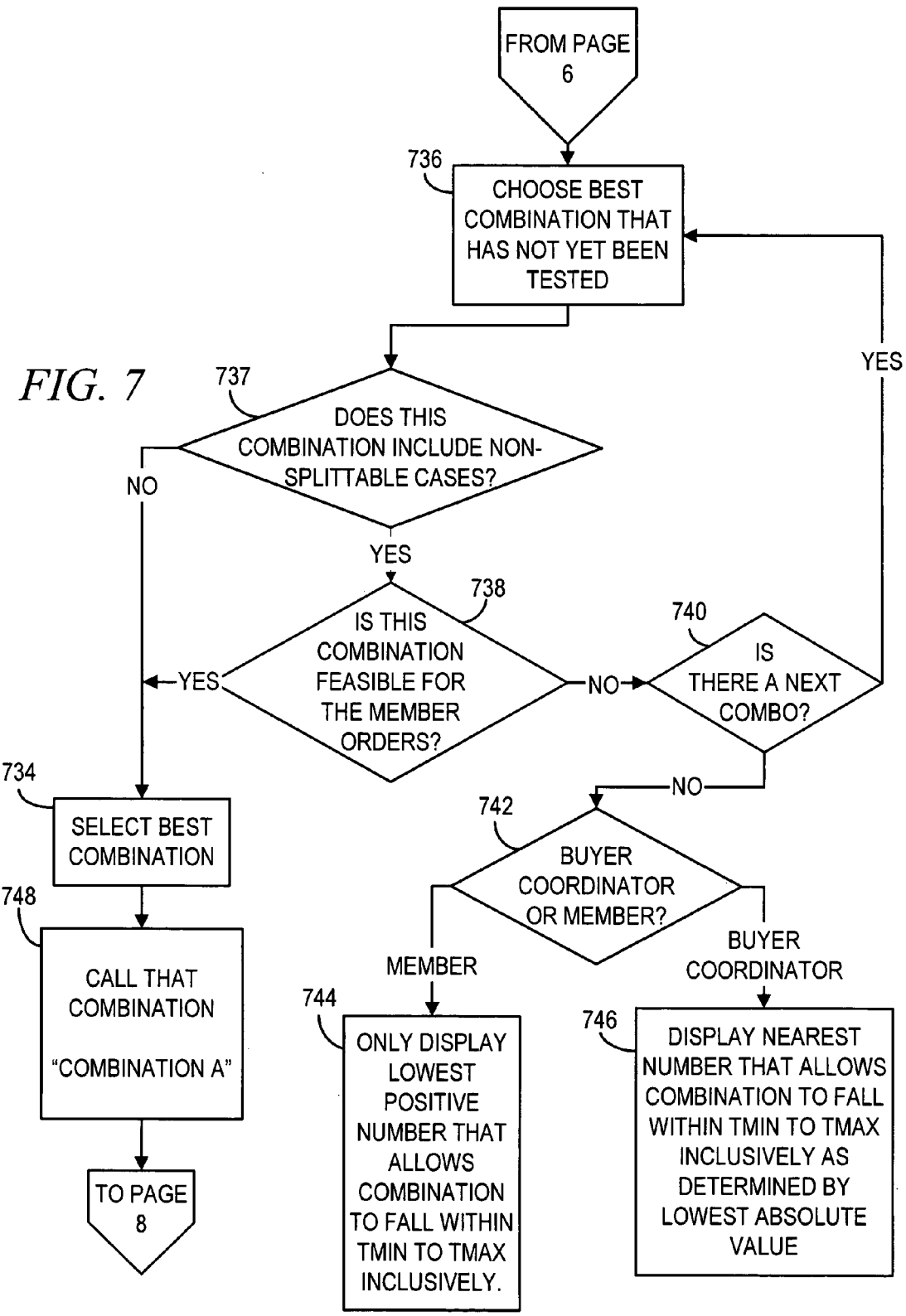
Figure 8:
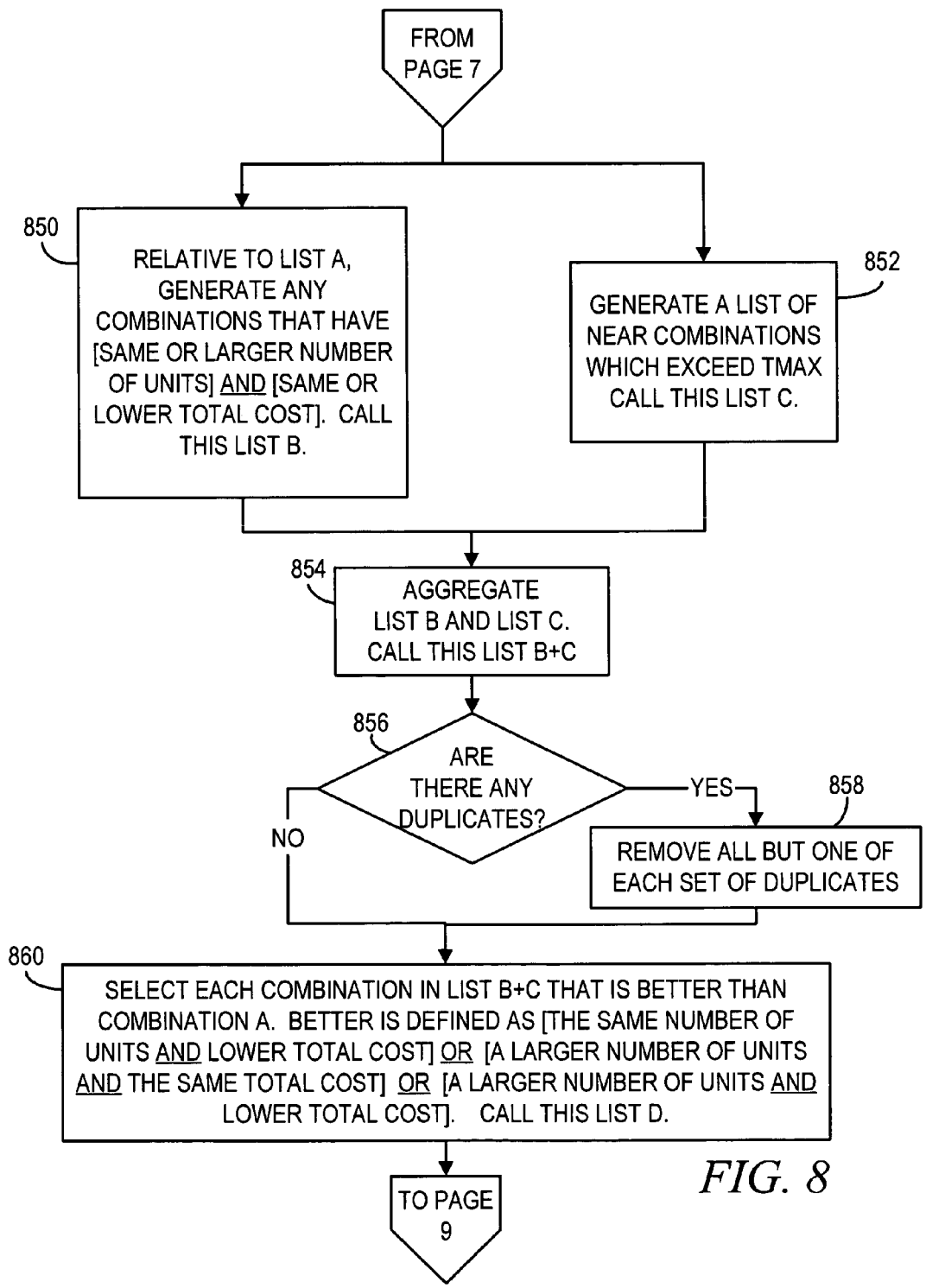
Figure 9:
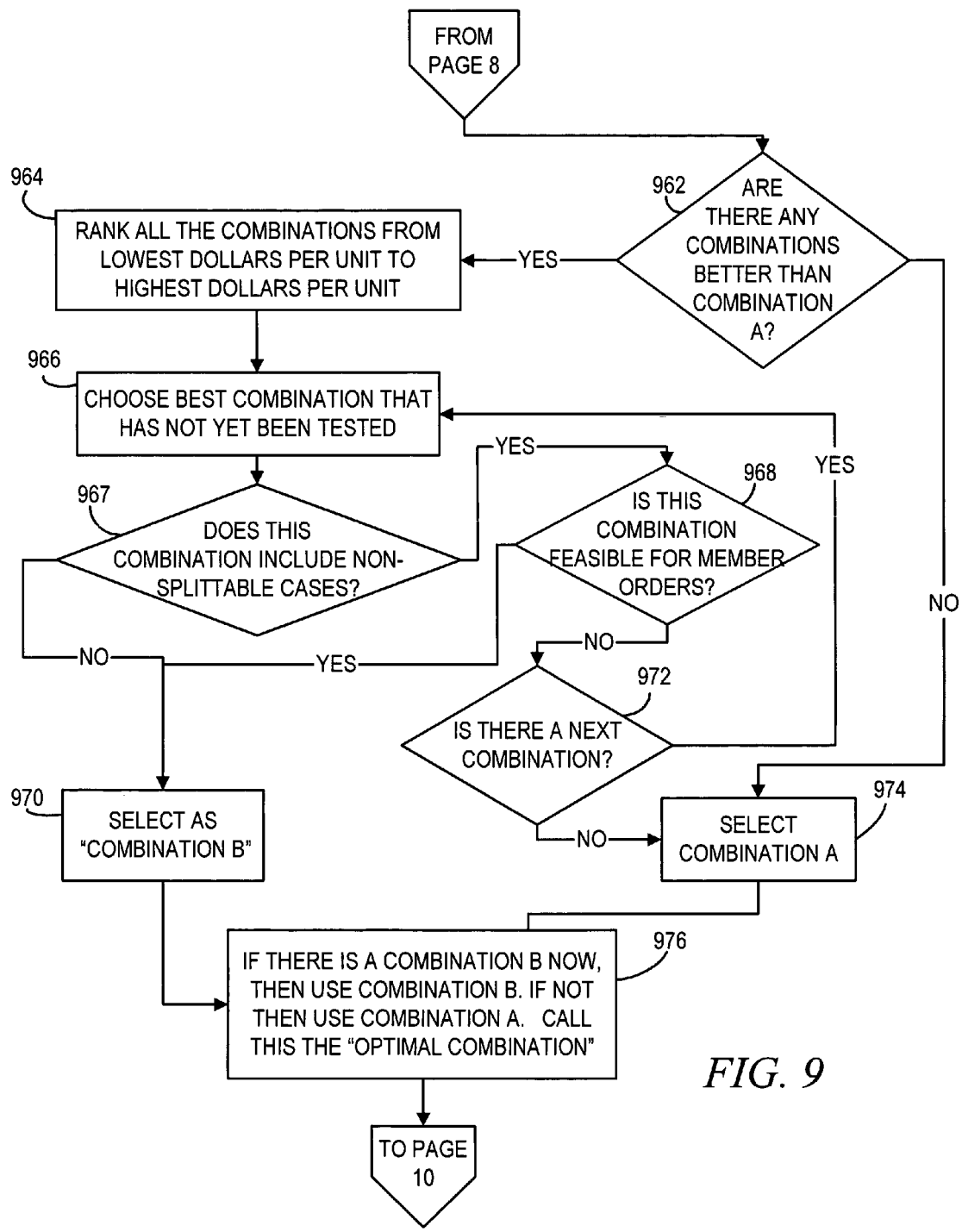
Figure 10:
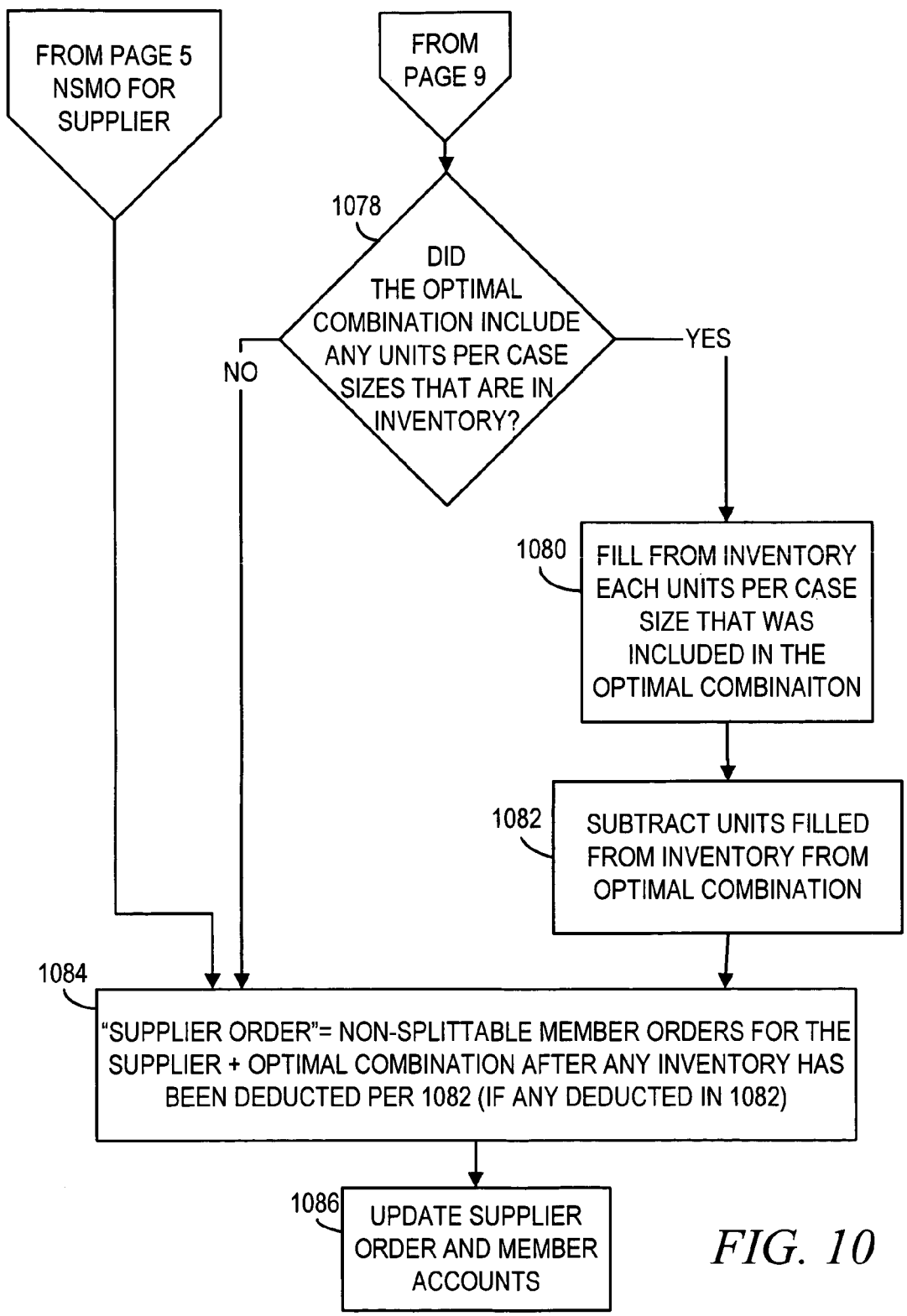

The optimization process starts with FIG. 4 step 400. The optimization calculation is triggered by any one or more changes to any one or more of the inputs of Buyers' Orders, Inventory, Catalogue Information (such as for example, the units per case for the product), or the Club Parameters. Therefore, as examples, the buyer coordinator may adjust an inventory quantity and this would trigger the optimization process. Or another party outside of a coop order may order a unit of inventory and this will affect the inventory of product available to the buyers and trigger the optimization process. Or a buyer may place an order for the product within the coop order, or change (prior to the member order cutoff) the quantity ordered of a product that they have already ordered, or the buyer coordinator may elect to order product for Club Surplus. Or the criterion selected by the buyer coordinator as a Club Parameter for determining the optimum outcome may be changed. It is preferable that any time a change is made to any one of the inputs of the optimization process, that the optimization process be triggered and completed for each product that has orders that will be affected by the change of the input.

The next step in performing the optimization for the product is to determine the relevant universe in order to assemble the input data for performing the calculations. In step 402, it is determined whether the product affected is part of a single coop order, or whether the product which is affected is part of a Multi-Club Purchase (MCP). The collaboration of more than one buying club placing concurrent orders together in a single order cycle is referred to as a Multi-Club Purchase, or MCP (previously referred to in '097 patent application as a Multi-Group Purchase, or MGP). In an MCP, the ordered quantities of a product from the supplier are the aggregation of all orders for that products as ordered by all buyer's of all buying clubs that are participating in the MCP (thereby creating one larger composite order). It is in effect, a "coop order of coop orders". It implies that all buying clubs participating in an MCP preferably have a common supplier and delivery point, typically a common final order cutoff and single responsible party for making payment.

The purposes of buying clubs using an MCP are primary twofold. It has been noted that many suppliers of goods at the wholesale level impose a minimum total dollar order requirement. It has also been noted that many suppliers have a number of products requiring cases only to be ordered and will not split cases into unit orders. Buying clubs participating in an MCP will find it easier to reach the minimum dollar order, to achieve the case requirement for a given product from a larger group of buyers, or to achieve both of these goals. This collaboration of buying clubs can also perhaps even gain volume price discounts not available to either club. In addition, the more buyers who participate in a coop order, the greater the probability that order quantities will achieve certain quantities of units to achieve price breaks that may be available for some products.

The creation of an MCP also offers each buyer coordinator the opportunity to sell inventory to a broader group of purchasers, since they could also sell the inventory in their club to all the other buyers of the other buying clubs in the MCP. Similarly, buyers are benefited by gaining access to greater selection of inventory product and possibly at better prices. Therefore, it may be advantageous to the holder of the inventory, and to the buyers of the buying clubs in MCPs, to have access to the club inventory of more than one club.

Notwithstanding the foregoing, a club may desire to limit their participation in an MCP to certain other clubs or they may not want to participate at all in an MCP. For example, although 2 clubs may operate in a certain geographic area and purchase from the same supplier, for various reasons one or the other may desire not to collaborate with the other club in a Multi-Club Purchase. The formation of an MCP is thus preferably undertaken through an invite, with an accept/reject step for each buying club.

It is also possible that a buyer coordinator desires to limit sales of a club inventory in an MCP or purchases of inventory from another club in an MCP. For example, a retailer may be offering products to buying clubs in an MCP, but the retailer may not want to allow buyers from that retailer's club to buy inventory from another club. However, that retailer may indeed want to allow their own products to be sold to other clubs in the MCP. In another example, a club that is participating in an MCP may desire to exclude another clubs' inventory that has been unreliable in maintaining its inventory records, or unreliable in delivering its inventory to other clubs on a timely basis. It should be noted that the function as to whether to present inventory or not may be associated with the MCP is similar in certain ways to that described in the Inventory patent application, whereupon inventory may be presented to members or non-members and inside or outside of a coop order.

As noted above, in setting up the MCP there are preferably two key decisions required. The first decision is which clubs are to form the MCP? The second question is to what extent will the clubs allow purchases and sales of club inventory between them? The decision as to how to create an MCP is achieved as part of the coop order set up process which is based on an invite and accept mechanism requiring both and invitation and an acceptance. For example, first a Buying Club A creates a new coop order and invites Buying Club B to participate in an MCP. Because Buying Club A invited Buying Club B into its coop order, Buying Club A is assumed to be the lead club, and Buying Club B is a co-club. This invite and accept process is more fully described in the Buying Club patent application.

Each club then also has the opportunity to decide how to present its inventory for purchase and sale. The buyer coordinator of each club in the MCP may decided whether to allow purchase of other clubs' inventory and sale of its inventory to other clubs, and if sales are to be made to other club's, whether the sales are to members or only to Club Surplus (which is the buyer coordinator of the other club). It is however preferable for implementation that the lead club only sell inventory to the other clubs, and for reasons of logistics, that the other clubs sell to the lead club and not directly to other co-clubs. Therefore if a retailer is desirous of selling their inventory to other buying clubs, then they preferably become the lead club and the initiator of the coop order. In the Inventory patent application, it has been expressly noted that any club may present to non-members its inventory for sale, and this mechanism allows a preferable mode for a buying club to sell its inventory to another clubs' members (who may not be members of the buying club selling the product). If the optimization that is to occur includes clubs operating in an MCP, it is preferable that the optimization criteria used is common across all clubs within the MCP. It is also preferable that any non-splittable SKUs that are determined by the buyer coordinator of the lead club of an MCP are also determined to be non-splittable by all co-clubs of the MCP. These common conditions are preferably defined in system 100 so that selections made by the lead club govern the process for the co-clubs participating in the MCP.

If the product to be optimized is within an MCP, then in step 404 an assemblage is made of all the clubs which are part of the MCP. In 406, for the club which is associated with the party which is making the change which has triggered the optimization calculation, it is determined whether the buyer coordinator will allow any purchases to be made from the inventory of other clubs. If the buyer coordinator will allow purchases from other clubs, then the next step in 408 is to identify all the clubs which have this product in inventory and are willing to sell inventory to other clubs other than their own (the process for sales of inventory is set forth in further detail in the Inventory patent application). Once the universe of clubs in an MCP which are affected by the product being ordered has been identified, and the further qualifications have been made as to the availability of the product in inventory of one or more of the other clubs and both the willingness of the purchaser buyer coordinator and the seller buyer coordinator of each of these other clubs to sell the products has been determined, then preferably each of the Club IDS (unique numbers which identify those clubs in system 100) for each club which passes each of these qualifications are passed as data for step 510.

In step 406, if a club that is initiating the MCP (the lead club) does not allow the sale of the product from inventory to other clubs, then available inventory from any other club is preferably NOT included in the universe of clubs with available inventory that can be used in the optimization process. Similarly if in step 408, a co-club does not allow its buyers to purchase inventory from a lead club, then preferably the optimization process will not allocate inventory to buyers of a co-club from the inventory owned by the lead club. Therefore, it may more generally be stated that if either the lead club or a co-club is not willing to allow purchases or sales of inventory outside of their own club, then those buyers who are members of any club including such a limitation are preferably not allowed to be allocated inventory (or place an order for inventory) from a different club than the one in which they are a member of while placing their order for the product. However, it is preferable that none of the limitations in the inventory setup permissions prevent buyers of any club in the MCP from placing orders for the product that may be filled from a supplier, or for the optimization system to accept buyers' orders for the product, from all buyers of all clubs in the MCP. For purposes of the remainder of this optimization discussion it is assumed that there is not an MCP in effect and that optimizations are performed for the product across a single buying club alone. However it is believed to be well within the ability of one who is knowledgeable in the art to modify the optimization processes described herein for a product in a single buying club to illustrate substantially similar steps when an MCP is encompassed in the optimization process for the product.

Step 510 denotes the assembly of substantially all the primary data needed for performing the optimization calculation on the product. This includes the inventory information, the member orders (including the club surplus), the catalogue information, and the club parameters for this product. Inventory information will preferably include whether the product is available in inventory, and if so what are the unit per case sizes and/or unit size under which it is offered (ie denote any units per case sizes not splittable), and what exact quantities are offered for each units per case size or unit size. As mentioned above, if there is an MCP in effect which is including the product to be optimized, then as appropriate any inventory information and member orders are preferably assembled from the member orders and inventory information for all the Club IDs obtained from steps 402, 404, 406, and 408.

In 512, an order for the product that has been placed by a member that has declared their order for that product to be non-splittable (that is the member is not willing to sub-divide the case), is first separated out of all the orders placed for that product. As noted in 514, each of these is designated as a non-splittable Member Order or NSMO. In step 515, each NSMO that can be filled from inventory is filled from inventory if the ordered case(s) is(are) available in the selected unit per case size(s). As denoted in 516, the inventory information is updated reflecting that the members' order will be supplied from the inventory. Thereafter, any NSMO that is not filled from inventory is passed to the end of the aggregation and optimization process, where it is added to the end result to achieve the total order for that product.

In 517, each splittable buyers' order (ie not including the NSMO) is assembled and aggregated, with the aggregation occurring for minimum, preferred, and maximum units. Specifically, all the buyers' ordered minimum number of units are added to make a total minimum orders (TMIN). And all the buyers' ordered preferred number of units are added to make a total preferred orders (TPREF). And all the buyers' maximum ordered number of units are added to make a total maximum orders (TMAX).

518 denotes generation of a listing of all the possible combinations of orders for the product that may satisfy the buyers' orders, ie that lie within the TMIN and TMAX range inclusively. As has been noted above in the discussion on data structures, a single product may be sold by a supplier using different units per case increments. It has also been noted that inventory may be stored for each club. A listing of combinations may preferably be created as an array that will preferably include information on each alternative units per case size including the amount of each of these sizes. The units per case sizes preferably include all the units per case sizes (or units) for the product that are available either from the supplier or the units per case sizes (or units) that are available from inventory.

An example is next disclosed noting the preferable array arrangement when a supplier and inventory are available for satisfying member orders for a product. If a supplier offers sizes of 10# and 25#, and in inventory there is only a 5# unit per case size, then the total of all the units per case sizes offered to members is 5#, 10#, and 25# (#=pound or pounds). The array will also preferably include the total cost of the combination to the members, the total units of the combination, and the average unit cost of the combination to the members (total dollars divided by total units). However, in order to avoid problems of circular logic, it may be necessary to exclude the effects of volume discounts from the cost. Similarly, it may be necessary to exclude the effects of internal price adjustments within the club among the members because different members may have different price adjusting factors. It is preferable to include in the array the source for the product, such as whether the product is provided from the supplier and/or whether the product is provided from one or many inventory sources. It may also be beneficial if inventory may be provided from multiple sources to note how many units are in on-hand inventory from each source. It may be beneficial to provide a decision rule under which the inventory which is priced most favorably to the buyers is sourced first, followed by the next most favorable source and so on.

When inventory is available for a product, then the quantity of the inventory that is preferably used in creating the combinations is preferably the on-hand quantity. Beyond this level, quantities of units may not be available for buyers to order from inventory. However the on-hand inventory may be further limited based on a definable event, the intent being to formulate only those combinations which use quantities of units from inventory that are not irrevocably committed elsewhere. For example, the amount of on-hand quantity may be decremented downward when placement of a supplier order has occurred for a different coop order and the on-hand units of inventory of a product are then irrevocably committed elsewhere. The total units for any combination created utilizing any units per case sizes from inventory should thus reflect that a finite amount of product can be filled from inventory based on whatever quantities of product are available at a given units per case size or unit size. If a combination with a total number of units in excess of that amount available from inventory is required (as is often needed), then higher quantities are preferably generated from accessing any units per case sizes (or a unit size) based on what is available from the supplier.

As an example, assume that for a given product the supplier is making available units per cases sizes of 10#, 15#, and 25# and the club inventory contains products is available in 1# (1 is a unit) and 5 # sizes. Suppose further that there are 2 units in inventory of the 1# size, and 3 of the 5# cases in inventory. Then for the various sizes, the array would preferably include positions for quantities of 1#, 5#, 10#, 15#, and 25#, with the limitation on the 1# unit size and the 5# case size only being the amount of each that are available from inventory in the 1# unit size (which is by example here 2) or in the 5# case size (which is by example here 3). A further limitation may be in effect if the inventory of 5# units per case sizes is determined not to be splittable by the buyer coordinator (as may occur as noted in the Inventory patent application). If per the above example, there are three cases of 5#s in the inventory, and the supplier does not offer 5# cases, then the 5# cases may only be included in the combinations as adding either 1×5# case (or 5#), or 2×5# cases (or 10#) or 3×5# cases (or 15#) to the combinations. However, if the supplier also offers a 5# case, then additional combinations may be generated based on availability of that unit per case size from the supplier, instead of from inventory.

A variable preferably stored in the array is the total cost of each combination. For the highest level of optimization, it is preferable that cost be calculated as cost to the members, as opposed to cost from the supplier or the original cost of a product in inventory. However, this may create problems of circular logic (which are outputs dependent on inputs which are themselves outputs of the original output calculation) and it would therefore be preferable or necessary to exclude the effects of volume discounts from the cost calculation. Similarly, it may be preferable or necessary to exclude the effects of internal price adjustments within the club among the members because different members may have different price adjusting factors. Thus, calculation of the cost for each combination shall be based on the quantity of cases or units associated with that size as well as the price per case or price per unit to the member. For example, if an array contains positions for units per case sizes of 1#, 5#, 10#, and 25#, and the prices to the members of these are $1.00, $4.00, $7.00, and $16.00 respectively, then that combination of [2, 4, 3, 1] shall have a total cost of $55. This is calculated as follows

| | |
|---|---|
| 2 × $1.00 = | $2.00 |
| 4 × $4.00 = | $16.00 |
| 3 × $7.00 = | $21.00 |
| 1 × $16.00 = | $16.00 |
| TOTAL: | $55.00 |

The number of units represented by the same combination is 77#, which is calculated as follows.

| | |
|---|---|
| 2 × 1# = | 2# |
| 4 × 5# = | 20# |
| 3 × 10# = | 30# |
| 1 × 25# = | 25# |
| TOTAL: | 77# |

The average unit price of that combination is $0.71 per # which is obtained by dividing the $55 total cost by the 77# total units for the combination.

As noted in the Inventory patent application, the price for buyers associated with inventory can be varied by a discount that is definable by the buyer coordinator. If the member price for the product for ordering from inventory is less than the catalogue price from the supplier, then the allocation between inventory and supplier units for the combination preferably is calculated by utilizing to the greatest extent the lower price from the inventory for all the units which may by provided from inventory with the balance of the cost for that combination being calculated based on the buyer price for the product as ordered from the supplier.

As denoted in 518, the total number of units included in any combination of orders placed with a supplier and/or orders filled from inventory must preferably fall within the range spanned by the total minimum (TMIN) number of units inclusively and total maximum (TMAX) number of units inclusively of the total buyers' orders to satisfy all the buyers' desired quantities for that product. Combinations are thus preferably generated based on the data structure for that product provided by the supplier and the on-hand inventory wherein the total number of units of each such combination is equal to or greater than TMIN and less than or equal to TMAX.

It should be noted that there may be many different combinations of units per case that will achieve a given total order. For example, a total preferred units for all member orders equaling 80 lbs. may be achieved by a number of different combinations. For example, 8 units of 10 lbs each or 16 units of 5 lbs each are both equal to 80 lbs. Similarly, 3 orders of 25 lbs. plus 1 order of 5 lbs. equals 80 lbs. As will be readily evident by the above examples, there may be many combinations that may equal a given total order and each may have a different total cost and a different average cost per unit.

Although there are a number of means for generating combinations that fall within the range of TMIN and TMAX inclusively, disclosed herein is a process for generating such a list. The first step for the process is to create a separate listing of the numbers of units of each units per case choice of a product wherein the number of each units per case size that may be ordered based on those numbers will be less than or equal to TMAX. Then using each of those numbers in the appropriate position, generate all the possible combinations that will include each one of the numbers created before. Then calculate the total number of units that are generated by each combination. Finally exclude each combination in which the total calculated units is not greater than or equal to TMIN or less than or equal to TMAX. For each combination, there is calculated and stored the total cost and preferably the average per unit cost of each combination as well.

An example may help illustrate the list generation process described in 518. Assuming that say TMIN is 30 and TMAX is 39, and the units per case for a product are 1#, 5#, 10#, and 25#, then the numbers generated for each units per case choice would be as follows.

For units per case=1 (0, 1, 2, 3, 4, . . . , 37, 38, 39)=39 units maximum

For units per case=5 (0, 1, 2, 3, 4, 5, 6, 7)=35 units maximum

For units per case=10 (0, 1, 2, 3)=30 units maximum

For units per case=25 (0, 1)=25 units maximum

Step 2 is to generate a listing of all the combinations for a 4 part set, say starting with units per case of 1 in the first position, units per case of 5 in the second position, units per case of 10 in the third position, and units per case of 25 in the fourth position. So the first combinations might be

[0, 0, 0, 0] which totals 0 units

[0, 0, 0, 1] which totals 25 units

[0, 0, 1, 1] which totals 35 units

[0, 1, 1, 1] which totals 40 units and so on until all combinations are generated for all positions holding the numbers noted above. The last steps are to generate the total units generated by each combination and then to exclude any combinations which are less than TMIN or greater than TMAX. Further excluded would be any combinations that do not conform to limitations on the inventory or on what is splittable in inventory.

In the 4 set list generated above with a TMIN of 30 and a TMAX of 39, then the choice of [0, 0, 0, 0] (which equals 0 units) and the list of [0, 0, 0, 1] which equals 25 units both fall below TMIN. And [0, 1, 1, 1] (which equals 40 units) is also rejected as it falls above the TMAX. The creation of the list of combinations with a result set that lies within the range of TMIN to TMAX inclusively may be readily achieved by more efficient means (such as for example using the logic of counting) by one of ordinary skill in the art.

It is possible that the process of generating the combinations creates a result that there is no combination that falls within the TMIN to TMAX range inclusively. This is denoted by the "NO" branch of step 620. If there is no combination that will satisfy both buyers and the suppliers, then it is preferable to inform the buyer or the buyer coordinator as to the amount of units by which an adjustment may be made which would enable member's desires for product quantities with the TMIN to TMAX range inclusively to be satisfied. In fact, it is preferable to note the minimum number of units of adjustment to an order that would lie within the buyers or the buyer coordinator's ability to effect to enable a valid order to be placed for the club for that product. As will be noted next there are different displays that are appropriate for the buyer, who can only affect their own orders, and the buyer coordinator, who preferably has the right to adjust orders for other buyers of the buyer club. In 622, it is determined whether the display is to be directed to an area generally available to buyers for placing orders 624 or whether it is directed to the buyer coordinator area 626.

The number that is preferably presented to the buyers in ordering area 624 is that number which achieves a selected optimization criterion, which optimization criteria is preferably defined as the lowest positive number of units that will enable a combination to be created with total units falling within TMIN to TMAX inclusively. The reason for presenting to buyers the lowest positive number of units (as opposed to showing any negative number) is that a buyer placing an order for a product for the first time cannot reduce their quantity of units since the buyer has not yet ordered any units of the product. Therefore, by disclosing a positive number, the buyer may always affect the outcome by increasing the quantity of units ordered by that buyer to a number of units that will enable a combination to be created with total units falling within TMIN to TMAX inclusively.

The number presented to the buyer coordinator acting in a club management role 626 (having the authority to adjust the units ordered by any member placing an order for a product) is appropriate to be either a positive or a negative number of units that will achieve an optimization criteria. The preferable optimization criteria may be determined by that choice which is defined by the lowest absolute value number of units that will enable a combination to be created with total units falling within TMIN to TMAX inclusively. To give an example, if one option is for the total order to be increased by 3 units and the other option is to decrease the total order by 2 units, then by taking the lowest absolute value of +3 and –2 (which is 2), then it may be determined that the preferable number displayed to the area accessed by the buyer coordinator with the rights to adjust orders is –2. In certain markets, either the buyer or the buyer coordinator may by preference be shown the negative number only, the positive number only, or both numbers displayed. For example, this may be beneficial to assist in accommodating standing orders which would carry over from a prior period and become an initial order allocated to each member when they first access a new coop order.

A preferable formulaic means to calculate the adjustment numbers to be displayed to the buyers and the buyer coordinator is next disclosed. To reiterate, an adjustment is needed to permit a combination to be achieved that lies within the TMIN to TMAX range inclusively. As has been noted, there is no combination that exists as denoted in 620, and based on 622 adjustments need to be presented to the buyers or members 624 or buyer coordinator 626. The formula that is preferably disclosed is based on ascertaining the adjustments needed to place a supplier order without utilizing any inventory, since the availability of inventory has not heretofore been sufficient achieve a combination that lies within the TMIN to TMAX range inclusively.

To calculate the adjustments, first determine the smallest units per case increment that is deemed splittable by the buyer coordinator (if one is the smallest units per case then an order for that product may always be placed so the units per case figure to be used in this determination is by definition greater than one). As an example of this if a product is sold in units per case increments of 5, 10, and 25, yet 5 is deemed not splittable, then 10 would be the selected choice. Define the units per case size determined here (the number 10 in this example), as the variable Y.

Calculate a number A as the greatest multiples of Y that will be less than TMIN. Then define a function equaling the units of A times Y as Units (A). If Y=10 and TMIN equals 27, then A would equal 2 and Units (A)=20. Calculate a number B as the smallest number of multiples of Y that is greater than TMAX. Then again apply the function Units(?) to the variable B to define Units(B). If Y=10 and TMAX equals 36, the B equals 4 and Units(B)=40.

The number of units of adjustment by the buyer that is needed to place a supplier order is preferably displayed to the Buyer by showing a plus sign followed by the number equal to (Units(B) minus TMAX).

The number of units of adjustment by the buyer coordinator that is needed to place a supplier order, and which is preferably displayed to the buyer coordinator, is preferably determined as follows.

If A=0 (that is no multiples of Y will be less than TMIN), then the preferable display to the buyer coordinator is a plus sign followed by the number equal to (Units(B) minus TMAX). If A>0, then the selection for the adjustment quantity is preferably the smaller of:

(Units(B)–TMAX) OR (TMIN–Units(A)).

If (Units(B)–TMAX) is smaller, then display this number preceded by a plus sign. If (TMIN–Units(A)) is smaller, then display this number with a negative sign before it.

While there are numerous means of determining an adjustable number of units which may satisfy both buyers and the buyer coordinator, it is preferable that some means be utilized to generate such numbers and that these numbers are displayed when there is no combination which will satisfy the member's orders. As noted above in certain markets, either the buyer or the buyer coordinator may by preference be shown the negative number only, the positive number only, or both numbers displayed. For example, this may be beneficial to assist in accommodating standing orders which would carry over from a prior period and become an initial order allocated to each member when they first access a new coop order.

Returning to step 620, assuming that at least one combination exists then in step 628 retrieve the ranking criterion that has been selected by the buyer coordinator in the Club Parameters database 330 (which in an MCP is preferably the lead clubs' ranking criterion) and in 630 apply the ranking criterion to list all the combinations which do fall within the TMIN to TMAX range in order from best to worst. This list is referred to hereafter as List A. In List A, there is calculated and stored the total cost for each combination and preferably the average per unit cost of each combination as well. In 736, a selection is made of the best combination that has not yet been tested in 737, which for the first iteration, will be the first combination in the array. In 737 it is determined as to whether the first choice on this List A contains any SKUs that have been defined as non-splittable by the buyer coordinator. If there are not any non-splittable SKUs in this first choice on List A, then in 734, that combination is selected and in 748 that combination is determined to be Combination A.

If the result of 737 is YES (i.e. if there are non-splittable SKUs in the combination selected in 736), then in 738 the list of member's orders is reviewed to see if the non-splittable cases called for by that combination could feasibly be used, given the specific quantities ordered by each member. For example, if a combination included 2 cases of 5# that are non-splittable, and 3 units of 1#, then the roster of member orders would be reviewed to determine if an allocation were possible using the 2 non-splittable cases. If there were three member orders that totaled 13 units and these three buyers ordered 6#, 4#, and 3# respectively, then the feasibility test in 738 would result in a NO decision for that combination, ie that the order was NOT feasible for members. The reason for the NO on feasibility is that only one of the non-splittable 5# cases could be used in that combination, given the specific member orders. If on the other hand, if the total 13 unit order was instead ordered by the three members in the amounts of 5#, 6#, and 2# respectively, then the feasibility test in 738 would return a YES decision. The 6# could be filled from a total of one 5# non-splittable case plus a 1 # unit, and the remaining non-splittable 5# case could be used for the member who ordered 5#, and the 2# could be allocated to the third member.

If 738 results in a feasible order (a YES) then that combination is selected as the Best Combination in 734. If however 738 results in a NO, then in 740 it is determined if there is a next combination. If there is a next combination on List A then the process returns to 736 and the cycle is repeated again until either a combination is found that does not have any non-splittable SKUs in it (NO in 737), or if the non-splittable SKUs are feasible in the tested calculation (YES in 738), or if there is not a next combination (NO in 740). If in 740 it is determined that there is not a next combination then in 742, it is determined whether the area being accessed is one for a buyer or for a buyer coordinator. If it is for a buyer, then the display is based on 744 preferably showing only the lowest positive number that will enable a combination's total units to lie within the TMIN to TMAX range inclusively. If it is for the buyer coordinator, then the display is based on 746 preferably showing the actual number (positive or negative) that has the lowest absolute value. In some applications however, it may be preferable to make different choices as to which number to show the buyer and the buyer coordinator, or perhaps to show both numbers.

It is next necessary to determine if Combination A is in fact the best outcome that may be obtained for the buyers. As noted in 850, a new list (call this List B) is generated containing any combinations that have both the same or large number of units and also have the same or lower total cost. Also as noted in 852, an additional list is generated which are those combinations that exceed by a near amount TMAX (call this List C). Such additional combinations for List C may be generated by incrementing upward the amounts of each alternative units per case size until the total units of the combination first exceeds TMAX. 854 describes the step of including all the combinations that are found in List B and C into a new list, which is termed List B+C. In 856 any duplicates that have been created from the combining of the lists are identified. If any are identified, then in 858 any combinations which appear more than once are eliminated such that only one of combination of each of the former duplicates remains on List B+C.

Step 860 compares Combination A with each combination on List B+C. Each combination on List B+C that is better than Combination A is selected and included on a new list called List D. Better is defined relative to Combination A wherein any better combination than Combination A has: a. the same number of units and a lower total cost, or b. a larger number of units and the same total cost, as Combination A.

In 962, it is determined if there have been no Combinations generated which are "better" than Combination A and if so, then Combination A is selected as denoted in 974. If there have been combinations generated, and thus included on List D, all the combinations are then preferably ranked as denoted in 964 from lowest dollars per unit to highest dollars per unit as a preferred optimization (or alternatively they may be ranked by decreasing numbers of units with the same or lesser cost as Combination A as an alternate ranking mode). In 966, the best combination that has not yet been tested in 967 and perhaps 968 is chosen and in 967 this combination is checked to determine if any of the SKUS have been specified by the buyer coordinator as non-splittable. If the selected combination is determined NOT to have any SKUs specified as non-splittable, then that combination is selected and labeled Combination B as denoted in 970. If the result of 967 is YES (i.e. if there are non-splittable SKUs in the combination selected in 966), then in 968 the list of member's orders is reviewed to see if the non-splittable cases called for by that combination could feasibly be used, given the specific quantities ordered by each member. This preferably utilizes the same feasibility testing process as was described earlier for 737 and 738.

If 968 results in a feasible order (a YES) then that combination is selected as Combination B in 970. If however 968 results in a NO, then in 972 it is determined if there is a next combination. If there is a next combination on List D then the process returns to 966 and the cycle is repeated again until either a combination is found that does not have any non-splittable SKUs in it (NO in 967), or if the non-splittable SKUs are feasible in the tested calculation (YES in 968), or if there is not a next combination (NO in 972). If in 740 it is determined that there is not a next combination then in 974, Combination A is selected to be passed to step 976.

As denoted in 976, if there is a Combination B then that is selected, but if there is no Combination B, then Combination A is selected. Combination B if it exists, or Combination A if Combination B does not exist, is termed the Optimal Combination.

Whichever alternative has been selected, in 1078 it is next evaluated as to whether the Optimal Combination selected included any units per case sizes from inventory. If a size that was in inventory was included then as denoted in step 1080 it may be allocated to the Optimal Combination. Next, as denoted in 1082, the units allocated from the Optimal Combination are decremented from the inventory database (reducing the available inventory as noted in the Inventory patent application). As denoted in 1084, the "Supplier Order" is obtained by adding together the Non-Splittable Member Orders not deducted from inventory as denoted in 515 and the Optimal Combination less any inventory deducted as denoted in 1082. Finally, as denoted in 1086, the supplier order and member accounts are updated.

Discussion to this point has focused on a preferable mode for performing order aggregation, optimization and allocations between members to derive the optimized supplier and inventory quantities. Discussion next proceeds to pricing in which FIGS. 11 through 23 present a preferred mode for performing pricing and dollar amount calculations along with add-on costs and discounts calculations associated with determining amounts owed for products ordered by members of a customer (such as a buying club) from a supplier through a CO. Also described is the process for determining the cost for products that are to be added to inventory within that CO as part of a Club Surplus order. The members of the buying club in this example may be one or more individual persons, the club surplus account of a buying club, a retailer ordering in conjunction with members of a buying club, or any combination of the above.

Figure 11:
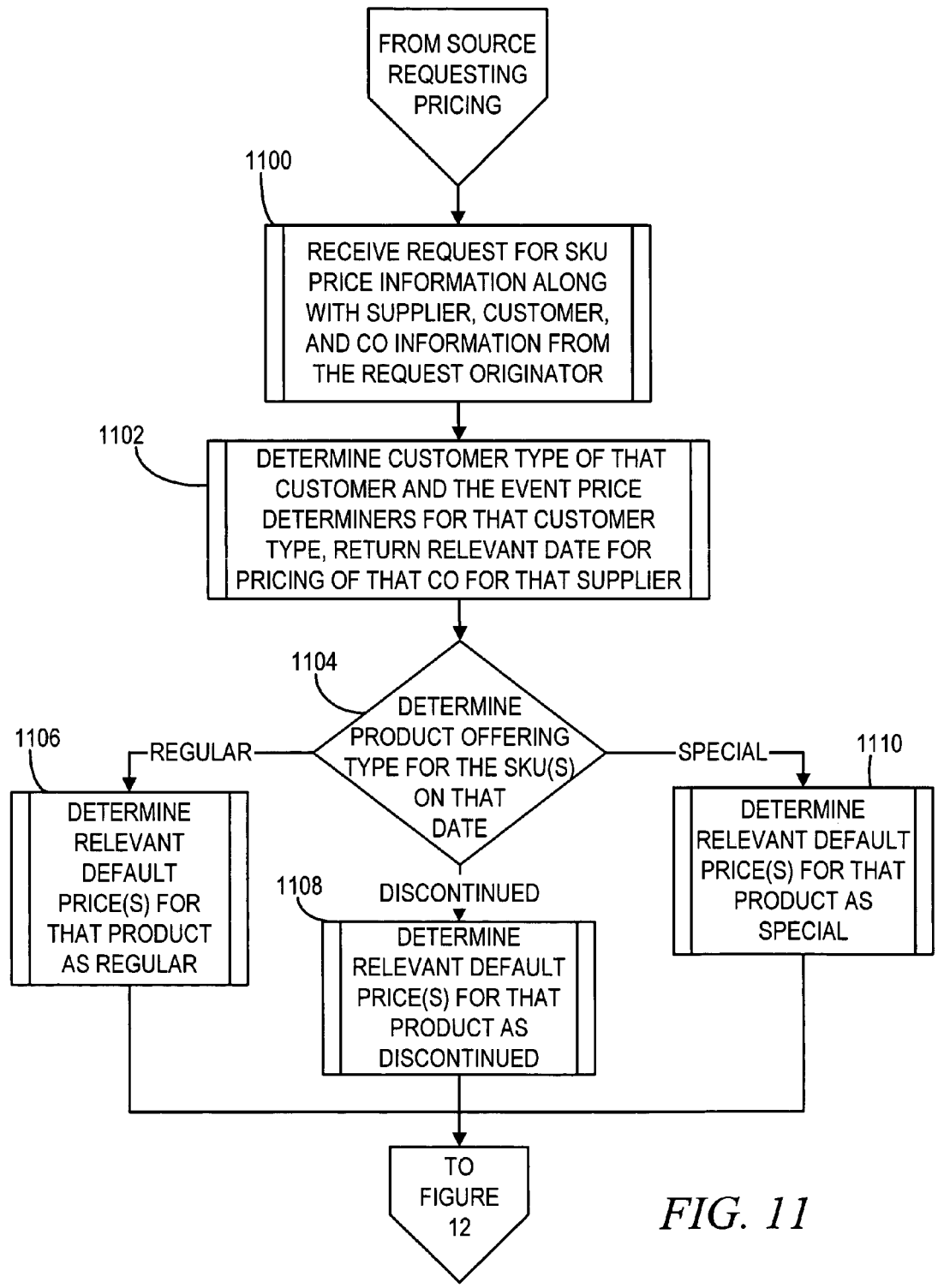
FIG. 11 is a flow chart showing the receipt of the request for pricing from a customer and the process steps for determination of the corresponding default supplier price to the customer

FIG. 11 initiates the pricing process by means of an order of a customer generating a request for pricing of the product being ordered. Step 1100 denotes the receipt of the request for pricing which includes the supplier, customer, and CO information (such as the order, ship, and expected invoice date of the CO), which are received along with the SKU number identifying the product. As denoted in Step 1102, a customer type for that customer with that supplier is identified and the specific event price determiners (such as order date, ship date, or invoice date) for that customer type are retrieved which in turn enables determination of the specific dates under which the pricing information is to be obtained. Using those dates, then as denoted in Step 1104, the product offering type for that SKU (such as regular, discontinued, or special) is identified and a relevant default price is then obtained for that date of that SKU number. For example, if the SKU is a regular priced SKU on that date, then as denoted in step 1106 the regular price is returned as the default price. If the SKU is a discontinued SKU on that date, then as denoted in step 1108 the discontinued price is returned as the default price. If the SKU is a special SKU on that date, then as denoted in step 1108 the special price is returned as the default price.

Figure 12:
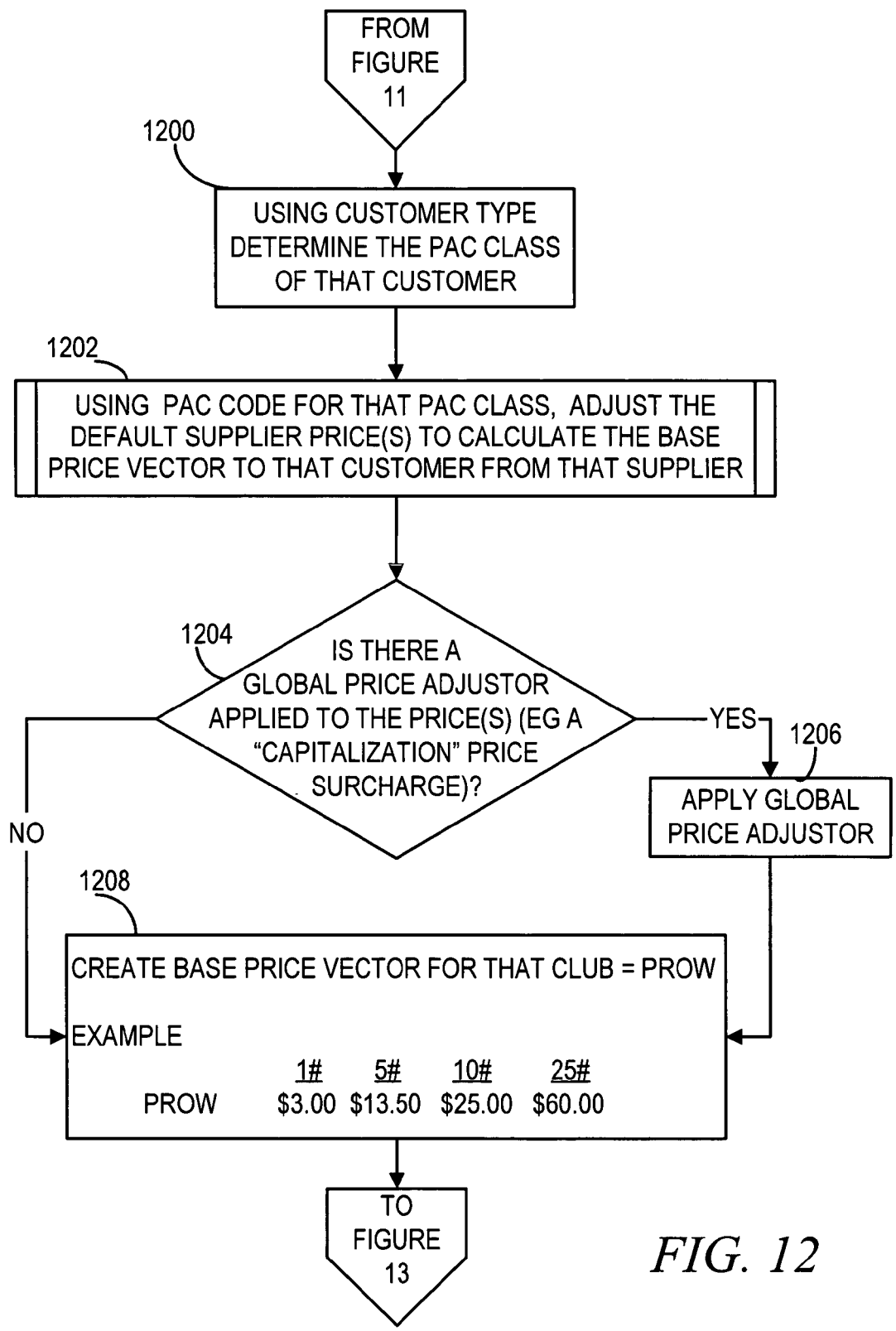
FIG. 12 is a flow chart illustrating the PAC adjustments to the default price and the resulting creation of a Base Price Vector for the ordered product(s) for that Customer

In FIG. 12, the customer type of the customer is used to determine the PAC Class of the customer as denoted in step 1200. In step 1202 the PAC Code associated with the PAC Class is used to adjust the default supplier price to calculate the base price vector to that customer from that supplier. Then if a global price adjustor is applicable as denoted in step 1204, it is then applied as denoted in step 1206. A global price adjustor may be for example a capitalization charge of say 2% levied on every sale to a customer in the form of a price increase. Or it may be a global cost adjustor to prices for another reason such as a cost increase to one or more cost categories (fuel, labor). Or it may be a combination of more than one of these factors. If a global price adjustor is applied or not, the process creates a base price vector for that customer, which is designated as Prow and is found in step 1208, signifying those prices that are applicable at the varied units per case levels for a given product. This base price vector may be applied for a single SKU that is sold in different units per case increments (called multi-case skus), or a set of different skus that are the same product, excepting that the different SKU numbers are associated with different unit per case increments (called related skus). An example of a Prow vector for a multi-case SKU sku # 123456 of Garbonzo beans is

| | Base Price Vector<br>123456 GARBONZO BEANS | | | |
|---|---|---|---|---|
| | 1# | 5# | 10# | 25# |
| PROW | $3.00 | $13.50 | $25.00 | $60.00 |

Figure 13:
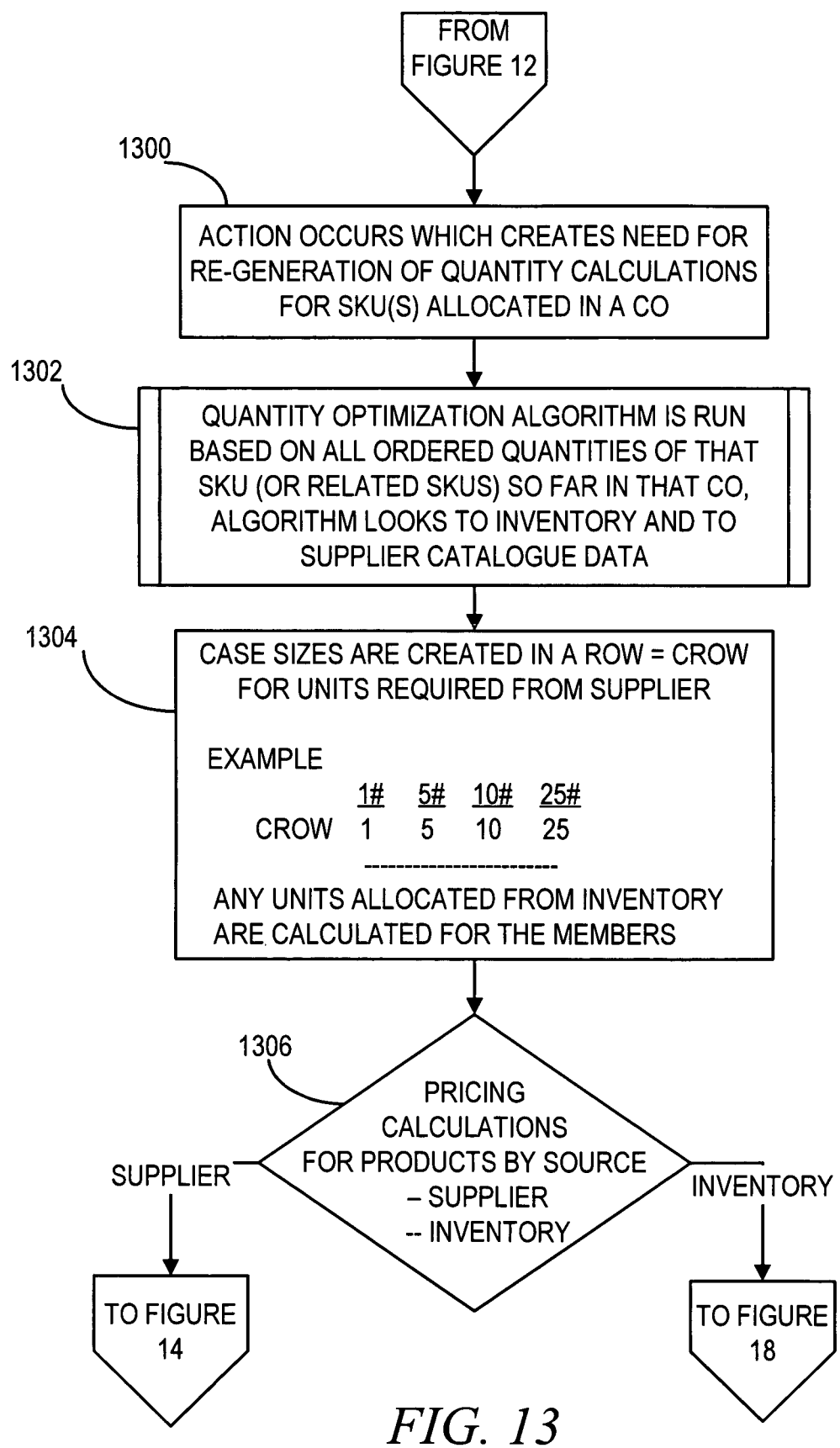
FIG. 13 is a flow chart referencing the Quantity Optimization Algorithm and the resultant Case Quantity Vector for the ordered product(s).

FIG. 13 turns to the quantities of orders being generated which are associated with the order. As noted in step 1100 of FIG. 11, an order has created a request for pricing. As denoted in step 1300, that same order preferably triggers a calculation of quantities ordered from the supplier and, if available, from inventory as was described above in this specification. Alternatively other conditions may cause a re-calculation of quantities and prices including, but not limited to, one of a set of related SKU's being discontinued by a supplier, a change in any optimization criteria for a CO, a change in the order of a different member in the CO, an increase or decrease to a quantity of inventory, or a change in the price. In any event, the quantity optimization algorithm is preferably triggered which then references the supplier catalogue information and the inventory information as denoted in step 1302. As denoted in step 1304 the case sizes for the set of units per case of the product are used to create a Case Size Vector denoted as CRow. An example of a Crow vector for a multi-case SKU # 123456 of Garbonzo beans is

| | Case Size Vector<br>123456 GARBONZO BEANS | | | |
|---|---|---|---|---|
| | 1# | 5# | 10# | 25# |
| CROW | 1 | 5 | 10 | 25 |

Figure 18:
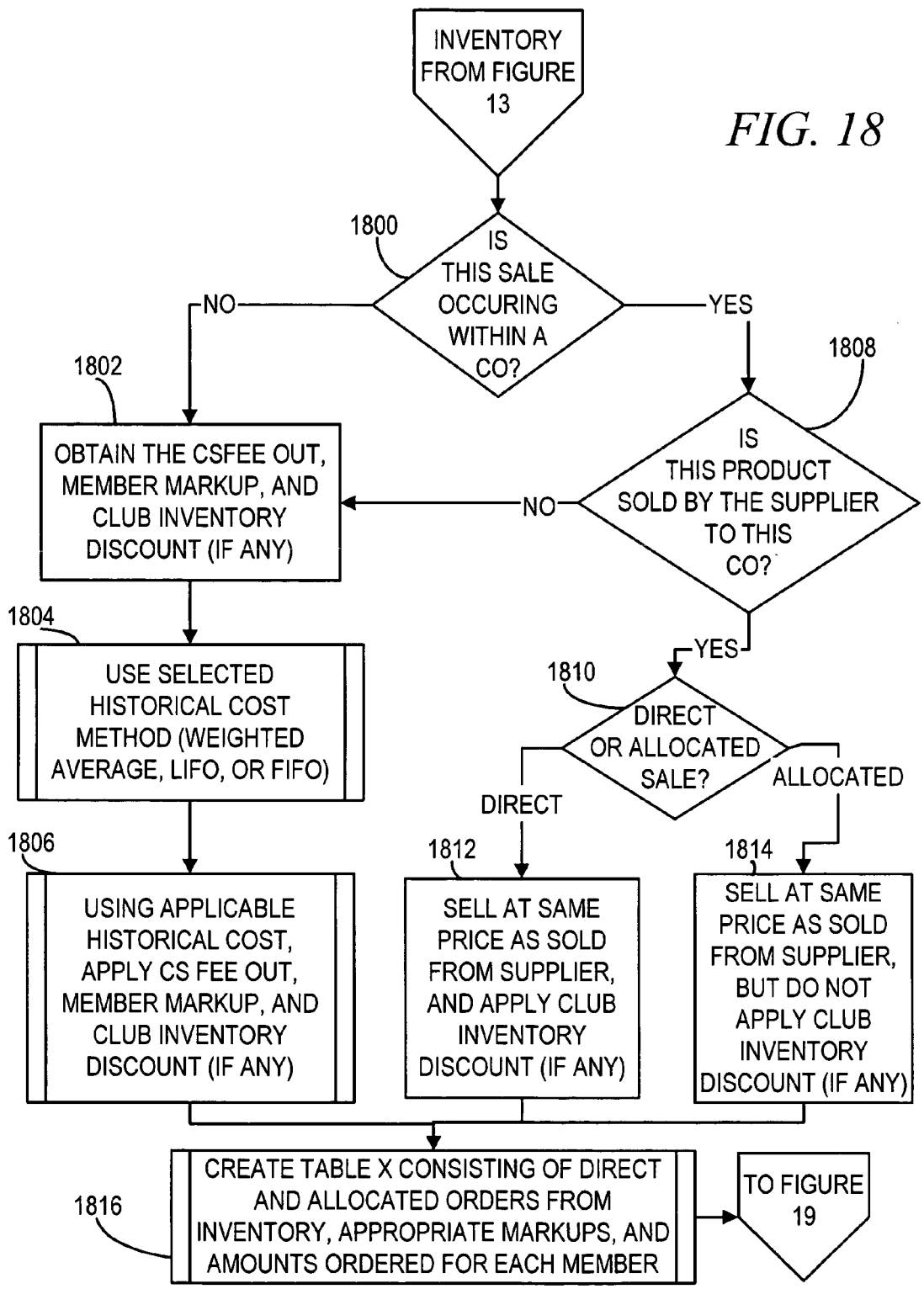
FIG. 18 is a flow chart illustrating calculation of member prices by historical cost method for products sold from inventory outside of a CO or that are no longer stored in the catalogue of the supplier.

In step 1306, a determination is made as to what portions of the orders are to be sourced from the supplier and what portions are to be sourced from inventory. FIG. 18 describes the process for pricing products sourced from inventory and FIG. 14 describes the process for pricing products to be sourced from the supplier.

Figure 14:
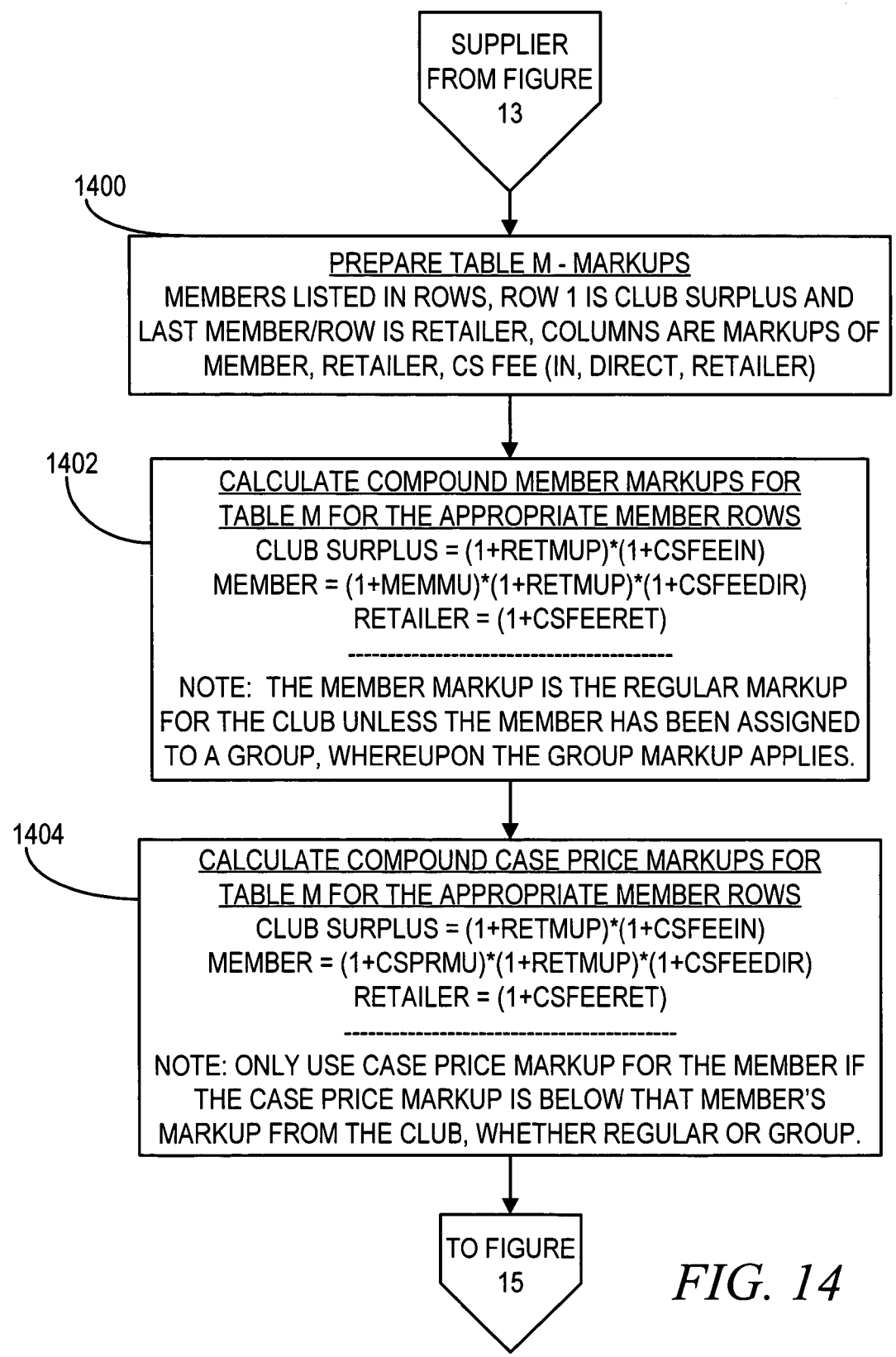
FIG. 14 is a flow chart referencing a Table M created to store and calculate Customer Markups, including compounded markups for when a case price markup is in effect or is not in effect.

In FIG. 14, a table M is prepared as denoted in step 1400 detailing all the associated markups for each member for the sourcing of that product from that supplier in that CO. Markups include Regular/Member Markup, Retailer Markup, the applicable CS Fee, and under certain criteria a Case Price Markup instead of the Regular/Member Markup. These markups are intended to be illustrative and are not in any way intended to limit the type or number of markups that may be applied. The Members that have placed orders for the product in this CO are listed in rows. For the rows, a Member 1 is assumed to be a Club Surplus and the last member is assumed to be a Retailer.

Markups are preferably expressed as percentages, but alternatively may be set as a fixed amount (such as $0.10 per unit, or $0.25 per product ordered by a member). These markups are those that are associated with the CO and are listed in the columns of Table M. The Regular or Member Markup is assessed by the club to its members as a means to help cover costs for the club. The Regular Markup is preferably the default markup set by the Buyer Coordinator for members of the club. The Member markup is an alternative markup to the Regular Markup which the Buyer Coordinator may set for members of the club who are to be assessed a different markup than the regular markup as determined by the group to which the member was assigned. The Member markup set by the Buyer Coordinator for a member may be higher or it may be lower than the Regular Markup.

The Retailer Markup is used for any commissions that are to be paid for retailers who are providing some level of service to the order process. The Retailer Markup may be assessed as a single percentage for all categories of products or it may be assessed as one markup for one category (such as groceries at 10%), another markup for another category (such as dairy 7%) and markups for other categories as well, or a single markup for all remaining categories (such as 12%). The retailer markup to be included in this table M for this product is the appropriate retailer markup for whatever category the product to be priced belongs, in this example Garbanzo Beans, and it would likely fall in a category called Grocery and thus receive a 10% markup.

The CS Fee is a charge to the club from a third party that is providing the order service technology or other processing services for members. The CS Fee is preferably classified and its value may change depending on the category or function of the person placing the order. For example, Club Surplus, Member, and Retailer are three classifications that preferably incur different fees. For example, the CS Fee for Club Surplus is called CS Fee In and is applied to all products ordered for the inventory of the Club (in the example below the CS Fee In is 1.5%). The fee to be assessed to members ordering from the supplier is called the CS Fee Direct, because this is assessed only on direct orders from the supplier to the member (in the example below the CS Fee Direct is 3.0%). The CS Fee for members who are ordering or are allocated a product from inventory is called the CS Fee Out (inventory sales are not displayed in the table below but are addressed separately in FIG. 18). The CS Fee for a retailer is assessed to any person who is deemed a retailer who is placing orders to the supplier (in the example below the CS Fee for a Retailer is 1.0%).

A further markup that may be associated with a CO is called the Case Price Markup. A Buyer Coordinator of a CO may preferably elect to charge a lower markup to any person ordering a case through the club, as these require less handling and processing. If a Case Price Markup is allowed, it may be further qualified between case orders marked as being non-splittable only, or relaxed to also include those products in which a member orders a minimum to maximum unit range which includes an integer multiple of cases of a product (thus a 12 unit per case product would receive the case price markup if the member indicated 21 to 25 units since 24 units is 2 cases). The case price markup is preferably only charged to a member if it is less than their regular or member markup. If the member markup is less than the case price markup, then the markup preferably used is the member markup.

As denoted in step 1402, Table M consists of two columns at the far right hand side which are all the markups compounded, the second to last right hand column on the right being all the compound markups excluding the case price markup, and the last right hand column being the compound markups including the case price markup in lieu of the regular/member markup. The case price markup is denoted to be 5% and is found above the far right hand column in which the compounding calculation including case price markup is made. As noted above, the case price markup, when one is established, is used in lieu of the Regular or Member markup. A depiction of a Table M is found below.

TABLE M

STORED AND COMPOUND MARKUPS

|  | Member Markup* | Retailer Markup | CSFee** | Compound Member Markup | Compound Case Price Markup |
|---|---|---|---|---|---|
| Club Surplus | 0.0% | 10.0% | 1.5% | 1.11650 | 1.11650 |
| Member2 | 10.0% | 10.0% | 3.0% | 1.24630 | 1.18965 |
| Member3 | 20.0% | 10.0% | 3.0% | 1.35960 | 1.18965 |
| Member4 | 15.0% | 10.0% | 3.0% | 1.30295 | 1.18965 |
| Member5 | 15.0% | 10.0% | 3.0% | 1.30295 | 1.18965 |
| Retailer | 0.0% | 0.0% | 1.0% | 1.01000 | 1.01000 |

*This defaults to the regular club markup unless the member is assigned a group markup.
**CS Fee Direct for Members, CSFee In for Club Surplus, CS Fee Retailer for retailer.
Case Price Markup = 5%

As may be noted in Table M and is denoted is steps 1402 and 1404, orders for Club Surplus are preferably not charged any Regular or Member markup since they are orders for the club itself. Similarly orders for a retailer are not charged a Regular or Member markup, nor a retailer markup but are only charged a markup for the applicable CS Fee Retailer, which in the Table M example noted above is 1.0%.

The compound member markup for Member 2 is (1+0.10%)*(1+0.10%)*(1+0.03%)=1.24630

The compound case price markup for Member 2 is (1+0.05%)*(1+0.10%)*(1+0.03%)=1.18965

Figure 15:
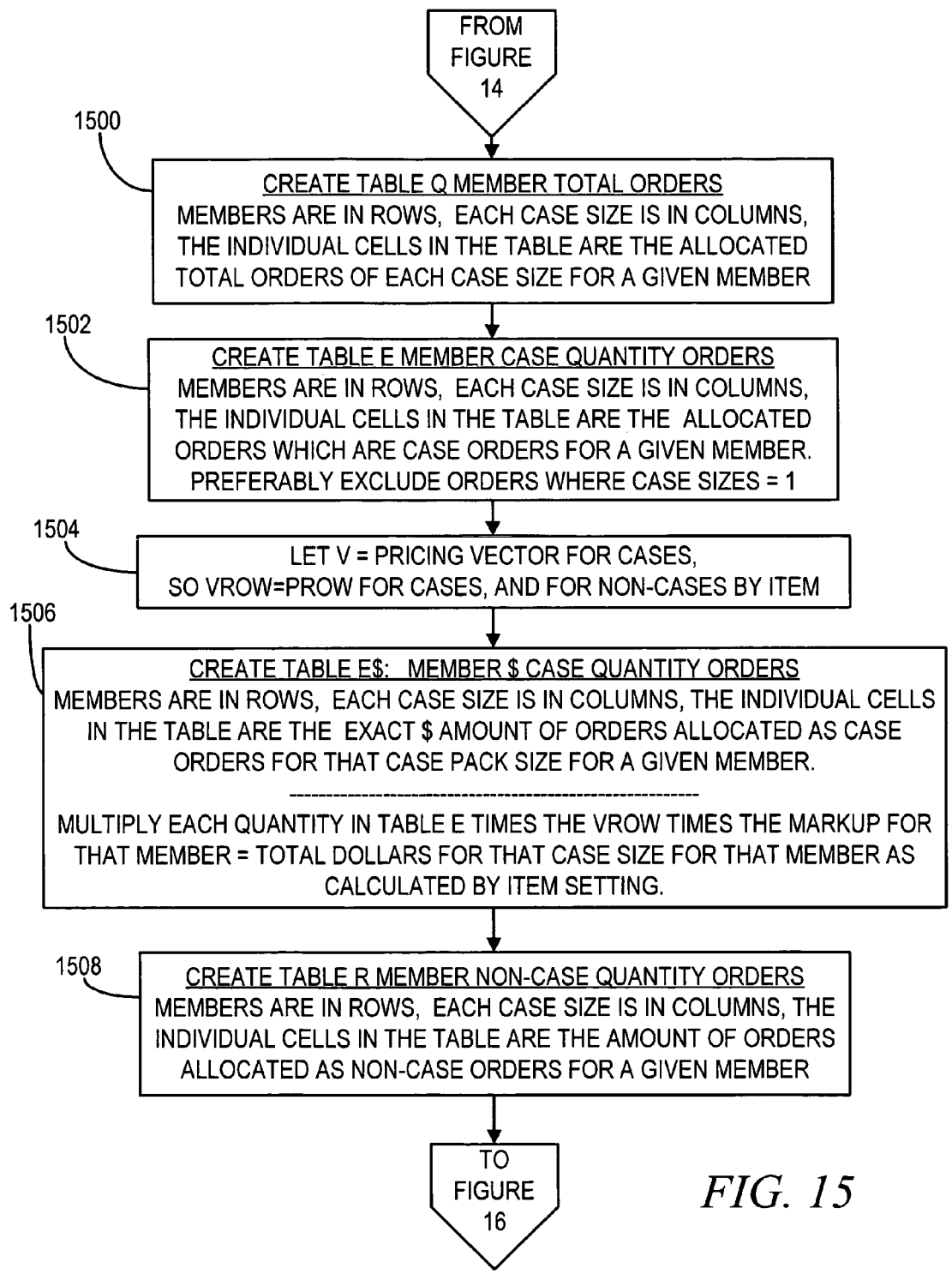
FIG. 15 is a flow chart referencing a Table Q for storing all customer orders, a Table E for storing the quantities of customer case orders, a Table E$ for storing dollar amounts of case orders for customers, and a Table R for storing Member non-case quantity orders

Turning to FIG. 15, a Table Q is created as denoted in step 1500 consisting of each of the members in rows and the case sizes in columns with the cells of the table filled in for each of the quantities of that case size allocated to that member.

TABLE Q

123456 GARBONZO BEANS
TOTAL ORDERS

|  | 1# | 5# | 10# | 25# |
|---|---|---|---|---|
| Club Surplus | 3 | 0 | 0 | 0 |
| Member2 | 0 | 1 | 1 | 0 |
| Member3 | 1 | 0 | 0 | 1 |
| Member4 | 2 | 1 | 0 | 2 |
| Member5 | 0 | 1 | 0 | 1 |
| Retailer | 2 | 0 | 0 | 0 |
| Sum Total : Orders | 8 | 3 | 1 | 4 |

A Table E is created as denoted in step 1502 in which each case quantity order for a member is found. Table E is a subset of the orders from Table M, but in Table E only the quantity of cases allocated to a member are stored. A business rule is noted that a case quantity of 1 is deemed to be a single unit and therefore is not stored as a case in Table E. This is due to the fact that although the presented design does not distinguish between units per case of greater than 1 and 1, the likelihood is that allowing the preferably lower case price markup than the regular or member markups for products ordered in single units is not a desirable outcome. Therefore when the units per case is equal to 1 these are preferably not deemed to be case quantity orders.

TABLE E

123456 GARBONZO BEANS
CASE QUANTITY ORDERS

|  | 1# | 5# | 10# | 25# |
|---|---|---|---|---|
| Club Surplus | 0 | 0 | 0 | 0 |
| Member2 | 0 | 1 | 1 | 0 |
| Member3 | 0 | 0 | 0 | 1 |
| Member4 | 0 | 0 | 0 | 0 |
| Member5 | 0 | 1 | 0 | 1 |
| Retailer | 0 | 0 | 0 | 0 |
| Sum Case Orders | 0 | 2 | 1 | 2 |

Next illustrated is creation of a Table E$, the dollar amount of the case quantity orders. To do this, a determination of price is made which is denoted in step 1504 which is preferably to state that the base price for the cases (before markups are applied) will be the same as the price established for the Prow back in step 1208. An alternative methodology may set a different base price for cases and that is why Vrow is not simply determined to be Prow. Using the pricing determination denoted in step 1504 and the case quantity orders defined in Table E and the applicable (in this example) case price markup of 5%, a Table E is created as denoted in step 1506 (remembering that a case size of 1 is preferably not deemed to be a case). For easy reference, the Compound Case Price Markup from Table M is found in the far right hand column.

TABLE E$

123456 GARBONZO BEANS
DOLLAR AMOUNTS OF CASE QUANTITY ORDERS

| Vrow<br>Crow | $3.00<br>1# | $13.50<br>5# | $25.00<br>10# | $60.00<br>25# | Compound<br>Case Price<br>Markup |
|---|---|---|---|---|---|
| Club Surplus | $— | $— | $— | $— | 1.11650 |
| Member2 | $— | $16.06 | $29.74 | $— | 1.18965 |
| Member3 | $— | $— | $— | $71.38 | 1.18965 |
| Member4 | $— | $— | $— | $— | 1.18965 |
| Member5 | $— | $16.06 | $— | $71.38 | 1.18965 |
| Retailer | $— | $— | $— | $— | 1.01000 |

A Table R is created as denoted in step 1508 for storing the quantities of orders that remain from Table Q. Effectively for each position in the respective tables, R=Q−E. It should be noted that there may be other separate designations beside case quantities for another specialized treatment for some sub-set of the total orders, although only the case price markup treatment is described herein. If one or more other specialized treatment situations were utilized, then R would equal the subtraction not only of the case price markup quantities from Table Q, but also each additional specialized treatment situation. It is also possible that a case may be allocated to a member and would appear in Table R, which includes only non-case orders, because the optimization algorithm initially allocated a case quantity to the member, but the units for the order submitted by the member did not meet any criteria by which the order qualified for receipt of the case price markup (for example a member ordered 57 units as a minimum, preferred, and maximum quantity of a product which included a 25 unit per case product). Member 4 in Table R illustrates such a result. Table R is illustrated next below.

TABLE R

123456 GARBONZO BEANS
MEMBER NON-CASE QUANTITY ORDERS

| | 1# | 5# | 10# | 25# |
|---|---|---|---|---|
| Club Surplus | 3 | 0 | 0 | 0 |
| Member2 | 0 | 0 | 0 | 0 |
| Member3 | 1 | 0 | 0 | 0 |
| Member4 | 2 | 1 | 0 | 2 |
| Member5 | 0 | 0 | 0 | 0 |
| Retailer | 2 | 0 | 0 | 0 |
| Sum Rrow | 8 | 1 | 0 | 2 |

Figure 16:
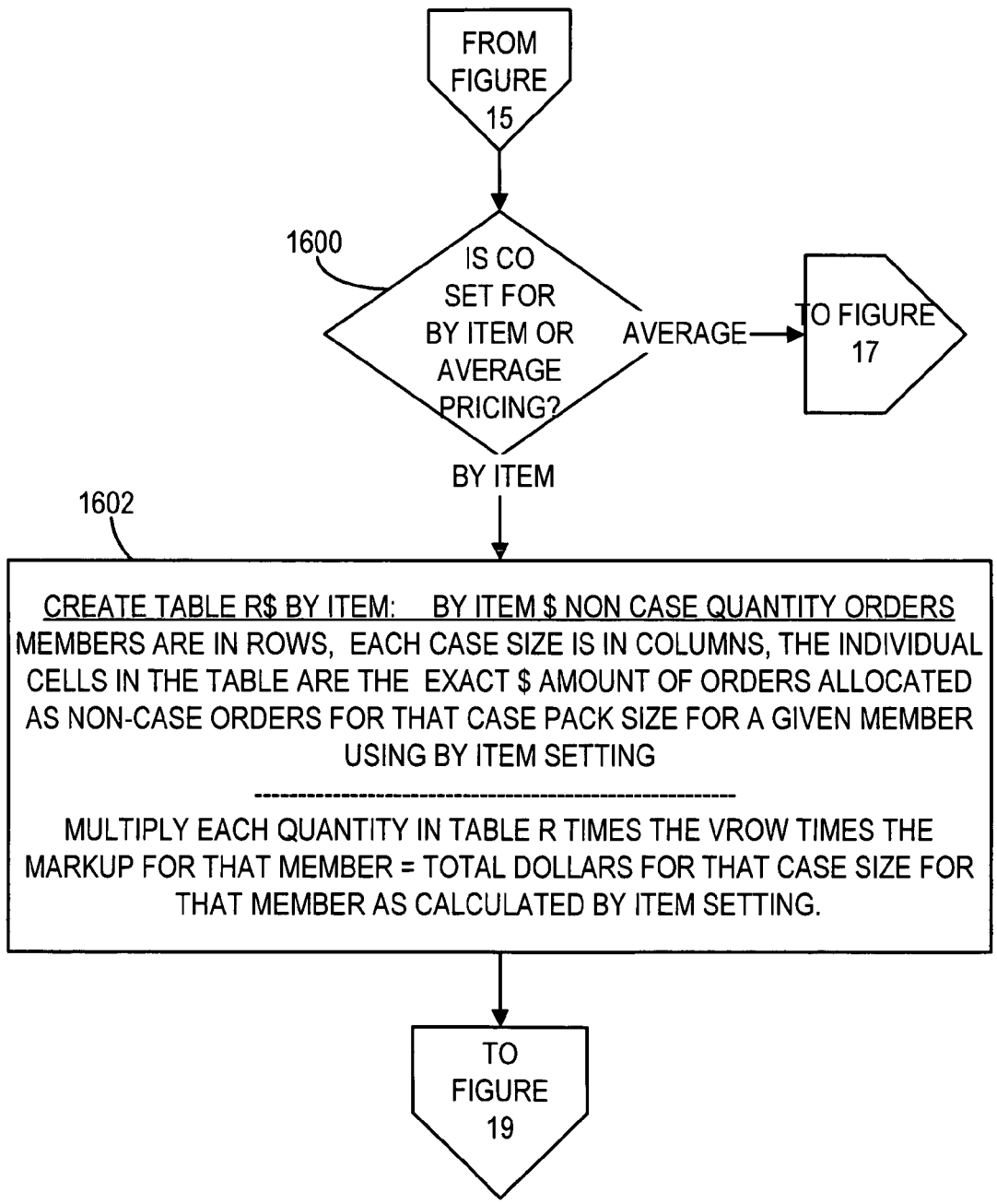
FIG. 16 is a flow chart referencing a Table R$-By Item that under a selection of By Item stores the dollar amounts for the non-case quantity orders.

As denoted in FIG. 16, step 1600, next a determination is made as to whether the CO is to be processed under By Item pricing or Average Pricing for the non-case quantity orders. In step 1602, a Table R$-By Item is created, which stores the dollar quantities of the non-case quantity orders calculated on a By Item basis. On the By Item basis, the Vrow is again set equal to the Prow so that each member receives the same base price as was noted in the Base Price Vector in step 1208. For easy reference, the Compound Regular/Member Markup from Table M is found in the far right hand column.

TABLE R$

By Item
123456 GARBONZO BEANS
BY ITEM - $ NON-CASE QUANTITY ORDERS

| Vrow<br>Crow | $3.00<br>1# | $13.50<br>5# | $25.00<br>10# | $60.00<br>25# | Regular/<br>Member<br>Markup |
|---|---|---|---|---|---|
| Club Surplus | $10.05 | | | | 1.11650 |
| Member2 | | | | | 1.24630 |
| Member3 | $4.08 | | | | 1.35960 |
| Member4 | $7.82 | $17.59 | | $156.35 | 1.30295 |
| Member5 | | | | | 1.30295 |
| Retailer | $6.06 | | | | 1.01000 |

Figure 17:
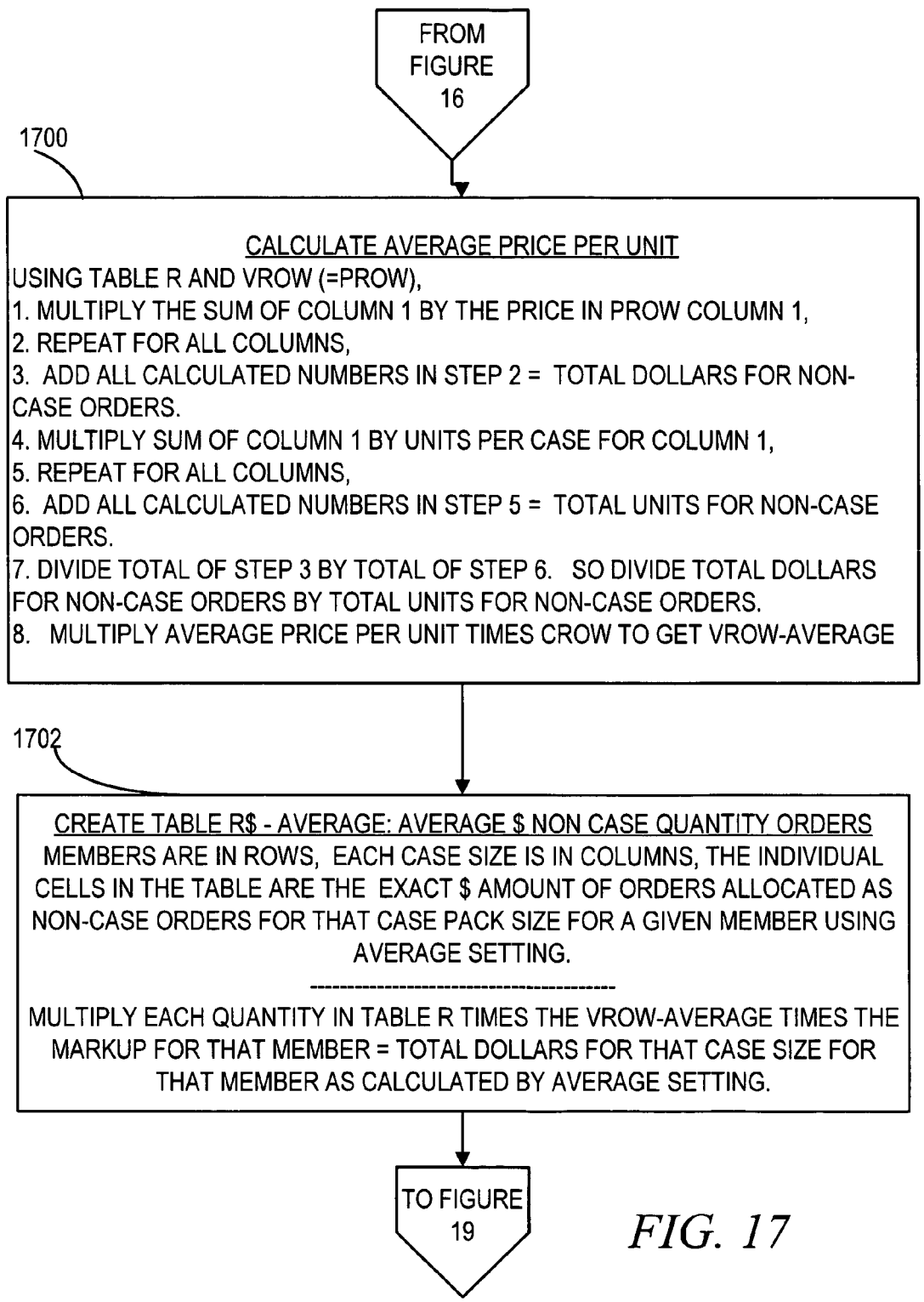
FIG. 17 is a flow chart detailing the calculation of an Average Price Per Unit for all non-case orders, and referencing a Table R$-Average that under a selection of Average, stores the dollar amounts for the non-case quantity orders.
Figure 19:
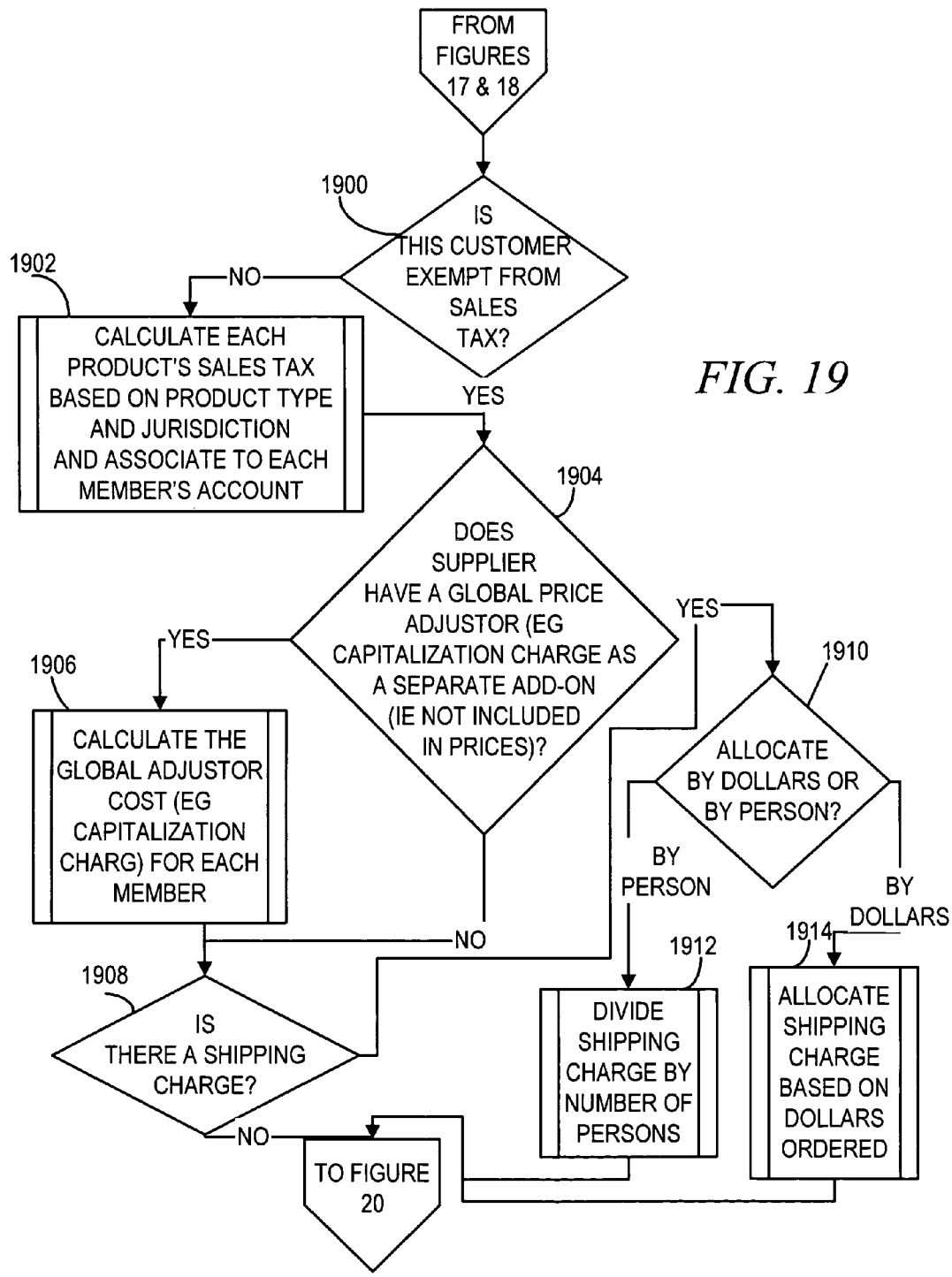
FIG. 19 is a flow chart illustrating Add-On costs and allocations for members for sales tax, a global price adjuster (such as a capitalization fee), and shipping charges.

Processing next proceeds to FIG. 19 for the calculation of add-ons charges and discounts. Before proceeding to FIG. 19, the alternative denoted in step 1600, the average method calculation for non-case orders is described in FIG. 17. FIG. 17 describes the calculation of the pricing for non-case quantity orders in the circumstance where Average has been selected by the Buyer Coordinator as the preferred method for calculating the pricing of non-case quantity orders. The key difference in the generation of the dollar amounts for non-case orders under the Average method is the calculation of the Average Price Per Unit as is denoted in step 1700.

The Average Price Per Unit is calculated by a multi-step process which first creates a sum of each column in Table R (called SumR row in Table R). Next it multiplies the SumR of each column times the prices to calculate the total of all dollars ordered for each case size. Next it aggregates each of those dollar totals across all the case sizes to achieve a total dollars ordered for that product for non-case quantities. Then it divides that total dollar number by the sum of all the units ordered.

123456 GARBONZO BEANS
Calculation of Average Price Per Unit

| SumR = sum of rows in R, thus total R cases = Total Cases | | | |
|---|---|---|---|
| 8 | 1 | 0 | 2 |
| SumRrow times Pcolumn = Total Non-case $ | | | |
| $24.00 | $13.50 | $120.00 | $157.50 |
| SumRrow times Ccolumn = Total Units | | | |
| 8 | 5 | 0 | 50 | 63 |

Then to calculate the price per case size under the average method setting, the Average Price per unit is multiplied by the units per case and this become the Vrow in the Table R$-Average as denoted in step 1702 and Table R-$ Average below.

TABLE R$

Average
123456 GARBONZO BEANS
AVERAGE - $ NON-CASE QUANTITY ORDERS

| Vrow-Average<br>Crow | $2.50<br>1# | $12.50<br>5# | $25.00<br>10# | $62.50<br>25# | Regular/<br>Member<br>Markup |
|---|---|---|---|---|---|
| Club Surplus | $8.37 | | | | 1.11650 |
| Member2 | | | | | 1.24630 |
| Member3 | $3.40 | | | | 1.35960 |
| Member4 | $6.51 | $16.29 | | $162.87 | 1.30295 |
| Member5 | | | | | 1.30295 |
| Retailer | $5.05 | | | | 1.01000 |

The above figures describe pricing for products sourced from the supplier. It is often advisable to sell and therefore price products sourced from inventory. FIG. 18 describes the pricing for products that are allocated to be sold from inventory. As denoted in step 1800 it is first determined if the sale of the inventory that is to be priced is occurring within a CO. If Yes, then it is next determined in step 1808 if the product is sold by the supplier in the CO. If Yes, then a calculation is preferably made as denoted in step 1810 which is to utilize the current pricing for the product in that CO from that supplier and to sell the inventory at the same price as that product is being sold from the supplier.

The Club Inventory Discount is a price reduction (preferably expressed as a percentage) under which the product will be sold from inventory and is an incentive to help move product out of inventory. For example, a product which would otherwise be sold for $1.00 that carries a 25% Club Inventory Discount would then sell for $0.75 as a direct sale from inventory. A buyer coordinator may elect to share (or not) the Club Inventory Discount even with members who are allocated the product from inventory instead of sharing this only with members who purchase the inventory directly, although for purposes of equity in pricing between members the Club Inventory Discount is preferably not included for quantities which are allocated to members.

If the answer to step 1800 is no, ie the sale is occurring outside of a CO, or the answer to step 1808 is no, ie the product is not sold by the supplier in the CO, the processing turns to step 1802 which is to obtain the CS Fee Out, the Member Markup and the Club Inventory Discount. The CS Fee Out is the fee which is charged by a third party processor for use of the system or for other services which is levied on sales of products from inventory.

As denoted by step 1804, the next step is to determine the historical cost per unit for the product as recorded in inventory. Historical cost may be calculated by any one of a number of established costing methodologies commonly known such as First in, First Out (FIFO), Last in First Out (LIFO), or Weighted Average Cost. Any such method will use the lot date, lot number, units per lot, and cost per lot to make such determination as is commonly known by accounting convention. For purposes of determining the unit cost to be used as historical cost it is preferable that the weighted average cost of all on-hand units be utilized as this will prevent inventory from being over or undervalued and best apportion the cost to purchases. On-hand units (versus the net available are commitments) are used so as to prevent rapid changes in prices based on other committed orders that would affect the quantity of units available and thus the cost per unit. The member price is then calculated using the applicable markups of the CS Fee Out, Member Markup and Club Inventory Discount (CID), if any, as applied to the historical cost as denoted in step 1806.

If the determination reached in step 1800 is that the product to be sold from inventory is part of a CO then the next determination is whether the product is sold in a CO or not as denoted in step 1808. If the supplier no longer carries that product for sale, then the sale effectively occurs independently of the CO and processing proceeds to steps 1802, 1804, and 1806 just as though that product were being sold outside of a CO.

If the product is being sold within a CO then the product is preferably priced using the same pricing as that product is made available from the supplier. Whether or not the Club Inventory Discount may be applied is preferably determined by whether the product is purchased directly or is allocated as denoted in step 1810. A direct sale is when a member specifically orders a product from inventory. An allocated sale is when the quantity optimization algorithm allocates to members that product from inventory. As denoted in step 1812, for products purchased directly from inventory, the club inventory discount set by the Buyer Coordinator is preferably applied to reduce the price to the members. If the product is allocated, then the club inventory discount is preferably not applied to the price as denoted in step 1814.

Table I below presents an example of inventory pricing for the product Garbonzo Beans used above with an assumed historical cost (obtained by one of various methods) of $3.25 per unit and a club inventory discount of 25% which may be viewed in the context of FIG. 18 referenced above. It is unlikely that Club Surplus, which is the account of the club, would purchase inventory from itself, and so these rows are marked nm for not meaningful. Similarly, it is unlikely although not impossible that a retailer would preferably elect to purchase product from the buying club. If this occurred, the retailer would preferably not incur a retail markup (from itself) nor a member fee (from the club).

TABLE I

Inventory Pricing
123456 GARBONZO BEANS

| | | | | | Inventory | | | | |
|---|---|---|---|---|---|---|---|---|---|
| | | | | Cost | Discount (CID) | | | | |
| | | | | $3.25 | 25% | | | | |
| 1 | 2 | 3 | 4 | 5 | 6 | 7 | 8 | 9 | 10 |
| | | | | Inventory Prices | | | Dollar Amounts | | |
| | Qty Ord | Qty Alloc. | Member Markup | CS Fee Out | Outside a CO | Inside a CO Direct (with CID) | Inside a CO Allocated (without) CID) | Outside a CO | Inside a CO Direct (with CID) | Inside a CO Allocate (without) CID) |
| Club Surplus | nm | nm | nm | nm | nm | nm | nm | nm | nm | nm |
| Member2 | | | 10% | 2% | $2.73 | $2.80 | $3.74 | | | |
| Member3 | 1 | 1 | 20% | 2% | $2.98 | $3.06 | $4.08 | | $3.06 | $4.08 |
| Member4 | 2 | 1 | 15% | 2% | $2.86 | $2.93 | $3.91 | | $5.86 | $3.91 |

TABLE I-continued

Inventory Pricing
123456 GARBONZO BEANS

Inventory

Cost   Discount (CID)

$3.25   25%

| 1 | 2 | 3 | 4 | 5 | 6 | 7 | 8 | 9 | 10 |
|---|---|---|---|---|---|---|---|---|----|
|   |   |   |   | Inventory Prices | | | Dollar Amounts | | |
| Qty Ord | Qty Alloc. | Member Markup | CS Fee Out | Outside a CO | Inside a CO Direct (with CID) | Inside a CO Allocated (without) CID) | Outside a CO | Inside a CO Direct (with CID) | Inside a CO Allocate (without) CID) |
| Member5 |  | 15% | 2% | $2.86 | $2.93 | $3.91 |  |  |  |
| Retailer |  | 0% | 2% | $2.49 | $2.27 | $3.03 |  |  |  |

The formulas for the pricing calculations underlying columns 5, 6 and 7 of Table I are as follows 5. Outside a CO Inventory Cost×(1+Member Markup)×(1+CS Fee Out)×(1−Club Inventory Discount)

6. Inside a CO—Direct with Club Inventory Discount

Supplier cost×(1+Member Markup)×(1+Retailer Markup)×(1+CS FeeDirect)×(1−Club Inventory Discount)

7. Inside a CO—Allocated without Club Inventory Discount

Supplier cost×(1+Member Markup)×(1+Retailer Markup)×(1+CS FeeDirect)

In column 5 both the member's price and the charge for using the system are based on the CS Fee Out. In columns 6 and 7, although the member price for the inventory is based in part on the CS Fee Direct, the charge to the club for this transaction will be calculated by multiplying the Member's price times the CS Fee Out. So while the CS Fee Direct is used for calculating member pricing, the CS Fee Out is used for calculating the amount actually owed for the system processing fee.

The formulas for the amount calculations underlying columns 8, 9 and 10 of Table I are as follows. These formulas are illustrative and show the total amounts that will be achieved if the quantities ordered in column 1 and allocated in column 2 are applied to the columns 5, 6 or 7 showing the applicable prices. The formula for a product in column 8 is simply the ordered quantity as noted in column 1 times the historical price noted in column 5. More generally, any product that is ordered, as noted in Column 1, will be multiplied by the prices in Columns 5 and 6 which refer to products ordered outside and inside a CO respectively.

Column 2 denotes products that are allocated for sale from inventory and will be multiplied by Column 7 for calculating the amounts owed for these products. Since a member may order inventory and be allocated inventory both from inside a CO, two different prices may be generated for the same product ordered by the same member at the same time because the Club Inventory Discount is preferably applied to a direct inventory order but is preferably not applied to an allocated inventory quantity. In summary, the formulas for calculating amounts ordered from inventory are as follows 8. Column 1 (quantity ordered) times Column 5 (direct price outside a CO)

9. Column 1 (quantity ordered) times Column 6 (direct price inside a CO)

10. Column 2 (quantity allocated) times Column 7 (allocated price)

The aforementioned describes the pricing mechanisms for purchasing products from suppliers and from inventory. However, to fully calculate the amount a customer owes it is necessary to include various add-on fees and discounts that are not reflected in pricing. These add-ons include, but are not necessarily limited to, sales taxes, global price adjustors (such as capitalization charges and member assessments), shipping charges, volume discounts and pickup discounts. These add-on charges and discounts are intended to be illustrative and not in any way intended to limit the number or type of add-on charges or discounts that may be applicable to an order.

Figure 20:
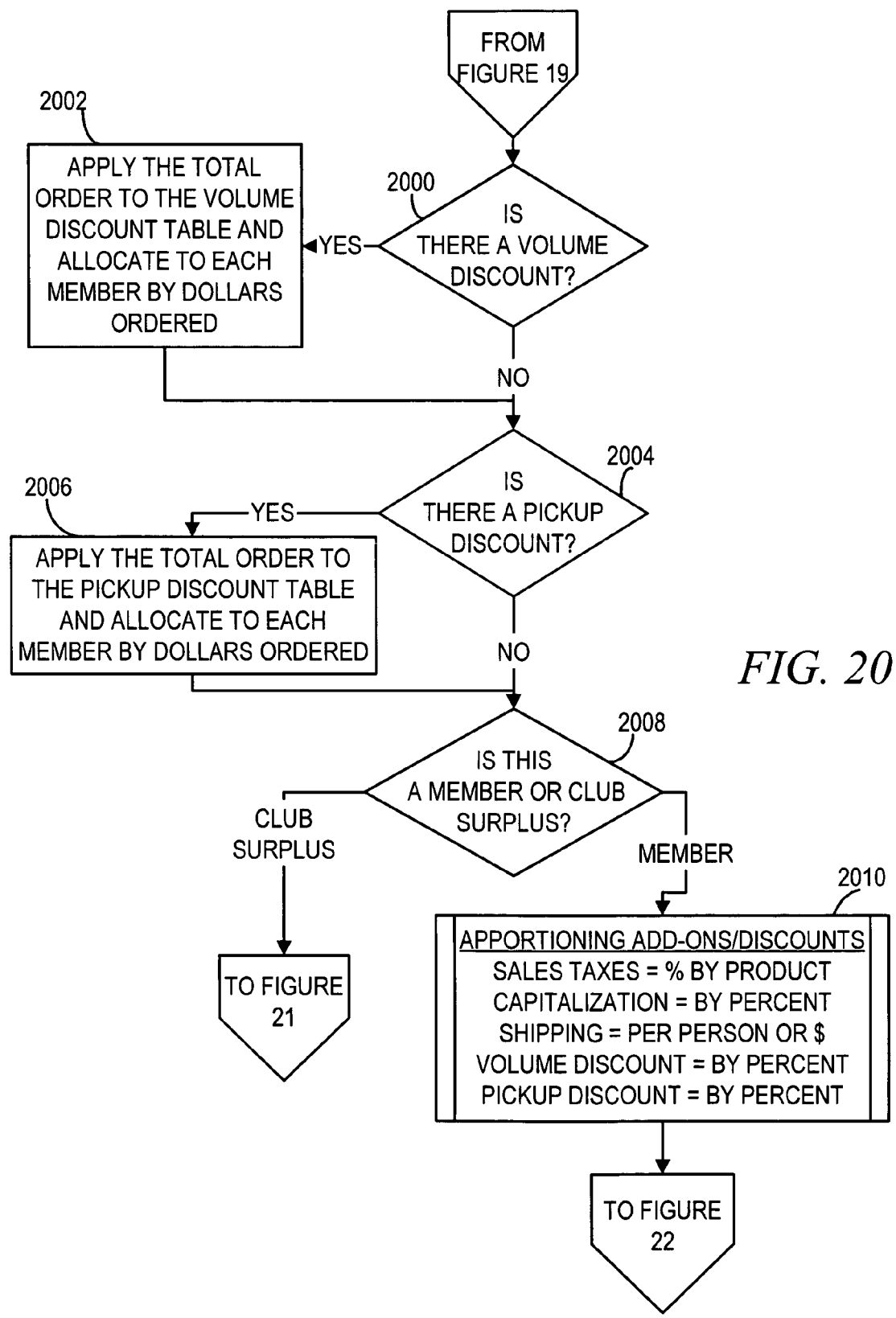
FIG. 20 is a flow chart illustrating Add-On discounts and allocations that may be obtained for Volume purchases or for purchases picked up from the supplier, as well as the presentation of these in screens and reports.

FIGS. 19 and 20 describe the procedures for handling add-ons to pricing that affect the amount that is owed by the customer to the supplier. In step 1900 it is noted whether or not a customer is subject to sales tax. If so, then as denoted in 1902 sales tax is calculated based on the appropriate jurisdiction and product tax type. Next in step 1904 a determination is made as to whether there is a global price adjustor which has not been included in pricing but which must be paid for separately from pricing. An example of this is a capitalization charge or member assessment from a supplier that is fixed at a certain percentage (say 2%) of all dollars submitted in orders to that supplier. Next in step 1908 a determination is made as to whether a shipping charge is incurred, and if so, then as denoted in step 1910 whether such shipping charge is allocated based on each individual person who has ordered or is portioned based on the total dollars ordered.

In FIG. 20, step 2000 a determination is made as to whether a volume discount is applicable. If one is, then the dollar amount of the order is calculated and a table with the applicable discount (preferably a percentage) is referenced and the dollar amount of the volume discount is calculated as denoted in step 2002. As denoted in step 2004, a determination is made as to if a pickup discount is associated with the order if the customer intends to pick up the order at the supplier's origination point. If there is, then as denoted in step 2006, the pickup discount (preferably a percentage) may be calculated and then applied to the total order to determine the amount of the pickup discount. In step 2008, a determination is made as to whether the add-ons are to be applied for Club Surplus, in which case processing proceeds to FIG. 21, or for Members in which case determination is made for how to apportion the club add-ons and discounts to members. A preferable method for apportioning the various club add-ons and discounts to the members is denoted in step 2010. From step 2010, processing proceeds to FIGS. 22 and 23. Each of these add-on charges or discounts are preferably presented in the various screens and reports so that the member can see not only the total amounts of what they have ordered for each product, but also the add-on charges and discounts which will be included in calculations of the total amount owed by a member to the club for a CO.

Figure 21:
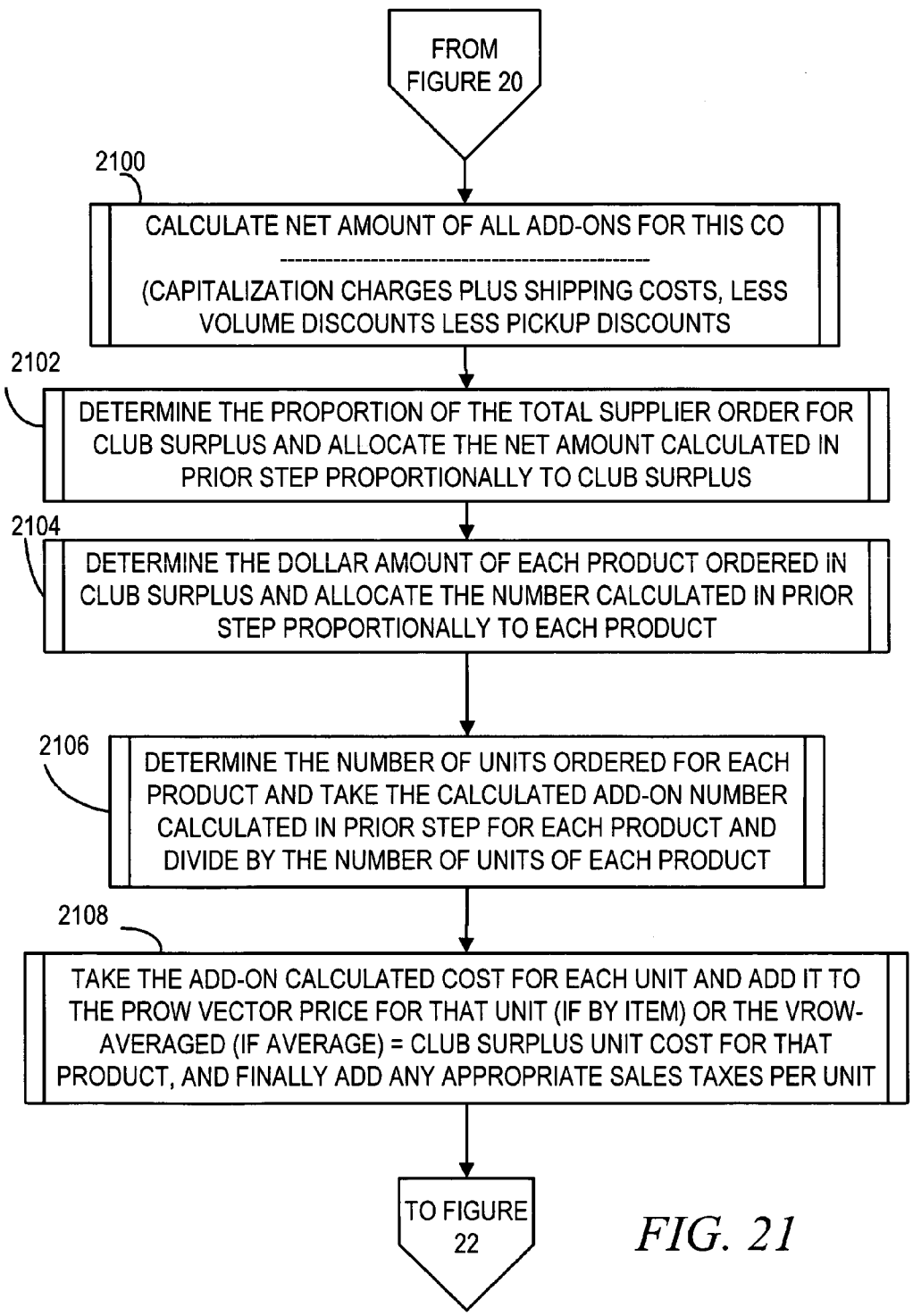
FIG. 21 is a flow chart presenting how the Add-On costs and discounts should be allocated to the Club Surplus per unit prices to create an accurate cost per unit for a product added to inventory via Club Surplus.

To accurately calculate the cost for a product ordered that is placed into Club Inventory it is necessary to include the add-ons and discounts and charges above for Club Surplus. FIG. 21 describes a preferable means for apportioning the add-on charges and discounts for the club to club inventory to determine the appropriate cost per unit to adjust club inventory with respect to the add-ons. In step 2100 a calculation is made for the discounts and add-ons of capitalization charge, shipping, volume discounts, and pickup discounts. For illustrative purposes, let us assume the figure for these 4 add-on charges and discounts is $25. In step 2102 a determination is made as to what portion of the order to the supplier is represented by Club Surplus. For illustrative purposes, let us assume that the Supplier Order is $500, and the Club Surplus order is $100, and thus Club Surplus represents 20% of the $500. Allocating this proportionally then results in 20% of the $25 add-on discounts and charges, or $5, being allocated to Club Surplus.

Next a determination is made as to the costs for each of the products ordered from the supplier by Club Surplus as denoted in step 2104. Further, as denoted in step 2106 a determination is made as to the number of units of each of these products ordered for purposes of defining a cost per unit. For illustrative purposes, let us assume that the Club Surplus order includes three products with the units per case as noted below.

| Product | Ordered | Cost Per Unit Before Adjustment | Dollar Amount Ordered |
|---|---|---|---|
| Product A | 4 units | $6.25 | $25 |
| Product B | 1 unit | $30.00 | $30 |
| Product C | 3 units | $15.00 | $45 |

In the above example, Product A is 25% of the total Club Surplus, Product B is 30% and Product C is 45% by dollar volume. Distributing the $5 charge across the three and dividing the distributed number by the units of each product gives the following allocation of the $5.

| | Units | Adjustment % and Amounts | | |
|---|---|---|---|---|
| Product | Ordered | % | $ | Per Unit |
| Product A | 4 units | 25% | $1.25 | $0.31 |
| Product B | 1 unit | 30% | $1.50 | $1.50 |
| Product C | 3 units | 45% | $2.25 | $0.75 |
| | | 100% | $5.00 | |

As denoted in step 2108, the final adjustments are to add the cost per unit before the adjustment and with the adjustment amount per unit and the appropriate sales taxes. Note that sales taxes, which are calculated separately as denoted in step 1902, are further added to complete the final cost per unit for the addition of this product to club inventory.

| Product | Cost Per Unit Before Adjustments | Adjustment Amount Per Unit | Cost Per Unit After Adjustments | Sales Taxes | Final Cost Per Unit |
|---|---|---|---|---|---|
| Product A | $6.25 | $0.31 | $6.56 | $0.22 | $6.78 |
| Product B | $30.00 | $1.50 | $31.50 | $1.30 | $32.80 |
| Product C | $15.00 | $0.75 | $15.75 | $0.55 | $16.30 |

Figure 22:
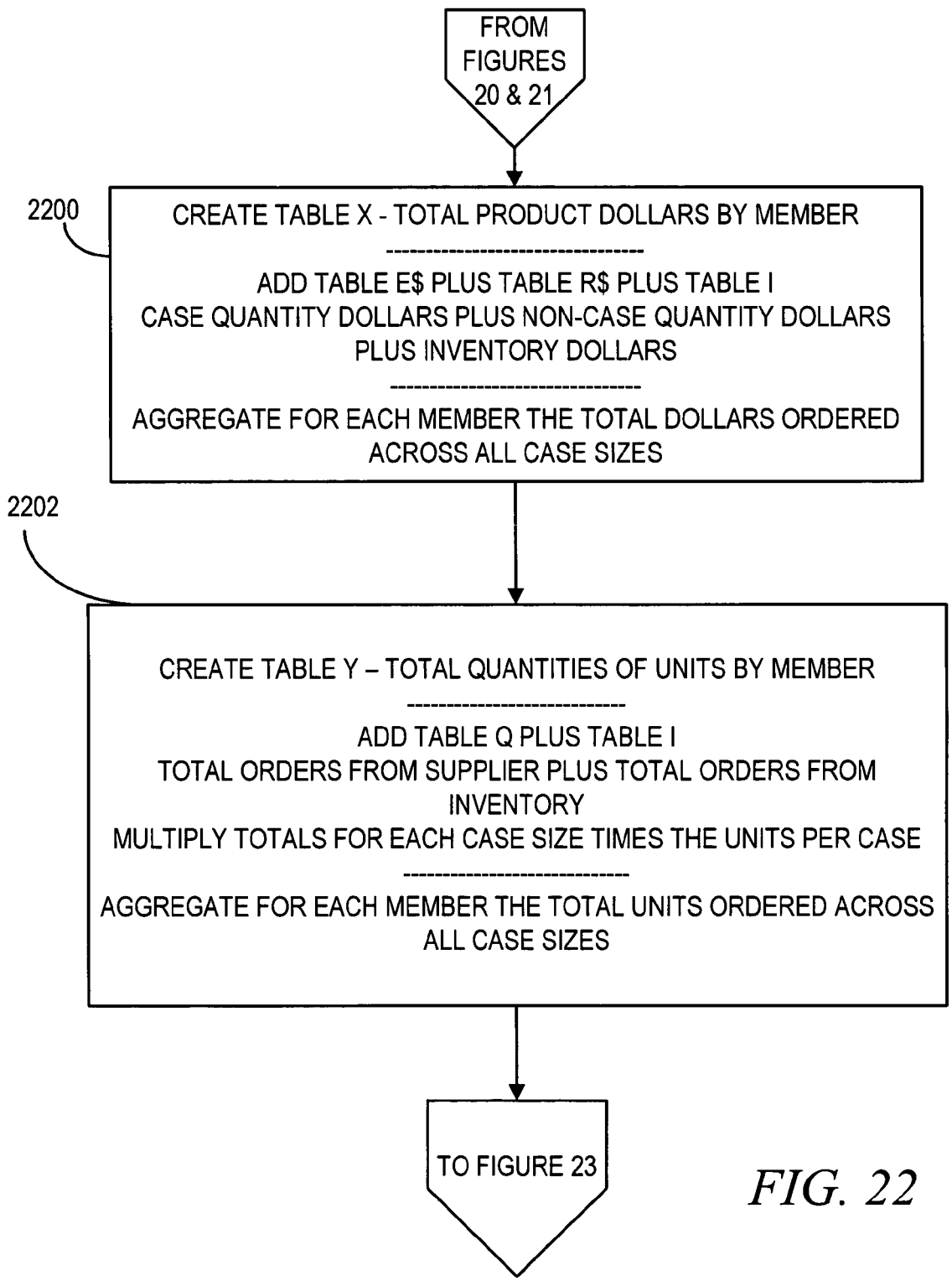
FIGS. 22 and 23 are flow charts summarizing the Tables needed to calculate the average price per unit for each member for product sales occurring inside a CO.
Figure 23:
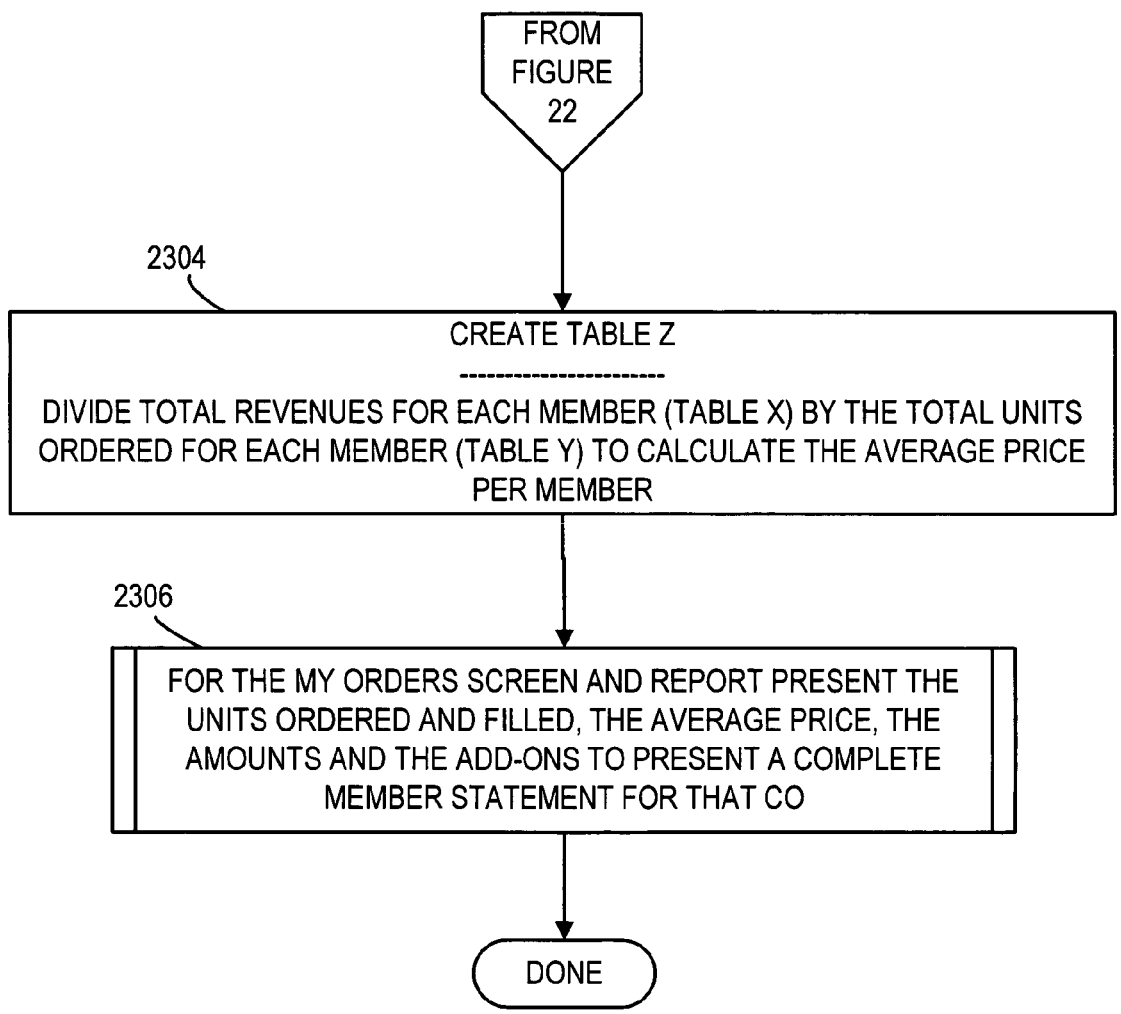

At this point, we have generated the total amounts and the various add-ons charges and discounts and all that remains is to generate the prices which will be charged to the members for the ordered products. FIGS. 22 and 23 describe a preferred mode for generating the average pricing a member owes for a product whether that product is sourced from the supplier as a case order or a non-case order or sourced from inventory, or both. The average price is important to note because in virtually all ordering screens, a quantity amount of units ordered or allocated to a member is accompanied by a dollar amount total (in addition to the price), and the average price enables the price times the units to equal the dollar amount owed for the product. The average price is also important in that buyers are interested in knowing what the cost is for the product after having taken into account all markups and discounts.

To generate the average pricing per unit, first one must calculate the total dollar amount of orders for a product by each member and then next it is necessary to calculate the total units for each member. Finally simple division of total dollars by the units achieves the average price for each member. The following presents the process for generating the average price for members in a CO.

As denoted in step 2300, Table X is created and calculates the total dollar order for a product across all cases sizes for each member within a CO. Table X consists of the vector addition of Tables E$ (member dollar amounts of case quantities) which was created in step 1506, plus Table R$ (member dollar amount for non-case quantities, for this example using R$-By Item, but either By Item or Average Price method may be assumed) which was created in step 1602, plus Table I (quantities, price, and amounts ordered from inventory) and which was created in step 1816. Table X is found below.

TABLE X

| | Total Product Dollars By Member | | | | |
|---|---|---|---|---|---|
| Crow | 1# | 5# | 10# | 25# | Member Total $ |
| Club Surplus | $10.05 | | | | $10.05 |
| Member2 | | $6.06 | $29.74 | | $45.80 |
| Member3 | $11.22 | | | $71.38 | $82.60 |
| Member4 | $17.59 | $17.59 | | $156.35 | $191.53 |
| Member5 | | $16.06 | | $71.38 | $87.44 |
| Retailer | $6.06 | | | | $6.06 |
| | | | | | $423.48 |

Step 2302 denotes the creation of Table Y in which is stored the total quantities of units ordered by or allocated to members. Table Y consists of the vector addition of the amount of products ordered or allocated from the supplier in Table Q as well as the products ordered or allocated from inventory as noted in Table I.

TABLE Y

Quantities Ordered By or Allocated to Members

| Crow | 1# | 5# | 10# | 25# | Member Total |
|---|---|---|---|---|---|
| Crow Vector | 1 | 5 | 10 | 25 | Units |
| Club Surplus | 3 | 0 | 0 | 0 | 3 |
| Member2 | 1 | 5 | 10 | 0 | 16 |
| Member3 | 4 | 0 | 0 | 25 | 29 |
| Member4 | 4 | 5 | 0 | 50 | 59 |
| Member5 | 0 | 5 | 0 | 25 | 30 |
| Retailer | 2 | 0 | 0 | 0 | 2 |
|  |  |  |  |  | 139 |

Finally, as noted in step 2304 the total dollar amounts for each member are divided by the total quantities ordered or allocated to each member to calculate the average price per unit. This is illustrated below in Table Z.

TABLE Z

Member Average Price Per Unit

| Crow | 1# | 5# | 10# | 25# | |
|---|---|---|---|---|---|
| Club Surplus | $3.35 | | | | $3.35 |
| Member2 | | $3.21 | $2.97 | | $2.86 |
| Member3 | $2.80 | | | $2.86 | $2.85 |
| Member4 | $4.40 | $3.52 | | $3.13 | $3.25 |
| Member5 | | $3.21 | | $2.86 | $2.91 |
| Retailer | $3.03 | | | | $3.03 |
| | | | | | $3.05 |

The above steps therefore describe a preferred means for determining the pricing and amounts that apply to each member for the orders placed in a Coop Order of a buying club.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Additionally, some features may be readily modified by means of a re-sequencing of process steps, performing alternative calculations, or utilizing different techniques to achieve functionally equivalent or similar results or capabilities. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention and that the claims will therefore cover any such modifications or embodiments that fall within the true scope and spirit of the invention.

The invention claimed is:

1. A system comprising:
    a network;
    a web server connected to said network, said web server including a database for storing data;
    two or more buyer computers connected to said network for data communication with said web server, each of which buyer computers is operable by two or more respective buyers of at least one buying club, and is configured for generating to said web server data defining orders of products placed by said two or more respective buyers, said data including a first range defined between a first quantity and a second quantity of a number of units of each product to order for each of said two or more respective buyers, wherein, for at least one of said two or more respective buyers of each product, said first quantity is not equal to said second quantity; and
    a memory coupled to said web server, said memory comprising computer program code executable by said web server for:
        generating for each respective product a first aggregate quantity equal to the sum of said first quantities specified by each of said respective two or more buyers for each respective product;
        generating for each respective product a second aggregate quantity equal to the sum of said second quantities specified by each of said respective two or more buyers for each respective product;
        determining two or more valid order quantities of units of each respective product, wherein, for each respective product, said two or more valid order quantities are defined by values which are equivalent to two or more respective integer multiples of a pre-defined number greater than one;
        determining, for each of said respective products, at least one of said two or more valid order quantities within a second range defined between and including said first aggregate quantity and said second aggregate quantity;
        selecting for each respective product, based on a pre-defined criterion, one of said at least one of said two or more valid order quantities; and
        for each respective product, allocating units among said respective two or more buyers, wherein the sum of said units allocated among said respective two or more buyers is equal to said selected one of said at least one of said two or more valid order quantities.

2. The system of claim 1, wherein said first range further includes said first quantity and said second quantity.

3. The system of claim 1, wherein, for at least one buyer of at least product, said first range further includes said first quantity and said second quantity, and said first quantity is equal to said second quantity.

4. The system of claim 1, wherein said first quantity is a minimum quantity and said second quantity is a preferred quantity.

5. The system of claim 1, wherein said first quantity is a minimum quantity and said second quantity is a maximum quantity.

6. The system of claim 1, wherein said first quantity is a preferred quantity and said second quantity is a maximum quantity.

7. The system of claim 1, wherein said first quantity is a minimum quantity and said second quantity is a maximum quantity, and said first range includes a preferred quantity.

8. The system of claim 1, wherein said first quantity is zero and said second quantity is a maximum quantity.

9. The system of claim 1, wherein said memory further comprises computer program code executable by said web server for determining said second quantity as a predetermined deviation relative to said first quantity.

10. The system of claim 1, wherein said memory further comprises computer program code executable by said web server for calculating said second quantity as a predetermined percentage deviation relative to said first quantity.

11. The system of claim 1, wherein said memory further comprises computer program code executable by said web server for calculating said second quantity as a predetermined quantity deviation relative to said first quantity.

12. The system of claim 1, wherein said product excludes at least one of discontinued products, non-splittable cases, and products ordered from inventory.

13. The system of claim 1, wherein at least one of said first quantity and said second quantity is at least one of an integer quantity, a decimal quantity, and a fractional quantity.

14. The system of claim 1, wherein said criterion is one of closest to preferred, lowest cost per unit, and a combination of closest to preferred and lowest cost per unit.

15. The system of claim 1, wherein said data further includes a preferred quantity of a number of units of each product to order for each of said two or more respective buyers;

wherein said memory further comprises computer program code executable by said web server for generating for each respective product an aggregate preferred quantity equal to the sum of said preferred quantities specified by each of said respective two or more buyers for each respective product; and wherein said computer program code for selecting further comprises computer program code for selecting for each respective product one of said at least one of said two or more valid order quantities according to which one of said at least one of said two or more valid order quantities is closest to said aggregate preferred quantity.

16. A method operable on a network having a web server connected to the network, the web server including a database for storing data, wherein two or more buyer computers are connected to said network for data communication with said web server, each of which buyer computers is operable by two or more respective buyers of at least one buying club, and is configured for generating to said web server data defining orders of products placed by said two or more respective buyers, said data including a first range defined between a first quantity and a second quantity of a number of units of each product to order for each of said two or more respective buyers, wherein, for at least one of said two or more respective buyers of each product, said first quantity is not equal to said second quantity, the method comprising steps of:

generating for each respective product a first aggregate quantity equal to the sum of said first quantities specified by each of said respective two or more buyers for each respective product;

generating for each respective product a second aggregate quantity equal to the sum of said second quantities specified by each of said respective two or more buyers for each respective product;

determining two or more valid order quantities of units of each respective product, wherein, for each respective product, said two or more valid order quantities are defined by values which are equivalent to two or more respective integer multiples of a pre-defined number greater than one;

determining, for each of said respective products, at least one of said two or more valid order quantities within a second range defined between and including said first aggregate quantity and said second aggregate quantity;

selecting for each respective product, based on a pre-defined criterion, one of said at least one of said two or more valid order quantities; and for each respective product, allocating units among said respective two or more buyers, wherein the sum of said units allocated among said respective two or more buyers units is equal to said at least one valid order quantity.

17. The method of claim 16, wherein said data further includes a preferred quantity of a number of units of each product to order for each of said two or more respective buyers;

wherein said method further comprises the step of generating for each respective product an aggregate preferred quantity equal to the sum of said preferred quantities specified by each of said respective two or more buyers for each respective product; and wherein said step of selecting further comprises selecting for each respective product one of said at least one of said two or more valid order quantities according to which one of said at least one of said two or more valid order quantities is closest to said aggregate preferred quantity.

18. The system of claim 1 wherein the price per unit of each unit of a first one of said two or more valid order quantities of units is the same as the price per unit of each unit of a second one of said two or more valid order quantities of units, wherein said first one of said two or more valid order quantities of units is determined using a first respective integer multiple, said second one of said two or more valid order quantities of units is determined using a second respective integer multiple, said first respective integer multiple being unequal to said second respective integer multiple.

19. The method of claim 16 wherein the price per unit of each unit of a first one of said two or more valid order quantities of units is the same as the price per unit of each unit of a second one of said two or more valid order quantities of units, wherein said first one of said two or more valid order quantities of units is determined using a first respective integer multiple, said second one of said two or more valid order quantities of units is determined using a second respective integer multiple, said first respective integer multiple being unequal to said second respective integer multiple.

20. A method operable on a network having a web server connected to the network, the web server including a database for storing data, wherein two or more buyer computers are connected to said network for data communication with said web server, each of which buyer computers is operable by two or more respective buyers of at least one buying club, and is configured for generating to said web server data defining orders of products placed by said two or more respective buyers, said data including a first range defined between a first quantity and a second quantity of a number of units of each product to order for each of said two or more respective buyers, wherein, for at least one of said two or more respective buyers of each product, said first quantity is not equal to said second quantity, the method comprising steps of:

generating for each respective product a first aggregate quantity equal to the sum of said first quantities specified by each of said respective two or more buyers for each respective product;

generating for each respective product a second aggregate quantity equal to the sum of said second quantities specified by each of said respective two or more buyers for each respective product;

determining two or more valid order quantities of units of each respective product, wherein, for each respective product, said two or more valid order quantities are defined by values which are equivalent to two or more respective integer multiples of a pre-defined number greater than one, wherein the price per unit of each unit of a first one of said two or more valid order quantities of units is the same as the price per unit of each unit of a second one of said two or more valid order quantities of units, wherein said first one of said two or more valid order quantities of units is determined using a first respective integer multiple, said second one of said two or more valid order quantities of units is determined using a second respective integer multiple, said first respective integer multiple being unequal to said second respective integer multiple;

determining, for each of said respective products, at least one of said two or more valid order quantities within a second range defined between and including said first aggregate quantity and said second aggregate quantity;

selecting for each respective product, based on a predefined criterion, one of said at least one of said two or more valid order quantities; and for each respective product, allocating units among said respective two or more buyers, wherein the sum of said units allocated among said respective two or more buyers units is equal to said at least one valid order quantity.

* * * * *